US008655114B2

(12) United States Patent
Popovic

(10) Patent No.: US 8,655,114 B2
(45) Date of Patent: Feb. 18, 2014

(54) HITLESS TUNING AND SWITCHING OF OPTICAL RESONATOR AMPLITUDE AND PHASE RESPONSES

(75) Inventor: Milos Popovic, Boulder, CO (US)

(73) Assignee: Massachusetts Institute of Technology, Cambridge, MA (US)

(*) Notice: Subject to any disclaimer, the term of this patent is extended or adjusted under 35 U.S.C. 154(b) by 756 days.

(21) Appl. No.: 12/532,796

(22) PCT Filed: Mar. 26, 2008

(86) PCT No.: PCT/US2008/003957
§ 371 (c)(1),
(2), (4) Date: Apr. 28, 2010

(87) PCT Pub. No.: WO2008/118465
PCT Pub. Date: Oct. 2, 2008

(65) Prior Publication Data
US 2010/0209038 A1   Aug. 19, 2010

Related U.S. Application Data

(60) Provisional application No. 60/920,339, filed on Mar. 26, 2007.

(51) Int. Cl.
G02F 1/01     (2006.01)
G02B 6/26    (2006.01)
G02B 6/42    (2006.01)

(52) U.S. Cl.
USPC ................................ 385/1; 385/16; 385/32

(58) Field of Classification Search
USPC ........................ 385/1, 3, 14, 16, 32
See application file for complete search history.

(56) References Cited

U.S. PATENT DOCUMENTS 3,558,213 A   1/1971  Marcatili
4,142,775 A   3/1979  Ramaswamy et al.
(Continued)

FOREIGN PATENT DOCUMENTS

EP   0646832   4/1995
EP   0726627   8/1996
(Continued)

OTHER PUBLICATIONS

"Micro-ring resonator filter with doubled free-spectral-range by two-point coupling" by Watts et al, Proc. Conference on Lasers and Electro-Optics (CLEO), Baltimore, MD, vol. 1, CMP3, pp. 273-275, May 2005.*

(Continued)

Primary Examiner — Ryan Lepisto
Assistant Examiner — Robert Tavlykaev
(74) Attorney, Agent, or Firm — Goodwin Procter LLP

(57) ABSTRACT

A hitless tunable filter may include a ring resonator, a Mach-Zehnder coupler, and first and second phase shifters. The Mach-Zehnder coupler may include a switching arm that is coupled to the ring resonator at first and second coupling points. The first phase shifter may be used to introduce a first phase shift to light propagating through the ring resonator, while the second phase shifter may be used to introduce a second phase shift to light propagating through the Mach-Zehnder coupler. The Mach-Zehnder coupler may have a free spectral range substantially equal to a free spectral range of the ring resonator divided by a non-negative integer.

4 Claims, 29 Drawing Sheets

(56) References Cited

U.S. PATENT DOCUMENTS

| | | | |
|---|---|---|---|
| 4,679,893 A | 7/1987 | Ramer | |
| 4,781,424 A | 11/1988 | Kawachi et al. | |
| 4,852,117 A | 7/1989 | Po | |
| 5,241,616 A | 8/1993 | Garcia | |
| 5,371,817 A | 12/1994 | Revelli, Jr. et al. | |
| 5,418,868 A | 5/1995 | Cohen et al. | |
| 5,592,500 A | 1/1997 | Shirasaki | |
| 5,625,403 A | 4/1997 | Hazman | |
| 5,900,637 A | 5/1999 | Smith | |
| 6,025,943 A | 2/2000 | Meekers et al. | |
| 6,031,957 A | 2/2000 | Suzuki et al. | |
| 6,052,495 A | 4/2000 | Little et al. | |
| 6,157,765 A | 12/2000 | Bruce et al. | |
| 6,289,151 B1 | 9/2001 | Kazarinov et al. | |
| 6,351,575 B1 | 2/2002 | Gampp et al. | |
| 6,389,203 B1* | 5/2002 | Jordan et al. | 385/50 |
| 6,411,752 B1 | 6/2002 | Little et al. | |
| 6,442,311 B1 | 8/2002 | Barbarossa et al. | |
| 6,480,644 B1 | 11/2002 | MacDonald | |
| 6,529,277 B1 | 3/2003 | Weitekamp | |
| 6,563,631 B2 | 5/2003 | Delprat et al. | |
| 6,636,669 B1 | 10/2003 | Chin et al. | |
| 6,668,006 B1 | 12/2003 | Margalit et al. | |
| 6,668,111 B2 | 12/2003 | Tapalian et al. | |
| 6,690,871 B2 | 2/2004 | Lee et al. | |
| 6,711,200 B1 | 3/2004 | Scherer et al. | |
| 6,829,269 B2 | 12/2004 | Goodhue et al. | |
| 6,834,141 B1 | 12/2004 | Sidick | |
| 6,839,482 B2 | 1/2005 | Margalit | |
| 6,847,750 B1 | 1/2005 | Baumann et al. | |
| 6,891,996 B2 | 5/2005 | Sercel et al. | |
| 6,947,632 B2 | 9/2005 | Fischer | |
| 6,970,619 B2 | 11/2005 | Baumann et al. | |
| 7,062,126 B2 | 6/2006 | Kersey et al. | |
| 7,102,469 B2 | 9/2006 | Kim et al. | |
| 7,110,632 B2 | 9/2006 | Abeles | |
| 7,123,800 B2 | 10/2006 | Kaplan | |
| 7,145,660 B2 | 12/2006 | Margalit et al. | |
| 7,164,838 B2 | 1/2007 | Blauvelt et al. | |
| 7,171,076 B2* | 1/2007 | Shibata | 385/32 |
| 7,200,308 B2 | 4/2007 | Hochberg et al. | |
| 7,215,848 B2 | 5/2007 | Tan et al. | |
| 7,292,751 B2 | 11/2007 | Popovic | |
| 7,339,724 B2 | 3/2008 | Hochberg et al. | |
| 7,424,192 B2 | 9/2008 | Hochberg et al. | |
| 7,446,880 B2 | 11/2008 | Vollmer et al. | |
| 7,450,811 B2 | 11/2008 | Hashimoto | |
| 7,539,375 B2 | 5/2009 | Popovic | |
| 7,643,714 B2 | 1/2010 | Hochberg et al. | |
| 7,693,369 B2 | 4/2010 | Fan et al. | |
| 7,853,108 B2 | 12/2010 | Popovic et al. | |
| 7,973,265 B2 | 7/2011 | Chu et al. | |
| 8,019,185 B2 | 9/2011 | Yap | |
| 8,032,027 B2 | 10/2011 | Popovic | |
| 2001/0040681 A1 | 11/2001 | Paiam et al. | |
| 2001/0046344 A1 | 11/2001 | Hayashi et al. | |
| 2002/0039470 A1 | 4/2002 | Braun et al. | |
| 2002/0067540 A1 | 6/2002 | Delprat et al. | |
| 2002/0076149 A1 | 6/2002 | Deacon | |
| 2002/0076188 A1 | 6/2002 | Kimerling et al. | |
| 2002/0081055 A1 | 6/2002 | Painter et al. | |
| 2002/0122648 A1 | 9/2002 | Mule'et al. | |
| 2002/0136481 A1 | 9/2002 | Mule'et al. | |
| 2002/0172466 A1 | 11/2002 | Baumann et al. | |
| 2002/0181829 A1 | 12/2002 | Margalit et al. | |
| 2003/0015770 A1 | 1/2003 | Talin et al. | |
| 2003/0016907 A1 | 1/2003 | LoCascio et al. | |
| 2003/0021301 A1 | 1/2003 | Vahala et al. | |
| 2003/0068134 A1 | 4/2003 | Gunn | |
| 2003/0128905 A1 | 7/2003 | Kambe et al. | |
| 2003/0128922 A1 | 7/2003 | Kolodziejski et al. | |
| 2003/0138178 A1 | 7/2003 | Kimerling et al. | |
| 2003/0152323 A1 | 8/2003 | Wakabayashi et al. | |
| 2003/0156780 A1 | 8/2003 | Margalit et al. | |
| 2003/0174974 A1 | 9/2003 | Yasuda et al. | |
| 2003/0210860 A1 | 11/2003 | Margalit | |
| 2003/0219052 A1 | 11/2003 | Goodhue et al. | |
| 2004/0008942 A1 | 1/2004 | Scheuer et al. | |
| 2004/0008968 A1 | 1/2004 | Lee et al. | |
| 2004/0013355 A1 | 1/2004 | Margalit | |
| 2004/0042726 A1 | 3/2004 | Kersey et al. | |
| 2004/0056243 A1 | 3/2004 | Atanackovic et al. | |
| 2004/0114899 A1 | 6/2004 | Mattsson | |
| 2004/0146431 A1 | 7/2004 | Scherer et al. | |
| 2004/0156580 A1 | 8/2004 | Baumann et al. | |
| 2004/0161188 A1 | 8/2004 | Su et al. | |
| 2004/0197051 A1 | 10/2004 | Sercel et al. | |
| 2004/0264905 A1 | 12/2004 | Blauvelt et al. | |
| 2005/0029536 A1 | 2/2005 | Sugitatsu et al. | |
| 2005/0036737 A1 | 2/2005 | Stuart | |
| 2005/0058396 A1* | 3/2005 | Tormen et al. | 385/39 |
| 2005/0068602 A1 | 3/2005 | Tormen et al. | |
| 2005/0077526 A1 | 4/2005 | Shin et al. | |
| 2005/0147348 A1 | 7/2005 | Grunnet-Jepsen et al. | |
| 2005/0163418 A1 | 7/2005 | Wong et al. | |
| 2005/0169566 A1 | 8/2005 | Takahashi | |
| 2005/0196103 A1 | 9/2005 | Kaplan | |
| 2005/0255619 A1 | 11/2005 | Negro et al. | |
| 2005/0259937 A1 | 11/2005 | Whaley et al. | |
| 2005/0275921 A1 | 12/2005 | Haus et al. | |
| 2006/0008272 A1 | 1/2006 | Abeles | |
| 2006/0029325 A1 | 2/2006 | Fardi et al. | |
| 2006/0034569 A1 | 2/2006 | Shih et al. | |
| 2006/0083456 A1 | 4/2006 | Burns et al. | |
| 2006/0134535 A1 | 6/2006 | Porque | |
| 2006/0198566 A1 | 9/2006 | Watts | |
| 2006/0222038 A1 | 10/2006 | Yamazaki | |
| 2006/0227331 A1 | 10/2006 | Vollmer et al. | |
| 2006/0239614 A1 | 10/2006 | Montgomery et al. | |
| 2006/0274995 A1 | 12/2006 | Lee et al. | |
| 2006/0291791 A1 | 12/2006 | Hochberg et al. | |
| 2007/0003283 A1 | 1/2007 | Feuer et al. | |
| 2007/0035800 A1 | 2/2007 | Hochberg et al. | |
| 2007/0133934 A1 | 6/2007 | Blauvelt et al. | |
| 2007/0211992 A1 | 9/2007 | chu et al. | |
| 2007/0230867 A1 | 10/2007 | Chen et al. | |
| 2007/0237460 A1 | 10/2007 | Fan et al. | |
| 2007/0253663 A1 | 11/2007 | Keyser et al. | |
| 2008/0002992 A1 | 1/2008 | Hochberg et al. | |
| 2008/0007817 A1 | 1/2008 | Hochberg et al. | |
| 2008/0013876 A1 | 1/2008 | Gill et al. | |
| 2008/0014534 A1 | 1/2008 | Barwicz et al. | |
| 2008/0044184 A1 | 2/2008 | Popovic | |
| 2008/0166095 A1* | 7/2008 | Popovic et al. | 385/126 |
| 2008/0199123 A1 | 8/2008 | Pan et al. | |
| 2008/0266639 A1 | 10/2008 | Melloni et al. | |
| 2008/0273835 A1 | 11/2008 | Popovic | |
| 2009/0022445 A1 | 1/2009 | Hochberg et al. | |
| 2009/0028492 A1 | 1/2009 | Wu et al. | |
| 2009/0028567 A1 | 1/2009 | Socci et al. | |
| 2009/0032805 A1 | 2/2009 | Ty Tan et al. | |
| 2009/0087137 A1 | 4/2009 | Doan | |
| 2009/0220228 A1 | 9/2009 | Popovic | |
| 2009/0239323 A1 | 9/2009 | Tan et al. | |
| 2009/0256136 A1 | 10/2009 | Tan et al. | |
| 2009/0314763 A1 | 12/2009 | Chu et al. | |
| 2010/0002994 A1 | 1/2010 | Baehr-Jones et al. | |
| 2011/0026879 A1 | 2/2011 | Popovic et al. | |

FOREIGN PATENT DOCUMENTS

| | | |
|---|---|---|
| EP | 0909963 | 4/1999 |
| EP | 1024378 | 8/2000 |
| EP | 1241497 A2 | 9/2002 |
| EP | 1717616 | 11/2006 |
| EP | 1785771 | 5/2007 |
| JP | 2001-194160 A | 7/2001 |
| WO | WO-8501123 | 3/1985 |
| WO | WO-00/50938 | 8/2000 |
| WO | WO-01/23955 | 4/2001 |
| WO | WO-01/55814 | 8/2001 |
| WO | WO-01/88580 | 11/2001 |
| WO | WO-01/96913 | 12/2001 |
| WO | WO-02/17004 | 2/2002 |

(56) References Cited

FOREIGN PATENT DOCUMENTS

| WO | WO-02/063389 | 8/2002 |
|---|---|---|
| WO | WO-02/101421 | 12/2002 |
| WO | WO-03/036841 | 5/2003 |
| WO | WO-03/043247 | 5/2003 |
| WO | WO-2005/010618 | 2/2005 |
| WO | WO-2005036793 A1 | 4/2005 |
| WO | WO-2005/104147 | 11/2005 |
| WO | WO-2005/106551 A1 | 11/2005 |
| WO | WO-2006/025760 A2 | 3/2006 |
| WO | WO-2006/076585 A2 | 7/2006 |
| WO | WO-2007/067165 A1 | 6/2007 |
| WO | WO-2007/084600 | 7/2007 |
| WO | WO-2007/086888 | 8/2007 |
| WO | WO-2008/005061 | 1/2008 |
| WO | WO-2009/017769 | 2/2009 |

OTHER PUBLICATIONS

Barbarossa et al., "Novel Double-Ring Optical-Guided-Wave Vernier Resonator," IEE Proc-Optoelectron., vol. 144, No. 4, Aug. 1997, pp. 203-208.
Barbarossa et al., "Theoretical Analysis of Triple-Coupler Ring-Based Optical Guided-Wave Resonator," Journal of Lightwave Technology, vol. 13, No. 2, Feb. 1995, pp. 148-157.
Barbarossa et al., "Triple-Coupler Ring-Based Optical Guided-Wave Resonator" Electronics Letters, IEE Stevenage, GB, vol. 30, No. 2, Jan. 20, 1994, pp. 131-133.
Doerr et al., "Wavelength Add-Drop Node Using Silica Waveguide Integration," Journal of Lightwave Technology, vol. 22, No. 12, Dec. 2004, pp. 2755-2762.
Domash et al., "Tunable and Switchable Multiple-Cavity Thin Film Filters," Journal of Lightwave Technology, vol. 22, No. 1, Jan. 2004, pp. 126-135.
Geuzebroek et al. "Thermally Tuneable, Wide FSR Switch based on Micro-ring Resonators," Proceedings Symposium IEEE/LEOS Benelux Chapter, 2002, Amsterdam, pp. 155-158.
Goebuchi et al. "Fast and Stable Wavelength-Selective Switch Using Double-Series Coupled Dielectric Microring Resonator," IEEE Photonics Technology Letters, vol. 18, No. 3, Feb. 1, 2006, pp. 538-540.
Haus et al., "Broadband Hitless Bypass Switch for Integrated Photonic Circuits," IEEE Photonics Technology Letters, vol. 18, No. 10, May 15, 2006, pp. 1137-1139.
Lee et al. "MEMS-Actuated Microdisk Resonators With Variable Power Coupling Ratios," IEEE Photonics Technology Letters, vol. 17, No. 5, May 2005, pp. 1034-1036.
Lee et al., "Tunable Coupling Regimes of Silicon Microdisk Resonators Using MEMS Actuators," Optics Express, vol. 14, No. 11, May 29, 2006, pp. 4703-4712.
Little et al., "Microring Resonator Channel Dropping Filters," Journal of Lightwave Technology, vol. 15, No. 6, Jun. 1997, pp. 998-1005.
Little et al., "Wavelength Switching and Routing Using Absorption and Resonance," IEEE Photonics Technology Letters, vol. 10, No. 6, Jun. 1998, pp. 816-818.
Madsen et al., "A Multi-Port Add/Drop Router Using UV-Induced Gratings in Planar Waveguides," Optical Fiber Communication Conference and the International Conference on Integrated Optics and Optical Fiber Communication. San Diego, CA, Feb. 23-26, 1999, paper ThH3, pp. 104-106.
Oda et al., "A Wide-FSR Waveguide Double-Ring Resonator for Optical FDM Transmission Systems," Journal of Lightwave Technology, vol. 9, No. 6, Jun. 1991, pp. 728-736.
Scotti et al., "A Hitless Reconfigurable Add-Drop Multiplexer for WDM Networks Utilizing Planar Waveguides, Thermo-Optic Switches and UV-Induced Gratings," OFC '98 Technical Digest, 1998, Washington, DC, USA, Opt. Soc. America, USA, Feb. 1998, pp. 142-143.
Takahashi et al., "Tunable Chromatic Dispersion Compensator Utilizing Silica Waveguide Ring Resonator Having Mach-Zehnder Interferometric Variable Coupler Eliminating Crossing Point of Waveguides" Lasers and Electro-Optics Society, 2002, The 15th Annual Meeting of the IEEE, Nov. 10-14, 2002, vol. 2, pp. 665-666.
Wei et al. "Compound Ring Resonator With Double Couplers," Optics Communications, North-Holland Publishing Co., Amsterdam, NL, vol. 186, No. 4-6, Dec. 15, 2000, pp. 283-290.
Yanagase et al. "Box-Like Filter Response and Expansion of FSR by a Vertically Triple Coupled Microring Resonator Filter," Journal of Lightwave Technology, vol. 20, No. 8, Aug. 2002, pp. 1525-1529.
Invitation to Pay Additional Fees and Partial International Search for PCT Application No. PCT/US2008/003957, mailed Jun. 16, 2008, 8 pages.
International Search Report for PCT Application No. PCT/US2008/003957, mailed Oct. 7, 2008, 8 pages.
Written Opinion for PCT Application No. PCT/US2008/003957, mailed Oct. 7, 2008, 10 pages.
Weber et al., "Crosstalk and Switching Characteristics in Directional Couplers," IEEE Journal of Quantum Electronics, vol. 24, No. 3, (Mar. 1988), pp. 537-548.
Altug et al. "Ultrafast Photonic Crystal Nanocavity Laser," Nature Physics 2, 2006, pp. 484-488.
Badolato et al. "Deterministic Coupling of Single Quantum Dots to Single Nanocavity Modes," Science 308, 2005, pp. 1158-1161.
Baehr-Jones et al. "High-Q Ring Resonators in Thin Silicon-on-Insulator," 85 Appl. Phys. Lett. 16, Oct. 2004, pp. 3346-3347.
Barwicz et al. "Polarization-transparent microphotonic devices in the Strong Confinement Limit," Nature Photonics 1, Jan. 2007, pp. 57-60.
Barwicz "3D analysis of scattering losses due to sidewall roughness in microphotonic waveguides: high index-contrast," 2005 Conf. on Lasers and Electro-Optics (CLEO), 2005, vol. 2, pp. 1333-1335.
Batten et al. "Building Manycore Processor-to-DRAM Networks with Monolithic CMOS Si Photonics," IEEE Micro, Jul. 2009, p. 8-21.
Becker et al. "Optical Properties of Semiconductors. III. Infra-red Transmission of Silicon," 76 Physical Rev. A, 1949, pp. 1531-1532.
Bethe "Theory of Diffraction by Small Holes," 66 Phys. Rev. 7-8, Oct. 1944, pp. 163-182.
Bogaerts et al. "Low-loss, low-cross-talk crossings for silicon-on-insulator nanophotonic waveguides," 32 Optics Letters 19, 2007, pp. 2801-2803.
Bozhevolnyi et al. "Channel Plasmon Subwavelength Waveguide Components Including Interferometers and Ring Resonators," Nature 440, 2006, pp. 508-511.
Bustillo et al. "Surface Micromachining for Microelectromechanical Systems," Proc. of the IEEE 86, 1998, pp. 1552-1574.
Campbell et al. "GaAs Electro-Optic Directional-coupler switch," 27 Applied Physics Lett. 4, Aug. 1975, pp. 202-205.
Chan et al. "Single-mode and Polarization-independent Silicon-on-insulator waveguides with Small Cross Section," 23 J. Lightwave Tech. 6, Jun. 2005, pp. 2103-2111.
Chen et al. "Low-loss multimode-interference-based crossings for Silicon Wire Waveguides," 18 IEEE Photonics Letters 21, 2006, pp. 2260-2262.
Chremmos et al. "Properties of Regular Polygons of Coupled Microring Resonators," 46 Applied Optics Optical Society of America 31, Nov. 1, 2007, pp. 7730-7738.
Chuang, Physics of Optoelectronic Devices, Wiley, NY, 1995, 3 pages.
Daldosso et al. "Comparison Among Various Si3N4 Waveguide Geometries Grown within a CMOS Fabrication Pilot Line," 22 J. Lightwave Tech. Jul. 7, 2004, pp. 1734-1740.
Daldosso et al. "Fabrication and Optical Characterization of thin two-dimensional Si3N4 Waveguides," Mat. Sci. in Semicond. Proc. 7, 2004, pp. 453-458.
Darmawan et al. "Nested Ring Mach-Zender Interferometer," 15 Optics Express Opt. Soc. America 2, Jan. 2001, pp. 437-448.
DeVaux et al. "High-Speed Tandem of MQW Modulators for Coded Pulse Generation With 14-DB Fiber-to-Fiber Gain," 8 IEEE Photonics Tech. Lett. 2, Feb. 1996, pp. 218-220.
Dumon et al. "Low-loss photonic wires and compact ring resonators in silicon-on-insulator," 5450 Proc. SPIE 1, 2004, pp. 360-368.

(56) References Cited

OTHER PUBLICATIONS

Eichenfield et al. "Actuation of Micro-optomechanical Systems via Cavity-enhanced Optical Dipole Forces," 1 Nature Photonics 7, 2007, pp. 416-422.
Espinola et al. "Fast and Low-Power Thermooptic Switch on Thin Silicon-on-Insulator," 15 IEEE Photon. Tech. Lett. 10, 2003, pp. 1366-1368.
Fan et al. "Theoretical Analysis of Channel Drop Tunneling Processes," 59 Phys. Rev. B 2, Jun. 15, 1999, pp. 15882-15892.
Findakly et al. "On the Crosstalk of Reversed-$\Delta\beta$ Directional Coupler Switches," 6 J. of Lightwave Tech. 1, Jan. 1988, pp. 36-40.
Gheorma et al. "Fundamental Limitations of Optical Resonatory Based High-Speed EO Modulators," IEEE Photon. Tech. Lett. vol. 14, No. 6, 2002, pp. 795-797.
Green et al. "Ultra-compact, low RF power, 10 Gb/s silicon Mach-Zehnder modulator" Optics Express 15, 2007, 17106-17113.
Green et al. "Optical modulation using anti-crossing between paired amplitude and phase resonators," Optics Express 15, 2007, pp. 17264-17272.
Gritsenko et al. "Short-range order in non-stoichiometric amorphous silicon oxynitride and silicon-rich nitride," 297 J. Non-Crystalline Solids 1, Jan. 2002, pp. 96-101.
Gunn "CMOS Photonics for High-Speed Interconnects," IEEE Micro 26 (2), Mar./Apr. 2006, pp. 58-66.
Guo et al. "Characterization of Si3N4/SiO2 Planar Lightwave Circuits and Ring Resonators," Proc. of SPIE, vol. 5350, 2004, pp. 13-22.
Guo et al. "High-Q Microring Resonator for Biochemical Sensors," 5728 Proc. SPIE, 2005, pp. 83-92.
Gupta et al. "Cascaded Over- and Under-Coupled Resonators (COUR): Reducing Group Delay Dispersion and Overcoming the Sensitivity-Bandwidth Trade-off," Conf. on Lasers and Electro-Optics (CLEO), 2008, paper CTuNN5, pp. 1604-1605.
Haus et al. "Elimination of Cross Talk in Optical Directional Couplers," 46 Applied Physics Lett. 1, Jan. 1, 1985, pp. 1-3.
Haus, Waves and Fields in Optoelectronics, Prentice-Hall, Englewood Cliffs, NJ, 1984, 5 pages.
Holzwarth et al. "High Speed analog-to-digital conversion with silicon photonics," in Proc. SPIE 7220, 2009, 72200B, pp. 1-15.
Holzwarth et al. "Localized Substrate Removal Technique Enabling Strong-Confinement Microphotonics in Bulk Si CMOS Processes," CLEO/QELS, May 4-9, 2008, 2 pages.
In et al. "Origami Fabrication of Nanostructured, Three-dimensional Devices: Electrochemical Capacitors with Carbon Electrodes," Appl. Phys. Lett. 88, 2006, 83104, 3 pages.
Jackson, Classical Electrodynamics, Wiley, NY, 1999, 2 pages.
Johnson et al. "Perturbation Theory for Maxwell's Equations with Shifting Boundaries," Phys. Rev. E, 65, 2002, 066611, 7 pages.
Kelly et al. "Monolithic Suspended Optical Waveguides for InP MEMS," 16 IEEE Photonics Tech. Letters 5, 2004, pp. 1298-1300.
Khan et al. "Mode-Coupling Analysis of Multipole Symmetric Resonant Add/Drop Filters," 35 IEEE J. of Quantum Elec. 10, Oct. 1999, pp. 1451-1460.
Khurgin et al. "Expanding the Bandwidth of Slow-Light Photonic Devices Based on Coupled Resonators," 30 Optics Lett. 5, Mar. 1, 2005, pp. 513-515.
Kippenberg et al. "Analysis of Radiation-pressure Induced Mechanical Oscillation of an Optical Microcavity," Phys. Rev. Lett. 95, 2005, 033901, pp. 1-12.
Kogelnik et al. "Switched Directional Couplers with Alternating $\Delta\beta$," QE-12 IEEE J. Quantum Elec. 7, 1976, pp. 396-401.
Korotky "Three-Space Representation of Phase-Mismatch Switching in Coupled Two-State Optical System," QE-22 IEEE J. Quantum Elec. 6, 1986, pp. 952-958.
Li et al. "Coupled-ring-resonator-based silicon modulator for enhanced performance," Optics Express 16, 2008, pp. 13342-13348.
Little et al. "Filter Synthesis for Periodically Coupled Microring Resonators," 25 Optics Lett. 5, Mar. 1, 2000, pp. 344-346.
Little et al. "Very High-order Microring Resonator Filters for WDM Applications," 16 IEEE Photonics Tech. Lett. Oct. 10, 2004, pp. 2263-2265.
Liu et al. "Low-loss waveguide crossing using a multimode interference structure," 241 Optics Communications 1-3, 2004, pp. 99-104.
Maboudian et al. "Critical Review: Adhesion in Surface Micromechanical Structures," J. Vac. Sci. Tech. B, 15, 1997, pp. 1-20.
Madsen et al. "Hitless Reconfigurable Add/Drop Multiplexers using Bragg Gratings in Planar Waveguides," OSA TOPS, v. 29, WDM Components, 1999, pp. 54-60.
Madsen et al., Optical Filter Design and Analysis: A Signal Processing Approach, Wiley, NY, 1999, 18 pages.
Madsen "Efficient Architectures for Exactly Realizing Optical Filters with Optimum Bandpass Designs," 10 IEEE Photonics Tech. Lett. 8, Aug. 1998, pp. 1136-1138.
Manolatou et al. "Coupling of Modes Analysis of Resonant Channel Add-Drop Filters," 35 IEEE J. of Quantum Elec. 9, Sep. 1999, pp. 1322-1331.
Manolatou et al. "High-Density Integrated Optics," 17 J. Lightwave Tech. 9, Sep. 1999, pp. 1682-1692.
McDonald "Electric and Magnetic Coupling through Small Apertures in Shield Walls of any Thickness," MTT-20 IEEE Trans. on Microwave Theory & Techniques 10, Oct. 1972, pp. 689-695.
Melchiorri et al. "Propagation Losses of Silicon Nitride Waveguides in the Near Infrared Range," Appl. Phys. Lett. 86, 2005, 121111, 13 pages.
Melloni et al. "Synthesis of Direct-Coupled-Resonators Bandpass Filters for WDM Systems Lightwave Technology," 20 J. Lightwave Tech. 2, 2002, pp. 296-303.
Melloni et al. "Three-Arm Mach-Zehnder Interferometers," in Integrated Photonics Research and Applications/Nanophotonics, Technical Digest (CD), Optical Society of America, 2006, paper IMC1, 3 pages.
Mizrahi et al., "Mirror Manipulation by Attractive and Repulsive Forces of Guided Waves," Opt. Express 13, 2005, pp. 9804-9811.
Mizrahi et al. "Two Slab Optical Spring," Optics Lett. 32, 2007, pp. 692-694.
Nichol et al. "Thin Membrane Self-alignment using Nanomagnets for Three-dimensional Nanomanufacturing," J. Vac. Sci. Tech B (Microelectronics & Nanometer Structures) 24, 2006, pp. 3128-3132.
Nichols et al. "A Preliminary Communication on the Pressure of Heat and Light Radiation," Phys. Rev. 13, 1901, pp. 307-320.
Nielson et al. "Integrated Wavelength-selective Optical MEMS Switching using Ring Resonator Filters," IEEE Photonics Tech. Lett. 17, 2005, pp. 1190-1192.
Nielson, "Micro-opto-mechanical Switching and Tuning for Integrated Optical Systems," Ph.D. Thesis, Massachusetts Institute of Technology, 2004, 259 pages.
Notomi et al. "Optomechanical Wavelength and Energy Conversion in High-Q Double-layer Cavities of Photonic Crystal Slabs," Phys. Rev. Lett. 97, 2006, 023903, 4 pages.
Okamoto, Fundamentals of Optical Waveguides, Elsevier Academic Press, MA, 2006, 2 pages.
Papuchon et al. "Electrically switched Optical Directional Coupler: Cobra," 27 Applied Physics Lett. 5, Sep. 1, 1975, pp. 289-291.
Philipp et al. "Amorphous Silicon Rich Silicon Nitride Optical Waveguides for High Density Integrated Optics," 40 IEEE Electronics Letters 7, Apr. 2004, pp. 419-420.
Poon et al. "Wavelength-selective reflector based on a circular array of coupled microring resonators," 16 IEEE Photonics Technology Letters 5, May 2004, pp. 1331-1333.
Popovic et al. "General Approach to Hitless Switching and FSR Extension Resonators in Integrated Photonic Circuits," 2006 IEEE Optical Fiber Communication Conference and National Fiber Optic Engineers Conference, 2006, 3 pages.
Popovic et al. "High-index-contrast, Wide-FSR Microring-Resonator Filter Design and Realization with Frequency-shift Compensation," in Optical Fiber Communication Conf., Tech. Dig.,2005, Paper OFK1, vol. 5, pp. 213-215.
Popovic et al. "Multistage High-Order Microring-Resonator add-drop Filters," 31 Optics Lett. 17, Sep. 2006, pp. 2571-2573.

(56) References Cited

OTHER PUBLICATIONS

Popovic et al. "Coupling-induced resonance frequency shifts in coupled dielectric multicavity filters", Optics Express 14, Feb. 2006, pp. 1208-1222.
Popovic "Air Trenches for Dense Silica Integrated Optics," MS Thesis, Massachusetts Institute of Technology, Dept. of Electrical Engineering & Computer Science, Feb. 2002, pp. 1-135.
Popovic "Optimally efficient resonance-tuned optical modulators," in CLEO 2009, paper CTuV6, May 2009, 2 pages.
Popovic "Resonant optical modulators beyond conventional energy—efficiency and modulation frequency limitations," Integrated Photonics Research, Silicon and Nanophotonics (IPRSN), Monterey, CA, Jul. 25, 2010, 3 pages.
Popovic "Theory and Design of High-Index-Contrast Microphotonic Circuits," Ph.D. Thesis, Massachusetts Institute of Technology, Dept. of Electrical Engineering & Computer Science, Feb. 2008, 358 pages.
Popovic "Complex-Frequency Leaky Mode Computations using PML Boundary Layers for Dielectric Resonant Structures," Proc. of Integ. Photonics Res., Jun. 2003, 3 pages.
Povinelli et al. "Enhancement mechanisms for optical forces in integrated optics," Proc. of SPIE Optical Trapping & Optical Manip. III 15, vol. 6326, 2006, 632609, 8 pages.
Povinelli et al. "Evanescent-wave Bonding Between Optical Waveguides," Optics Lett. 30, 2005, pp. 3042-3044.
Povinelli et al. "High-Q Enhancement of Attractive and Repulsive Optical Forces between Coupled Whispering-gallery-mode Resonators," Opt. Express 13, 2005, pp. 8286-8295.
Preston et al. "High-Speed All-Optical Modulation Using Polycrystalline Silicon Microring Resonators," Applied Physics Letters, vol. 92, No. 15, Apr. 15, 2008, pp. 151104, 3 pages.
Qi et al. "A Three-dimensional Optical Photonic Crystal with Designed Point Defects," Nature 429, 2004, pp. 538-542.
Rabiei et al. "Polymer Micro-Ring Filters and Modulators," J. Lightwave Tech. vol. 20, No. 11, 2002, pp. 1968-1975.
Rakich et al. "Achieving Centimeter-scale supercollimation in a Large-area Two-dimensional Photonic Crystal," Nature Materials 5, 2006, pp. 93-96.
Rakich et al. "Cavity-Trapping via Optical-forces in Integrated Photonics," Massachusetts Institute of Technology, Research Laboratory of Electronics, 2006, 18 pages.
Rakich et al. "Trapping, corraling and spectral bonding of optical resonances through optically induced potentials," Nature Photonics, vol. 1, Nov. 2007, pp. 658-665.
Rakich et al. "Ultrawide Tuning of Photonic Microcavities via Evanescent Field Perturbation," Optics Lett. 31, 2006, pp. 1241-1243.
Rezzonico et al. "Electro-optic Charon polymeric microring modulators," Optics Express 16, 2008, pp. 613-627.
Rhodes "A Low-Pass Filter Prototype Network for Microwave Linear Phase Filters," MTT-18 IEEE Trans. Microwave Theory Tech. 6, Jun. 1970, pp. 290-301.
Sacher et al. "Dynamics of microring resonator modulators," Optics Express 16, 2008, pp. 15741-15753.
Sarid, Scanning Force Microscopy with Applications to Electric, Magnetic, and Atomi Forces, Oxford University Press, NY, 1994., 2 pages.
Saynatjoki et al. "High-index-contrast Optical Waveguides on Silicon," ICPS-27, 2005, 2 pages.
Song et al. "Ultra-high-Q Photonic Double-heterostructure Nanocavity," Nature Materials 4, 2005, pp. 207-210.
Spector et al. "Hybrid multi-mode/single-mode Waveguides for Low Loss," Massachusetts Institute of Technology, OAA/IPR, 2004, 3 pages.
Srinivasan et al. "Alkyltrichlorosilane-based Self-assembled Monolayer Films for Stiction Reduction in Silicon Micromachines," J. of Microelectromechanical Sys. 7, 1998, pp. 252-260.
Sugimoto et al. "Waveguide polarization-independent Optical Circulator," 11 IEEE Photon. Tech. Lett. 3, Mar. 1999, pp. 355-357.
Suh et al. "Temporal Coupled-Mode Theory and the Presence of Non-Orthogonal Modes in Lossless Multimode Cavities," 40 IEEE J. of Quantum Elec. 10, Oct. 2004, pp. 1511-1518.
Tang et al. Highly efficient optical phase modulator in SOI waveguides, 31 Electronics Letters 6, 1995, pp. 451-452.
Tormen "Passive Optical Integrated Components for Telecommunication," Thesis, Universite De Nice-Sophia Antipolis, 2003, 196 pages.
Van Spengen et al. "A Physical Model to Predict Stiction in MEMS," J. of Micromechanics & Microengineering 12, 2002, pp. 702-713.
Watts et al. "Maximally Confined Silicon Microphotonic Modulators and Switches," IEEE Proc. of the LEOS Ann. Meet., p paper WF1, 2008, pp. 457-458.
Williamson "Sensitivity-bandwidth product for electro-optic modulators," Optics Letters 26, 2001, pp. 1362-1363.
Xu et al. "Experimental Realization of an on-Chip All-Optical Analogue to Electromagnetically Induced Transparency," Phys. Rev. Lett. 96, 2006, pp. 1-4.
Xu et al. "Micrometre-scale silicon electro-optic modulator," Nature, vol. 435, 2005, pp. 325-327.
Yanik et al. "Stopping Light All Optically," 92 Phy. Rev. Lett. 8, Feb. 27, 2004, pp. 1-4.
Yariv et al. "Coupled-Resonator Optical Waveguide: a Proposal and Analysis," 24 Optics Lett. 11, Jun. 1, 1999, pp. 711-713.
Examination Report in European Patent Application No. 04786154.7, mailed Jul. 16, 2008, 3 pages.
International Search Report for PCT Application No. PCT/US06/028848, mailed Feb. 7, 2008, 3 pages.
Written Opinion for PCT Application No. PCT/US06/028848, mailed Feb. 7, 2008, 7 pages.
International Search Report for PCT Application No. PCT/US2007/026513, mailed Jun. 19, 2008, 2 pages.
Written Opinion for PCT Application No. PCT/US2007/026513, mailed Jun. 19, 2008, 10 pages.
International Search Report for PCT Patent Application No. PCT/US2007/018207, mailed Jul. 29, 2008, 5 pages.
Written Opinion for PCT Patent Application No. PCT/US2007/018207, mailed Jul. 29, 2008, 8 pages.
International Search Report for PCT Application No. PCT/US2005/043762, mailed Jun. 19, 2008, 3 pages.
Written Opinion for PCT Application No. PCT/US2005/043762, mailed Jun. 19, 2008, 6 pages.
International Search Report for PCT Application No. PCT/US2007/015740, dated Feb. 18, 2008, 3 pages.
Written Opinion for PCT Application No. PCT/US2007/015740, dated Feb. 18, 2008, 6 pages.
International Search Report for PCT Application No. PCT/US2008/003300, mailed Oct. 14, 2008, 6 pages.
Written Opinion for PCT Application No. PCT/US2008/003300, mailed Oct. 14, 2008, 10 pages.
International Search Report for PCT Application No. PCT/US2008/080749, dated May 25, 2009, 5 pages.
Written Opinion for PCT Application No. PCT/US2008/080749 dated May 25, 2009, 9 pages.
International Search Report for PCT Application No. PCT/US2008/082054, dated Mar. 18, 2009, 2 pages.
Written Opinion for PCT Application No. PCT/US2008/082054, dated Mar. 18, 2009., 6 pages.
International Search Report for PCT Application No. PCT/US2009/041668, mailed Sep. 11, 2009, 3 pages.
Written Opinion for PCT Application No. PCT/US2009/041668, mailed Sep. 11, 2009, 5 pages.
International Search Report for PCT Application No. PCT/US2009/066537, mailed Apr. 16, 2010, 3 pages.
Written Opinion for PCT Application No. PCT/US2009/066537, mailed Apr. 16, 2010, 9 pages.
International Search Report for PCT Application No. PCT/US2010/036630, mailed Sep. 15, 2010, 3 pages.
Written Opinion for PCT Application No. PCT/US2010/036630, mailed Sep. 15, 2010, 4 pages.

* cited by examiner

|   | FSR DOUBLING/ ENLARGEMENT | HITLESS SWITCHING |
|---|---|---|
| N | N > 1 (N = 2 OPTIMUM) | N = 1 ONLY |
| M | M RELATIVELY PRIME NUMBER WITH RESPECT TO N | M POSITIVE INTEGER (ALWAYS A MULTIPLE OF N = 1) |
| L |   | L NON-NEGATIVE INTEGER (L = M - 1) |

FIG. 8

FILTER OFF

FILTER OFF
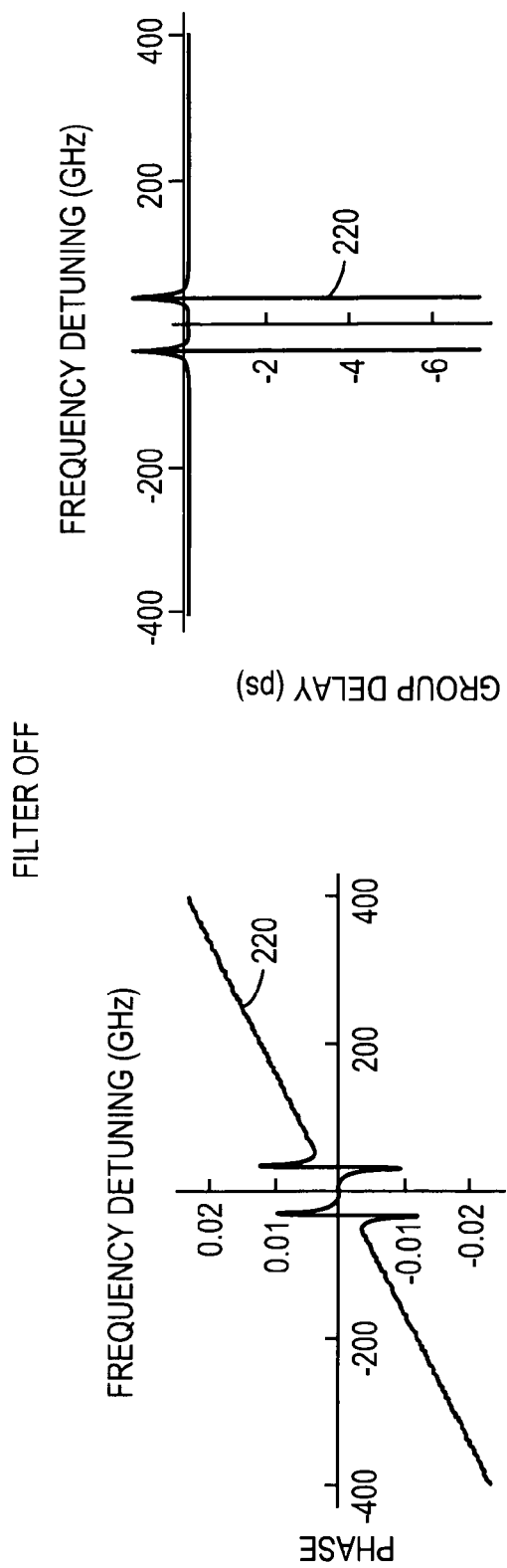
FIG. 25C
FIG. 25D
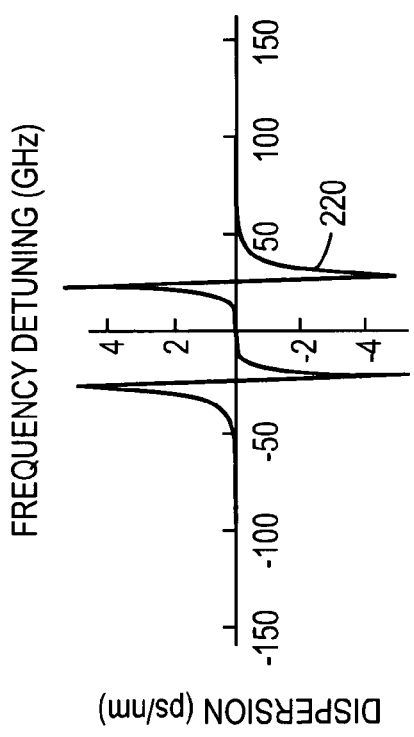
FIG. 25E

FILTER ON

FILTER OFF

FILTER ON

FILTER OFF

HITLESS TUNING AND SWITCHING OF OPTICAL RESONATOR AMPLITUDE AND PHASE RESPONSES

CROSS-REFERENCE TO RELATED APPLICATION

This application is the U.S. national stage of International (PCT) Patent Application No. PCT/US2008/003957, filed Mar. 26, 2008, which claims priority to and the benefit of U.S. Provisional Patent Application No. 60/920,339, which was filed on Mar. 26, 2007. The entire disclosures of these two applications are incorporated herein by reference in their entireties.

TECHNICAL FIELD

In various embodiments, the invention relates to optical resonant structures that enable hitless switching and wavelength tuning (i.e., disabling of both the amplitude and phase response of the resonant structure during tuning) and to methods for accomplishing such hitless switching and wavelength tuning.

BACKGROUND

In wavelength-division-multiplexed (WDM) networks, dynamic reconfigurability of channel add-drop filters may be important. Reconfigurable optical add-drop multiplexers (R-OADMs) include channel add-drop filters that can discontinue dropping and/or adding a particular wavelength channel, tune the filter center wavelength to a new wavelength channel, and begin dropping data on the new wavelength channel. This operation is preferably hitless, which means that the entire reconfiguration, including disabling the filter at a first wavelength, tuning to a second wavelength, and re-enabling the filter at a new wavelength, occurs without substantial signal distortion and preferably with no bit errors in any of the wavelength channels other than those at the first and the second wavelengths (which are in any case disturbed because their transmission path is reconfigured by the operation). Channel add-drop filters capable of reconfiguring in a hitless manner are called hitless tunable, or hitless switchable.

Previous approaches to hitless tuning of integrated channel add-drop filters typically use either bypass interferometers or resonance-frequency misalignment in resonant filters. Bypass interferometers, for example, reroute the entire optical spectrum of interest in a second path, around the filter, while the filter is reconfigured to a new wavelength. These schemes typically require the actuation of a pair of optical switches in synchronization, which is a challenge for control. They are also not entirely hitless when the filter being bypassed contributes substantial out-of-band dispersion in the through port. In this case, there may be, during the switching operation, a temporary loss on the order of 1 dB or more induced in the channels adjacent to the wavelength channel being switched. Typically, these structures are also sizeable as they add an interferometer structure around the filter device, which makes them suitable only for limited replication.

High-order coupled-resonator filters, including microring resonator filters, are a promising technology for channel add-drop filters. A second approach to hitless switching, used with coupled-resonator filters, is to detune the cavities from each other, thus breaking the resonant condition required for channel-dropping operation. As a result, the channel-dropping passband of the filter, present when all cavities are aligned to the center wavelength, is disabled to a level where a very small amount of residual power is dropped (e.g., −30 dB) and most power passes in the through port. At this point, the resonators are tuned to a new wavelength. They are then brought back into alignment at a common resonance frequency to reconstitute a passband at the new wavelength, and begin dropping data on the new channel.

This approach has been used in thin-film filters, as well as in integrated optical microring resonators. On such integrated optical microring resonator 10, which includes two ring resonators 12, 14, is depicted in FIG. 1, while its switching performance 20 is depicted in FIG. 2. More specifically, FIG. 2 shows the passband amplitude of the microring resonator 10 diminished at one wavelength by the mismatching of the resonance frequencies of the two ring resonators 12, 14, the turned off microring resonator 10 tuned to a new, 1 nm longer wavelength, and the passband subsequently reconstituted at a second wavelength by matching the ring 12, 14 resonant frequencies again.

There is, however, a fundamental drawback in this approach of detuning cavities. While the drop-port amplitude response may be diminished by mismatching the resonance frequencies and the through port response recovered to substantially full transmission, the same does not hold true for the phase response. In particular, in a higher-order filter, there is typically at least one resonant cavity that is coupled to the input waveguide. If detuned so that there is no power passed to other resonators, such a cavity will act as an allpass filter in the through port. Furthermore, the coupling coefficient between the input port and the first cavity of a higher-order flat-top filter, as typically used in WDM systems, makes the bandwidth of the cavity match the desired passband width. This, in turn, sets the group delay at center wavelength of the allpass filter to about the inverse of the bandwidth, which is comparable to a bit slot of the maximum bitrate transmissible through such a filter. Therefore, the dispersion of such an allpass filter may be substantial and cause bit errors. A preferable solution would turn off both the amplitude and the phase response of a filter.

One way to turn off the amplitude and phase response of a filter is by introducing loss into a cavity. Consider, for example, a resonator coupled to an input port that has an associated internal quality factor (i.e., internal Q (or loss Q), labeled $Q_o$) describing the losses in the cavity, and a second external quality factor (i.e., external Q, labeled $Q_e$) defined as the quality factor associated with the decay of energy into the input port only. Then, the resonant filter is substantially turned off in both amplitude and phase response, in both the through and any drop ports, when the round-trip losses (including coupling of light to any output ports except the input port) are much higher than the power coupled to the input port in a pass (i.e., $Q_o \ll Q_e$).

While this approach disables both the amplitude and phase response, it has at least two drawbacks. First, the energy coupled into the resonator in the first pass is lost to the cavity loss mechanism, and thus the approach causes a finite loss that is larger in lower finesse designs, i.e., where the free spectral range (FSR) of the cavity is smaller for a given passband width. For example, in typical $3^{rd}$ to $4^{th}$-order filters with a 40 GHz passband and 2-3 THz FSR, the input coupling for a flat-top filter is on the order of 10%. Thus, in using this approach of introducing loss to quench the resonance, a broadband 10% loss is incurred across the spectrum, as the light entering on first pass is lost. Second, for high fidelity (low loss) on-state operation, it is typically necessary that the loss Q of the cavities be 10 to 100 times larger than the external Q, or than the loaded Q of the structure. On the other hand, for the resonance to be substantially turned off, the loss Q is typically required to be about 100 to 10000 times smaller than the external Q. Therefore, for good performance, it is typically necessary to vary the cavity loss by 30-40 dB between the on-state and off-state, which is a challenging prospect.

Another approach to disable the resonant response is to reduce waveguide coupling to the cavity to zero by moving the waveguides away from the resonator. This micromechanical approach typically requires considerable fabrication complexity using microelectromechanical systems (MEMS), which may also negatively affect the optimization of the optical waveguides and resonators. There is also a functional disadvantage in decoupling all waveguides from the cavity. For a well-performing on-state, the cavity round-trip loss must be much lower than the waveguide-ring coupling (i.e., $Q_o >> Q_e$). Suppose first that the cavity is lossless. If the waveguides are symmetrically decoupled, the resonator remains critically coupled and transfers all power on resonance over narrower and narrower bandwidths, with greater and greater group delay and dispersion. In practice, an asymmetry will cause either a minimum-phase through port transmission with no dispersion if the input coupling is weaker, or an allpass filter response with maximum dispersion in the through port, if the input coupling is stronger. Or, the cavity loss will dominate the coupling once the latter is made weak enough, and appropriately turn off the resonant response. However, if the loss is low, then the input coupling must typically be switched by a large contrast (30-40 dB) between its value in the on state and the required off state. Such large switching contrasts are a challenge for both switch design and reliable realization in fabrication technology. In the MEMS case, they typically require larger motion of the waveguides, and larger actuation voltages.

Referring now to FIGS. 3 and 4, a Mach-Zehnder interferometer waveguide-ring coupling 31 has been used in the past to extend the effective FSR of a resonator 30 by providing a Mach-Zehnder arm length difference equal to half the ring 32 circumference. For example, in FIG. 4, the Mach-Zehnder coupler 31 illustrated at the top of the figure has a first arm (i.e., the upper most arm in FIG. 4) between coupling points $K_2$, $K_2$ of length $2l_2$, a second arm (i.e., the top half of ring 32) again between coupling points $K_2$, $K_2$ of length $l_2$, and, as such, an arm length difference of $2l_2 - l_2 = l_2$. As illustrated, the ring 32 circumference is equal to $2l_2$. In such devices 30, resonances adjacent to a resonance of interest are suppressed, thereby doubling the effective FSR.

With reference to FIG. 5, an alternative, or complementary, way to extend the FSR is the standard Vernier approach 50, where rings 52, 54 of different radii are used. This latter approach typically suffers from substantial through-port 56 dispersion at suppressed passbands near the resonance frequency of the resonator coupled to the input waveguide 58, much like the hitless tuning approach depicted in FIG. 1. FIG. 6 illustrates the spectral response 60 of a filter that employs the scheme 50 depicted in FIG. 5.

With reference to the higher-order resonant filter 70 depicted in FIG. 7, Mach-Zehnder interferometers have also been used as a wavelength-dependent loss mechanism in ring resonators in order to increase the resonator FSR. These structures 70, if used as add-drop filters, typically suffer intolerable through-port 72 dispersion in the same way as the structure 50 depicted in FIG. 5.

With reference again to FIGS. 3 and 4, a ring resonator with a Mach-Zehnder 2-point coupler has been described, for the purposes of doubling or multiplying the effective FSR of a ring resonator, in Barbarossa, Giovanni, et al., "Theoretical Analysis of Triple-Coupler Ring-Based Optical Guided-Wave Resonator," Journal of Lightwave Technology, Vol. 13, No. 2, February 1995 (hereinafter "Barbarossa"), the contents of which are incorporated herein by reference in their entirety. For proper operation, and with reference for example to FIG. 3, equation (2) in Barbarossa and its accompanying description requires a particular relationship between i) the round trip length of the ring 32 (i.e., a first closed path) and ii) the round trip length of a second closed path formed by the longer Mach-Zehnder arm ($l_2$ in Barbarossa and in FIG. 3) and the half of the ring that is not within the Mach-Zehnder interferometer ($l_3 + l_4$ in Barbarossa and in FIG. 3). The required relationship is that the length and thus the FSR of these first and second paths be $$N \cdot FSR1 = M \cdot FSR2 \qquad (1)$$

where N and M must be relatively prime non-negative integers, i.e., integer numbers where neither divides evenly into the other. In particular, N=2 is an optimum solution for solving the FSR doubling problem. However, this configuration illustrated in FIGS. 3 and 4, which calls for relatively prime N and M, as described in Barbarossa, is not suitable for achieving hitless switching.

SUMMARY OF THE INVENTION

The general criteria for achieving hitless tunable resonant structures is to permit: i) the economical disabling and re-enabling of the amplitude and phase response of the resonant structure in the optical response of its through port and drop port(s) relative to an input port; and ii) wavelength tuning of the structure's responses—in the off state—to any center wavelength within an operating wavelength range. The operating wavelength range may be one or more FSRs of the resonant structure.

In various embodiments, the present invention pertains to a hitless tunable filter. In one embodiment, the hitless tunable filter includes a ring resonator, a Mach-Zehnder coupler, and first and second phase shifters, which may each be heater elements. The Mach-Zehnder coupler includes a switching arm that is coupled to the ring resonator at first and second coupling points. The first phase shifter may be used to introduce a first phase shift to light propagating through the ring resonator and thereby tune the filter, while the second phase shifter may be used to introduce a second phase shift to light propagating through the Mach-Zehnder coupler and thereby switch the filter on at a desired target channel wavelength. The phase shifters may be operated independently from one another, or dependently, to achieve these means. In one embodiment, the Mach-Zehnder coupler has a free spectral range substantially equal to a free spectral range of the ring resonator divided by a non-negative integer.

In some embodiments, to achieve hitless switching, the configurations described herein: i) include a variable Mach-Zehnder coupler that, in the on state, is described by equation (1) above, but ii) have the opposite configuration from that in Barbarossa, i.e., M is a multiple of N and is not relatively prime with it. In particular, hitless switching of resonances may be performed by a configuration having N=1, and arbitrary positive integer M. The configurations described by Barbarossa, with N>1 and M relatively prime with respect to N, extend the FSR of a resonator. On the other hand, the operation of the hitless configurations, with N=1 and M any positive integer (never relatively prime with respect to N by definition since N=1 divides evenly into every M), does not change the FSR. In one embodiment of the hitless configurations, the Mach-Zehnder variable input coupler, in a first state, enables substantially all resonances of the resonator, while, in a second state, the Mach-Zehnder variable input coupler disables substantially all resonances of the resonator (within an operating wavelength range comprising several FSRs of the resonator).

In particular, the configurations of N and M suitable for FSR doubling, as described in the literature with reference to FIGS. 3 and 4, and the configurations of N and M suitable for solving the hitless tuning problem of resonant structures, are mutually exclusive sets of numbers (N, M) having no common elements, as illustrated in the table 75 depicted in FIG. 8. The integer L, used with reference to the hitless tunable devices described herein to describe the relationship of the variable input coupler FSR to the ring FSR, is related to the integer M by: L=M−1. Therefore, for hitless tunable structures, the suitable configurations have N=1 and L a non-negative integer (0, 1, 2, . . . ), as will be described below.

In one embodiment, an additional fixed 180° phase shift is provided in the Mach-Zehnder arm of the hitless tunable filters described herein, for example by inserting an additional half-guided-wave length of waveguide (at the filter operating center wavelength). This places the filter in the off state by default, with all phase shifters (e.g., heaters for thermooptic tuning) turned off. Then, switching on any channel is achieved by tuning the ring and Mach-Zehnder switching arm substantially simultaneously to the desired channel wavelength, in the off state, within the filter FSR.

In accordance with embodiments of the invention, the functional crosstalk between the tuning and switching operations may be mitigated in order to reduce power use and/or simplify control. For example, the tuning actuation may be applied to the ring resonator only in an area where the ring waveguide is not part of the input coupler Mach-Zehnder interference path. Alternatively, the entire ring may be actuated during tuning, together with a section of waveguide in the switching arm of the Mach-Zehnder coupler, in a fashion that does not substantially wavelength shift the spectral response of the coupling ratio of the Mach-Zehnder variable input coupler. In yet another embodiment, a first phase-shifter (e.g., a first heater) tunes the resonant wavelength of the entire structure, and a second phase-shifter (e.g., a second heater) independently switches the filter between the on and off states. In one embodiment, this simplifies control at the expense of consuming slightly more heater power.

In various embodiments, the present invention also features higher-order filters that include a plurality of resonators (or cavities). Such higher-order filters may include both a variable waveguide input coupling and an artificial, controllable loss mechanism introduced into at least one cavity in the system. Such designs may reduce the switching contrast required in the variable loss mechanism, or the variable waveguide input coupling, in order to achieve high fidelity hitless switching.

In general, in one aspect, the invention features a hitless tunable filter. The filter includes a ring resonator, a Mach-Zehnder coupler, and first and second phase shifters. The Mach-Zehnder coupler includes a switching arm that is coupled to the ring resonator at first and second coupling points. The first phase shifter may be used to introduce a first phase shift to light propagating through the ring resonator, while the second phase shifter may be used to introduce a second phase shift to light propagating through the Mach-Zehnder coupler. The Mach-Zehnder coupler may have a free spectral range substantially equal to a free spectral range of the ring resonator divided by a non-negative integer.

In one embodiment, the free spectral range of the Mach Zehnder coupler is substantially equal to the free spectral range of the ring resonator. Alternatively, the free spectral range of the Mach-Zehnder coupler is infinite. The filter may further include a drop waveguide coupled to the ring resonator, while the Mach-Zehnder coupler may be configured to introduce a phase shift of approximately 180° to the light propagating therethrough in addition to the second phase shift introduced by the second phase shifter.

The ring resonator and the Mach-Zehnder coupler may share a waveguide section between the first and second coupling points. In one embodiment, the first phase shifter is located at a point proximate to the ring resonator and away from the shared waveguide section. For its part, the second phase shifter may be located at a point proximate to the Mach-Zehnder switching arm and away from the shared waveguide section. In another embodiment, a third phase shifter is located at a point proximate to the shared waveguide section. A fourth phase shifter may also be employed, and it may be located at a point proximate to the Mach-Zehnder switching arm and away from the shared waveguide section.

The first and second phase shifters may each include a heater element. The first phase shifter may be thermooptically coupled to, for example: i) a portion of the ring resonator other than the shared waveguide section; ii) the entire ring resonator and to a portion of the Mach-Zehnder switching arm located proximate to the shared waveguide section; iii) a portion of the ring resonator other than the shared waveguide section and to the Mach-Zehnder switching arm; or iv) the entire ring resonator and to the entire Mach-Zehnder switching arm. In any of these cases, the second phase shifter may be thermooptically coupled to the Mach-Zehnder switching arm.

In general, in another aspect, the invention features a hitless tunable higher-order filter. The filter includes a plurality of ring resonators (each of which is coupled to another ring resonator), first and second variable Mach-Zehnder couplers, and a drop waveguide coupled to at least one of the plurality of ring resonators. The first variable Mach-Zehnder coupler is coupled to a first ring resonator and provides an input mechanism, while the second variable Mach-Zehnder coupler is coupled to a second ring resonator and provides a loss mechanism.

In one embodiment, the first ring resonator and the second ring resonator are the same resonator (i.e., the first and second variable Mach-Zehnder couplers are coupled to the same ring resonator). The drop waveguide may be, for example, a third variable Mach-Zehnder coupler. In such a case, at least one of the first variable Mach-Zehnder coupler and the third variable Mach-Zehnder coupler may be configured to introduce a phase shift of approximately 180° to light propagating therethrough.

In general, in yet another aspect, the invention features a method for switching a hitless tunable filter from a first state to a second state. The method includes providing a hitless tunable filter that includes a ring resonator, a first heater element for heating at least the ring resonator, a Mach-Zehnder coupler having a switching arm coupled to the ring resonator at first and second coupling points, and a second heater element for heating at least the Mach-Zehnder switching arm. The method further includes actuating the first heater element and the second heater element substantially simultaneously to tune the filter to a desired target channel wavelength, and switching the filter on at the desired target channel wavelength by further actuating the second heater element.

In one embodiment, the second heater element is actuated, in switching the filter on, to increase its temperature output and thereby add a phase shift of approximately 180° to light propagating through the Mach-Zehnder coupler. This may occur if, for example, the filter is to be tuned to a desired target channel wavelength that is less than one-half the free spectral range of the ring resonator away from the filter's wavelength when both the first and second heater elements are shut off. In another embodiment, the second heater element is actuated, in switching the filter on, to decrease its temperature output and thereby subtract a phase shift of approximately 180° from light propagating through the Mach-Zehnder coupler. This may occur if, for example, the filter is to be tuned to a desired target channel wavelength that is more than one-half the free spectral range of the ring resonator away from the filter's wavelength when both the first and second heater elements are shut off.

In yet another embodiment, the filter is switched off at the desired target channel wavelength prior to tuning the filter to the desired target channel wavelength. The filter may be shut off by actuating the second heater to decrease its temperature output and thereby subtract a phase shift of approximately 180° from light propagating through the Mach-Zehnder coupler. This may occur if, for example, the filter is less than one-half the free spectral range of the ring resonator away from the filter's wavelength when both the first and second heater elements are shut off. Alternatively, the filter may be shut off by actuating the second heater to increase its temperature output and thereby add a phase shift of approximately 180° to light propagating through the Mach-Zehnder coupler. This may occur if, for example, the filter is more than one-half the free spectral range of the ring resonator away from the filter's wavelength when both the first and second heater elements are shut off.

In general, in still another aspect, the invention features a method for switching a hitless tunable filter from a first state to a second state. The method includes providing a hitless tunable filter that includes a ring resonator, a Mach-Zehnder coupler having a switching arm coupled to the ring resonator at first and second coupling points, a first heater element for heating at least the ring resonator and the Mach-Zehnder switching arm, and a second heater element for heating the Mach-Zehnder switching arm. The method further includes actuating the first heater element to tune the filter to a desired target channel wavelength, and switching the filter on at the desired target channel wavelength by actuating the second heater element.

These and other objects, along with advantages and features of the invention, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments and implementations are described with reference to the following drawings, in which:

FIG. 8 is a table illustrating the mutually exclusive sets of configurations of a ring resonator and Mach-Zehnder interferometer suitable for FSR doubling applications in the prior art, as illustrated in FIGS. 3 and 4, and for hitless tuning in accordance with embodiments of the invention;

FIG. 25c illustrates the off-state through port phase response of the hitless switchable/tunable filter depicted in FIG. 24;

FIG. 25d illustrates the off-state through port group delay response of the hitless switchable/tunable filter depicted in FIG. 24;

FIG. 25e illustrates the off-state through port dispersion response of the hitless switchable/tunable filter depicted in FIG. 24;

FIG. 27a illustrates the on-state through port magnitude response of the hitless switchable/tunable filter depicted in FIG. 26a;

FIG. 27b illustrates the on-state through and drop port magnitude responses of the hitless switchable/tunable filter depicted in FIG. 26a;

FIG. 27c illustrates the on-state drop port phase response (which is substantially identical to the on-state through port phase response) of the hitless switchable/tunable filter depicted in FIG. 26a;

FIG. 27d illustrates the on-state through and drop port group delay responses of the hitless switchable/tunable filter depicted in FIG. 26a;

FIG. 27e illustrates the on-state drop port dispersion response (which is substantially identical to the on-state through port dispersion response) of the hitless switchable/tunable filter depicted in FIG. 26a;

FIG. 27f illustrates the off-state through port magnitude response of the hitless switchable/tunable filter depicted in FIG. 26a;

FIG. 27g illustrates the off-state through and drop port magnitude responses of the hitless switchable/tunable filter depicted in FIG. 26a;

FIG. 27h illustrates the off-state through port phase response of the hitless switchable/tunable filter depicted in FIG. 26a;

DESCRIPTION

The present invention relates, in various embodiments, to optical resonant structures that enable hitless switching and wavelength tuning. This permits, in various embodiments, R-OADMs and wavelength switches to operate on wavelength-division multiplexed networks without bit errors during reconfiguration.

In various embodiments, the hitless tunable device designs described herein include a variable input coupling to an input waveguide, which may be achieved by control of the waveguide-ring coupling field configurations and phase relationships. The designs may also include a variable loss mechanism on at least one cavity, and may further include a variable output coupling to an output (drop-port) waveguide. The variable input coupling, variable output coupling, and variable cavity loss mechanism may each be implemented with, for example, a Mach-Zehnder interferometer having: i) 50% or less coupling per coupler; ii) a difference in arm lengths that provides an FSR substantially equal to the FSR of the cavity to which it is attached divided by any non-negative integer, L=0, 1, 2, 3 . . . ; and iii) a phase shift that may be 0° or 180° to place the cavity to which the Mach-Zehnder interferometer is coupled in an off-state or on-state, respectively, by default when phase shifters are not actuated. In many embodiments, the Mach-Zehnder variable couplers use orders L=0 or L=1. In one embodiment, the hitless tuning relies on the substantially simultaneous control of at least two phase shifters. Higher-order filters may be switched with a loss mechanism placed according to Mach-Zehnder FSR and supermode amplitude in the various cavities.

Figure 1:
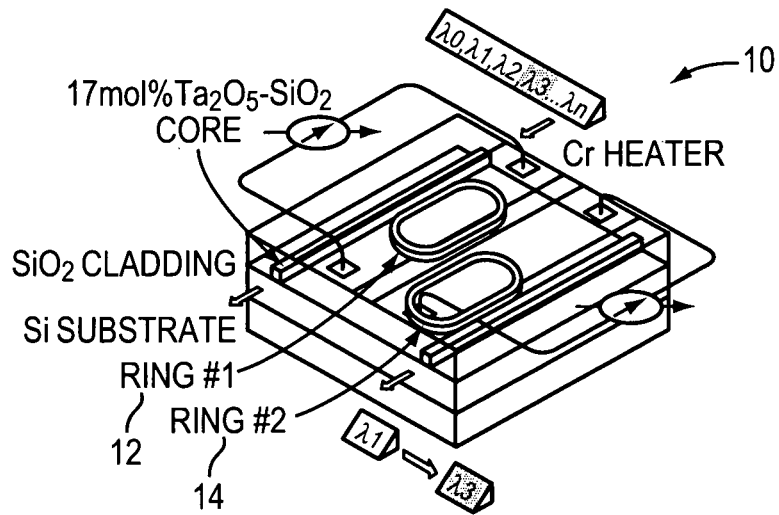
FIG. 1 illustrates a hitless tuning microring resonator filter according to one embodiment of the prior art.
Figure 2:
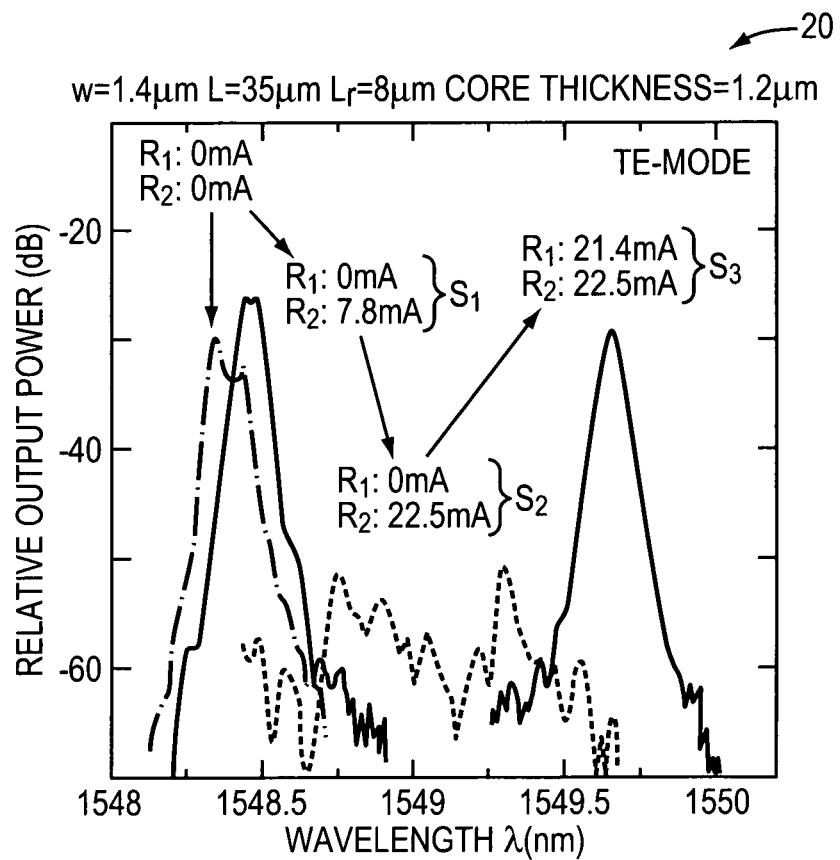
FIG. 2 illustrates the spectral response and switching characteristics of the filter depicted in FIG. 1.
Figure 3:
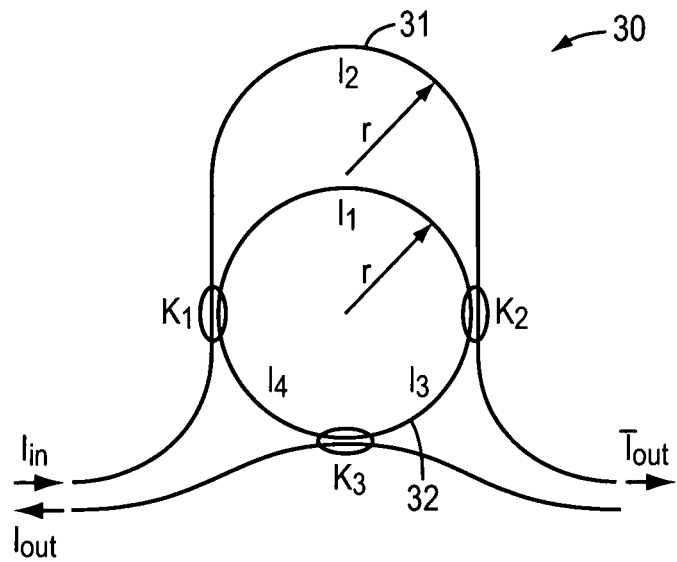
FIG. 3 illustrates an FSR doubling single-ring filter that includes a two-point coupler according to one embodiment of the prior art.
Figure 4:
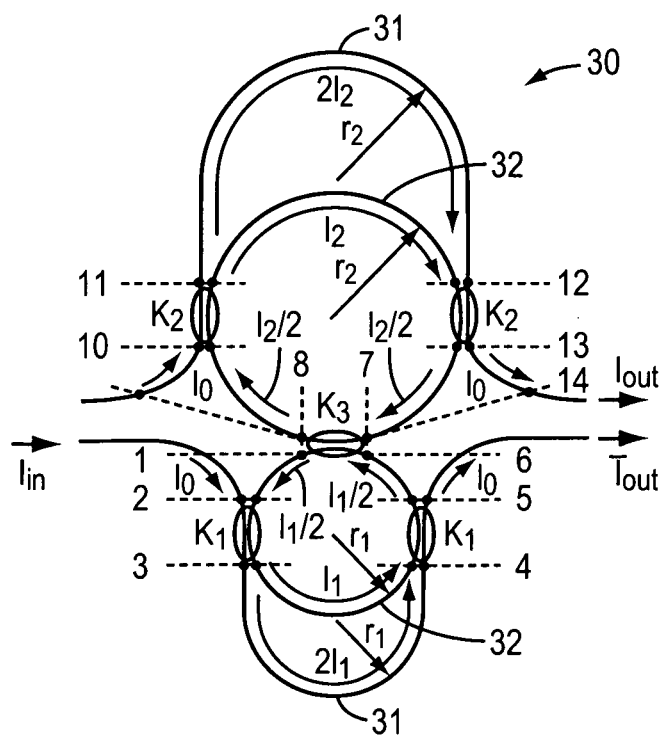
FIG. 4 illustrates a Vernier configuration of a second-order filter that includes the resonator depicted in FIG. 3, according to one embodiment of the prior art.
Figure 5:
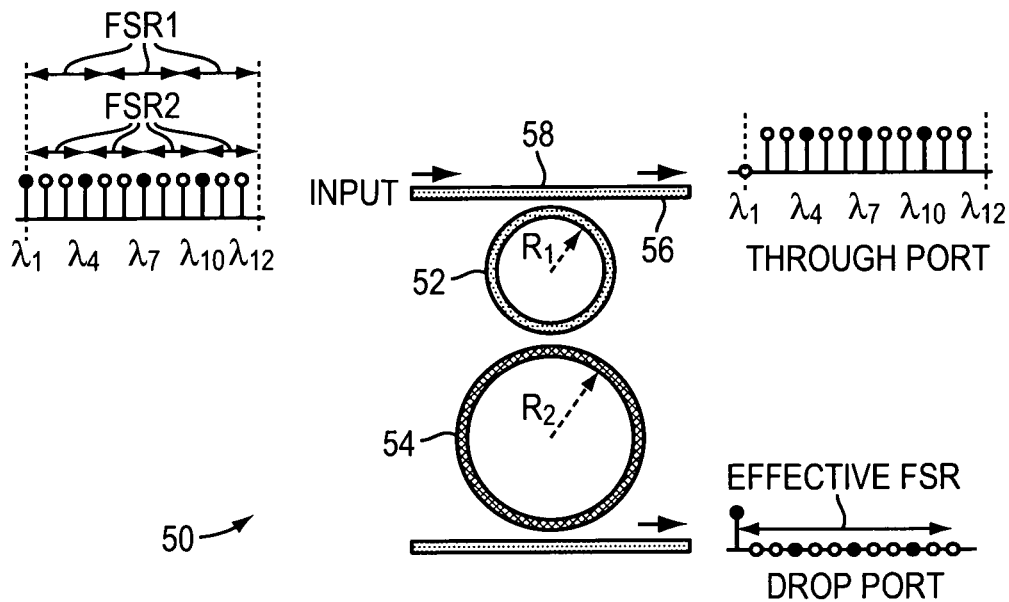
FIG. 5 illustrates a Vernier scheme for extending the effective FSR of a resonant filter according to one embodiment of the prior art.
Figure 6:
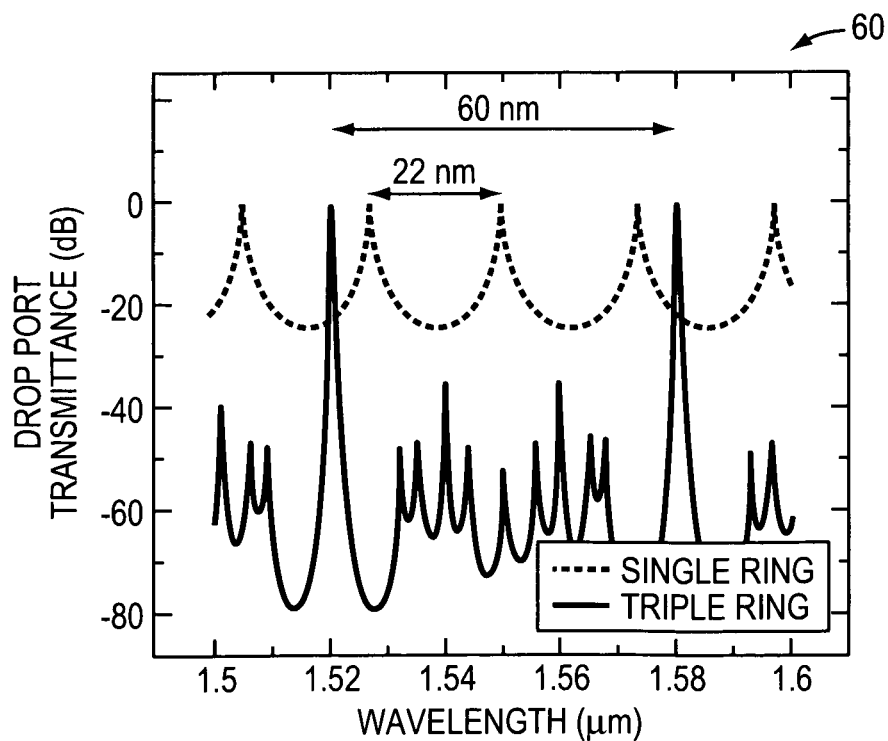
FIG. 6 illustrates the spectral response of a filter employing the scheme depicted in FIG. 5, according to one embodiment of the prior art.
Figure 7:
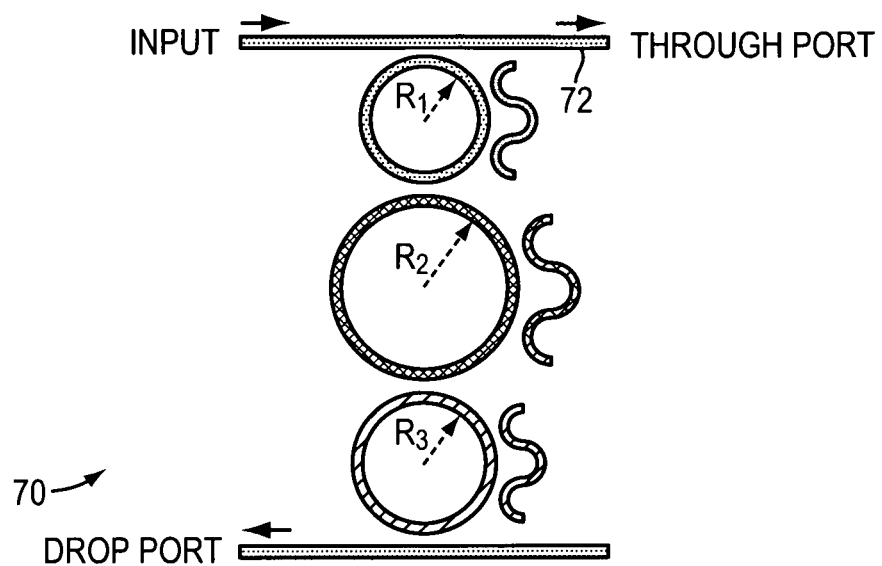
FIG. 7 illustrates a higher-order resonant filter having an extended free spectral range and that incorporates Mach-Zehnder interferometers of appropriate length, according to one embodiment of the prior art.
Figure 9A:
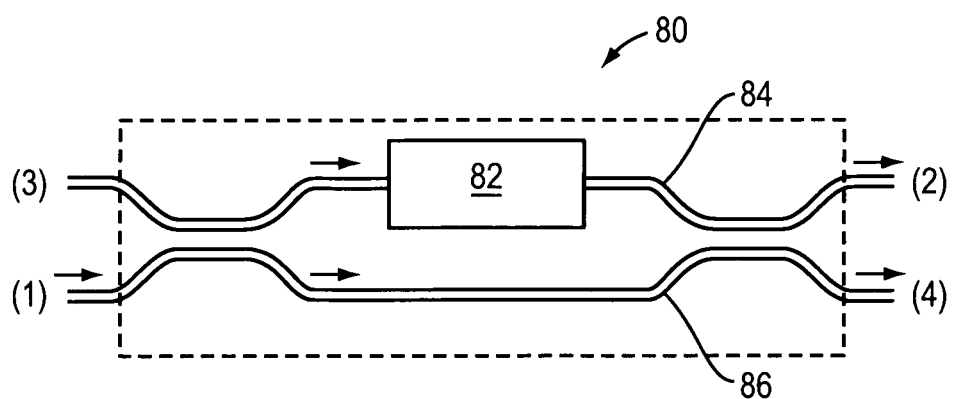
FIG. 9a illustrates a balanced Mach-Zehnder interferometer with a variable phase shifter, which may serve as a coupler with a broadband, variable coupling ratio for exciting resonant structures.
Figure 9B:
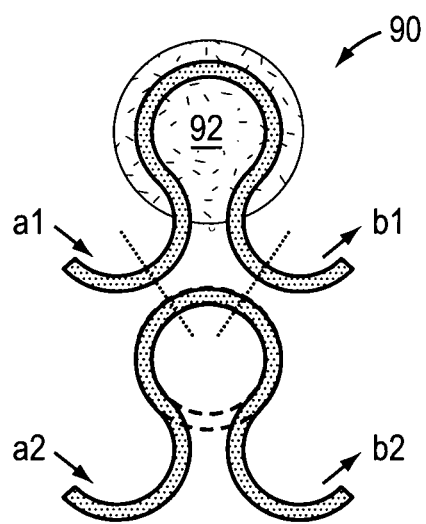
FIG. 9b illustrates a Mach-Zehnder interferometer having a non-zero arm length difference, which may serve as a coupler with a wavelength-dependent, variable coupling ratio for exciting resonant structures, and shows that one arm of the Mach-Zehnder interferometer may form part of a ring resonator.

In one embodiment, the present invention features a variable coupling mechanism that has 2 input ports and 2 output ports and that permits dynamic adjustment of the cross-state transmission between a chosen maximum power coupling fraction and substantially suppressed transmission that is at least 10 dB lower, and preferably at least 20 dB lower. With reference to FIG. 9*a*, in one implementation, a Mach-Zehnder interferometer 80 with two couplers of substantially similar coupling ratios is used, together with balanced arms 84, 86. With reference to FIG. 9*b*, in another implementation, a Mach-Zehnder interferometer 90 with two couplers of substantially similar coupling ratios is used, together with a given arm length difference. In either case, a phase shifter 82, 92, which may be thermooptic and heater-actuated, may be present in one or both arms. In a first state, in which cross-state transmission (b2/a1 in FIG. 9*b*) is substantially minimum, the Mach-Zehnder switch 80, 90 is said to be in the off state. In a state where the phase-shifter 82, 92 is approximately 180° shifted from the first state, the Mach-Zehnder switch 80, 90 is said to be in the on state.

In various embodiments, the structures presented herein typically require one or more of the following features to switch off a resonant response in a hitless manner: i) variable input coupling; ii) a loading mechanism for the resonant modes—either a variable loss mechanism, a fixed output port coupling, and/or a variable output coupling; and/or iii) an algorithm of switching that prevents a dispersive off-state response by keeping the through port in a minimum-phase operating regime.

FIGS. 10*a-d* depict switching of a single-resonator add-drop filter 100, 102, 104, 106 by loss modulation (FIG. 10*a*), by disabling of a variable input and output coupling (FIG. 10*b*), by disabling of a variable output coupling (FIG. 10*c*), and by disabling of a variable input coupling only (FIG. 10*d*), each of which has disadvantages. These various switching configurations 100, 102, 104, 106 may be better understood with, as illustrated in FIGS. 11*c* and 11*d*, the aid of the on-resonance through-port transmission and group delay characteristics for a single resonator, illustrated in FIGS. 11*a* and 11*b*, having an arbitrary variable input coupling and cavity loss. The curves 114, 116 shown in FIGS. 11*c* and 11*d* may be used for higher-order structures too, by considering one supermode of a coupled-cavity structure at a time, and permitting the resonance under consideration (e.g., the ring 110 depicted in FIG. 11*a* or the ring 112 depicted in FIG. 11*b*) to represent that supermode for purposes of discussion. The power transmission curve 114 depicted in FIG. 11*c* shows the through-port transmitted power fraction vs. the ratio of the external Q to the loss Q, i.e., the ratio of the internal power fraction lost to loss mechanisms and output ports (not including the input port) per round trip to the power fraction coupled to the input port per round trip. The power transmission curve 114 depicted in FIG. 11*c* is given by:

$$T^2 = \left(\frac{Q_e/Q_o - 1}{Q_e/Q_o + 1}\right)^2 \quad (2)$$

The curve 116 depicted in FIG. 11d shows the through-port group delay on-resonance, normalized to the decay time constant, $\tau_e$, of the energy amplitude to the input port (which is inversely proportional to the input coupling and which is represented by the external Q, $Q_e = \omega_o \tau_e/2$, where $\tau_e$ is the decay time to the input port and $\omega_o$ is the resonance frequency). The normalized group delay curve 116 in FIG. 11d is given by:

$$\frac{\tau_g}{\tau_e} = \frac{-2}{(Q_e/Q_o)^2 - 1} \quad (3)$$

Figure 10A:
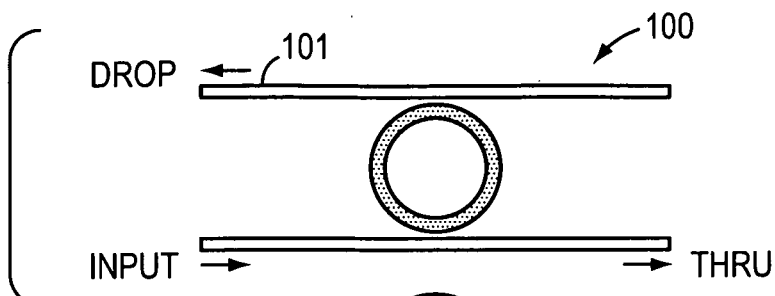
FIG. 10a is a schematic showing a ring resonator add-drop filter with a fixed coupling to an input and output waveguide, and a variable optical loss mechanism in the ring, for purposes of illustration of switching characteristics.
Figure 11A:
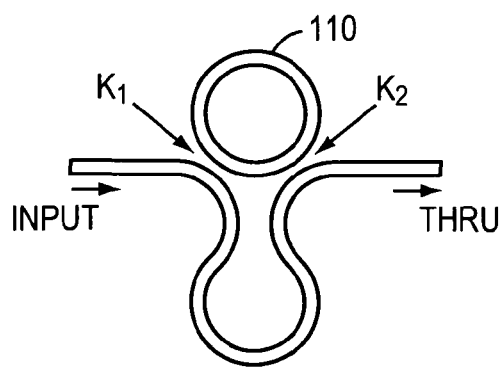
FIG. 11a is a schematic showing a single-resonant-mode resonator, with a variable Mach-Zehnder coupling to an input waveguide, and having a variable optical loss in the resonator, for purposes of illustration of switching characteristics of any one particular supermode in a resonant structure having potentially multiple ports and resonators; the variable Mach-Zehnder coupling has an arm length difference that establishes an FSR equal to the FSR of the resonator mode.
Figure 11B:
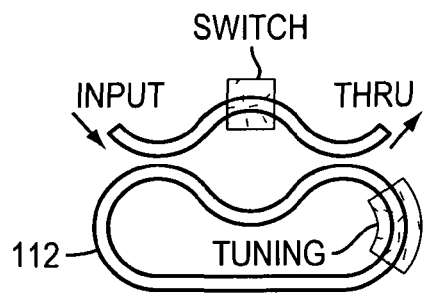
FIG. 11b is a schematic showing a single-resonant-mode resonator, as in FIG. 11a, with the variable Mach-Zehnder coupling having zero arm length difference and thereby providing a broadband, variable input coupling coefficient.
Figure 11C:
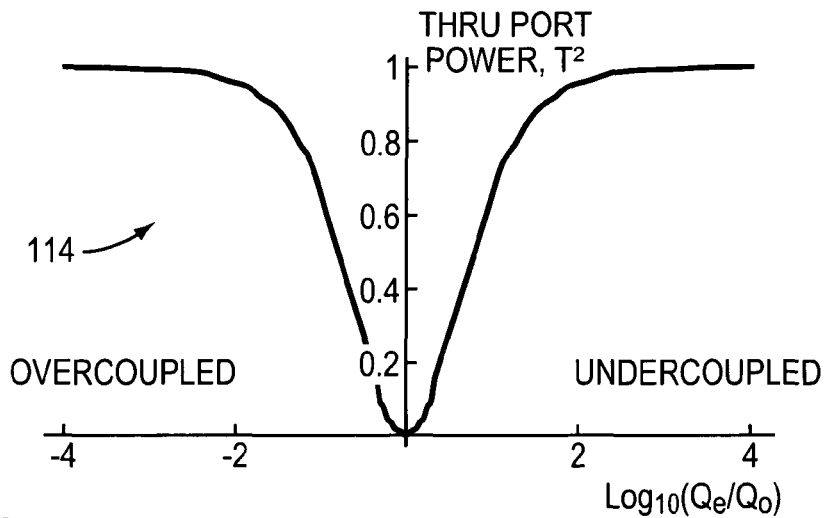
FIG. 11c illustrates the on-resonance amplitude switching characteristic for a resonant mode coupled to an input port, as a function of the external Q, $Q_e$, relating to input coupling and the intrinsic Q, $Q_o$, relating to cavity loss and output ports of the resonant structure.
Figure 11D:
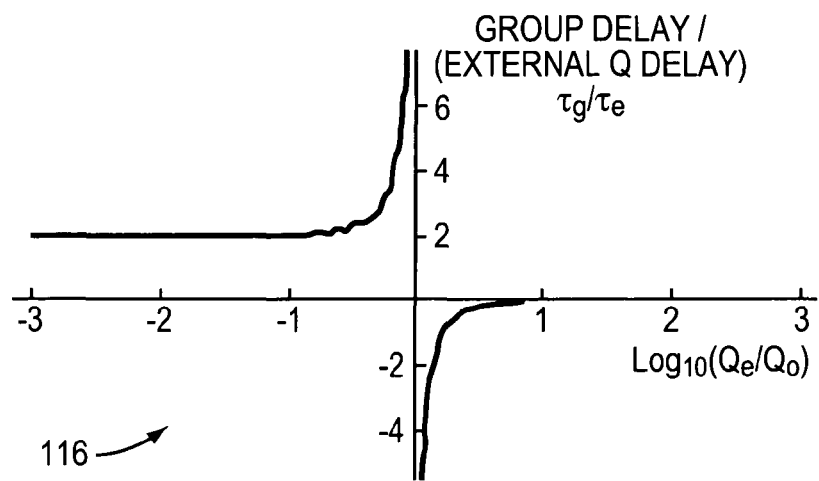
FIG. 11d illustrates the on-resonance normalized group delay switching characteristic for a resonant mode coupled to an input port, as a function of the external Q, $Q_e$, relating to input coupling and the intrinsic Q, $Q_o$, relating to cavity loss and output ports of the resonant structure.

In FIG. 10a, for high performance in the add-drop filter 100 (i.e., low drop loss), the loss Q must be much higher (e.g., 10 to 100 times higher) than the external Q ($Q_{loss} \gg Q_e$, i.e., $Q_{loss} \sim 10\text{--}100 \times Q_e$) so that, when the filter 100 is operated at critical coupling (i.e., log $10(Q_e/Q_o)=1$ in FIG. 11c), the signal fully extracted to the waveguide is primarily delivered to the drop waveguide 101 (which for FIG. 11 is included in the internal Q, $Q_o$, along with the loss mechanisms, $Q_{loss}$) rather than being lost primarily to various loss mechanisms. To switch to an off-state with a high through-port transmission and little loss, the Q contrast ($Q_e/Q_o$) is either increased or decreased from 1 by a factor of 100 to 10000, according to FIG. 11c. Transmission loss for $Q_e/Q_o = 10^0, 10^1, 10^2, 10^3$, and $10^4$ is about 100%, 40%, 4%, 0.4%, and 0.04%, respectively (FIG. 11c is horizontally symmetric, so the same transmission values hold respectively for corresponding progressive negative powers of 10 of the $Q_e/Q_o$ ratio). Therefore, the Q contrast needs to be about $10^3$ to $10^4$ to permit low transmission loss. Furthermore, with reference to FIGS. 11c and 11d, for the case of $10^3$ to $10^4$ Q contrast, the resonant mode is in the undercoupled regime, operating at minimum phase, and the group delay normalized to the input coupling decay rate is near zero, which is desirable. On the other hand, in the other regime of high off-state transmission with $10^{-3}$ to $10^{-4}$ Q contrast, the resonant mode is in the overcoupled regime and the through-port group delay is twice the input coupling decay rate. Since in the overcoupled regime the Q is dominated by the input coupling, the bandwidth is the inverse of the input coupling decay rate (to within a small constant factor), so the group delay is twice the inverse of the bandwidth. This is an all-pass filter response with near unity transmission and a dispersive group delay response, which is not a desirable off-state for a filter that is intended to be wavelength-tuned through other wavelength channels while in the off state. The previous work on hitless tuning by cavity detuning reaches an off state in this, overcoupled, regime for at least one resonator mode. Therefore, in this previous work, while the amplitude response is "off", the phase response is not turned off in the through port and may introduce signal degradation due to dispersion or loss, and bit errors during tuning.

In FIG. 10a, loss is varied only from a small value to a large value to go between a low-loss on-state and a low-loss, high-extinction off-state, with fixed waveguide coupling. This type of switching, as described, requires 3-4 orders of magnitude controllable variation in the loss, which is challenging.

Figure 10B:
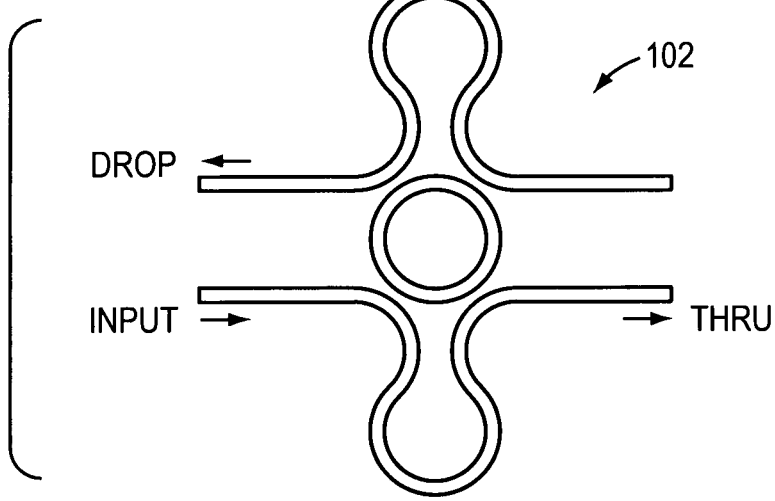
FIG. 10b is a schematic showing a ring resonator add-drop filter with a variable Mach-Zehnder coupling to an input and to an output waveguide, and a fixed, substantially low-loss ring cavity, for purposes of illustration of switching characteristics.

With reference to the filter 102 depicted in FIG. 10b, a low-loss resonator response is switched by symmetrically reducing the input and output coupling. Here, the filter 102 is always in the critical coupling condition, $Q_e/Q_o=1$, because $Q_e$ relates to the input coupling, and $Q_o$ includes the assumed negligible loss plus the output coupling that is the same as the input coupling. In this case, the bandwidth narrows as the coupling is reduced, but the transmission on-resonance is 100%, and the group delay and dispersion rise sharply in proportion to the bandwidth decrease. A slight mismatch between the input and output coupling may turn the response to the desirable undercoupled (if $Q_e > Q_o$) regime or the undesirable overcoupled ($Q_e < Q_o$) regime. Eventually, at weak enough input coupling, residual cavity losses will dominate the input coupling and bring the response into the desired undercoupled regime. However, this may require a very weak input coupling, thus requiring a large contrast—at least 40 dB but possibly much more depending on the residual loss—between the on-state and off-state of the input coupling ratio. To deal with this, one may use a switching algorithm where the output coupling is reduced in a slower way than the input coupling, in such a way that they are both taken toward zero, but with an increasing contrast that reaches on the order of 40 dB higher output coupling than input coupling in the final off state. This is reasonable for MEMS-type switches using evanescent coupling and movable waveguides. But, it is undesirable, when maintaining an objective to switch off the through-port response, to have no present loss (cavity loading) mechanism.

Figure 10C:
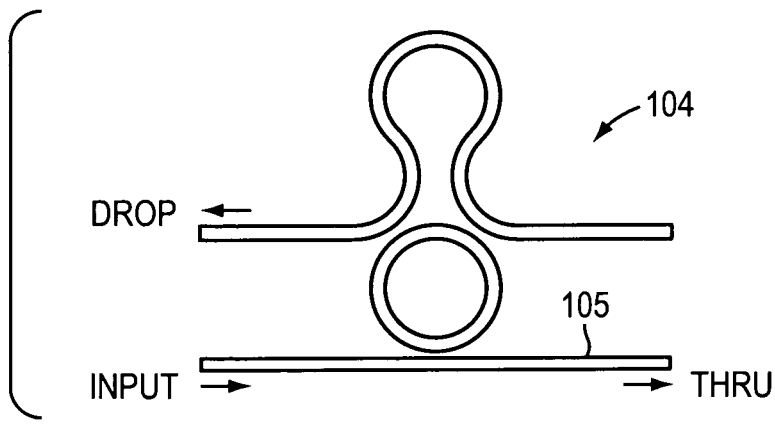
FIG. 10c is a schematic showing a ring resonator add-drop filter with a fixed coupling to an input waveguide, a variable Mach-Zehnder coupling to an output waveguide, and a fixed, substantially low-loss ring cavity, for purposes of illustration of switching characteristics.

With reference to the filter 104 depicted in FIG. 10c, a low-loss resonator response is switched by reducing the output coupling only. Here, in the "off state," the filter 104 is in the overcoupled regime, $Q_e/Q_o < 1$, because $Q_o$, which includes the output coupling, is the only value that is changed, i.e., increased as the output coupling is reduced. This configuration has an allpass filter Lorentzian group delay, and corresponding dispersive response at the through-port 105. One can see that in the off-state, since the output coupling may be neglected, the device is an allpass filter 104, with a group delay response bandwidth on the order of the bandwidth of the filter 104. On the other hand, such dispersive spectral responses will deteriorate optical signals passing through the filter 104. If the filter 104 is tuned in the off-state to a new channel, the all-pass resonant response will be tuned through all intermediate channels, resulting potentially in temporary signal degradation in each intermediate channel. This problem exists equally in cavity detuning approaches to hitless tuning—the input cavity, at least, forms an all-pass filter with a bandwidth on the order of the filter bandwidth. In addition, from FIG. 11c, it can be seen that a variation in the output coupling of $10^3$ to $10^4$ is needed for low through port loss and high extinction.

Figure 10D:
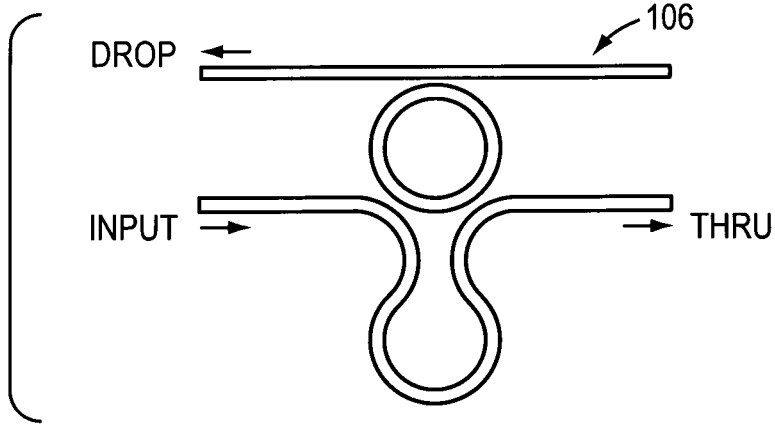
FIG. 10d is a schematic showing a ring resonator add-drop filter with a variable Mach-Zehnder coupling to an input waveguide, a fixed coupling to an output waveguide, and a fixed, substantially low-loss ring cavity, for purposes of illustration of switching characteristics.

Consider, with reference to FIG. 10d, the response of a low-loss resonator 106 switched by reducing the input coupling only. Here, in the "off state," the filter 106 is in the desired undercoupled regime, $Q_e/Q_o > 1$, because $Q_o$, which includes the output coupling, stays fixed, thereby leaving a loss loading on the cavity in the form of the output waveguide. Then, from FIG. 11c, the input coupling may be varied by a factor of $10^3$ to $10^4$ to switch the response from critical coupling to full transmission with less than 1% loss. Furthermore, both the amplitude and phase response are disabled in the off state, as desired.

As described, the filter 104 depicted in FIG. 10c does not disable the phase response of the filter 104 in the through port 105, while the filters 100, 102, 106 depicted in FIGS. 10a, 10b, and 10d, respectively, can provide the desired amplitude and phase response switching, but require large switching contrasts. In addition, the filter 102 depicted in FIG. 10b requires a particular switching algorithm to operate safely in the undercoupled off-state.

One embodiment of a single-ring hitless tunable filter 120 is described with reference to FIG. 12, which depicts a traveling-wave resonator 121, a Mach-Zehnder variable input coupler 122 with no nominal arm length difference (N=0, FSR approaching infinite), a phase shifter 123 disposed on the resonator waveguide 121, a phase shifter 124 disposed in the switching arm of the Mach-Zehnder variable coupler 122, and a fixed coupling drop-port waveguide 126. The advantages of this structure 120 include that the Mach-Zehnder variable coupler 122 has a broadband response, so that all resonant cavity modes coupled to the input waveguide 125 have their input coupling reduced in a broadband manner. As a result, all resonant modes coupled to the input waveguide 125 over a relatively wide wavelength range (over which the Mach-Zehnder variable coupler 122 is broadband) may be disabled in amplitude and phase. A disadvantage of this structure 120 is that a balanced Mach-Zehnder variable coupler 122 does not accommodate a circular ring resonator in a simple way.

Figure 13A:
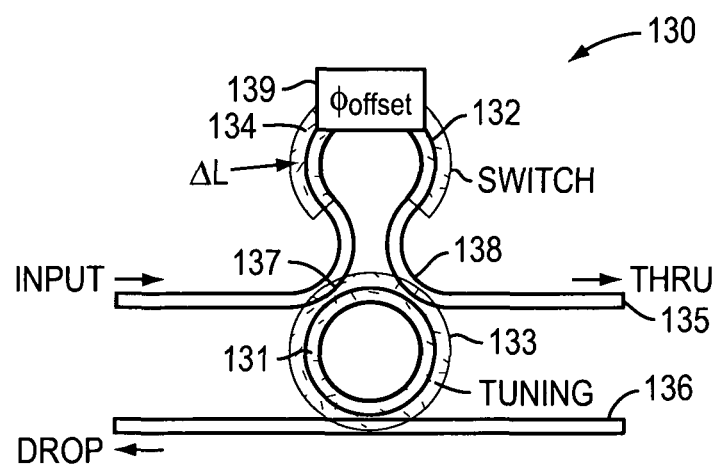
FIG. 13a illustrates a hitless tunable ring resonator coupled to an input waveguide, via a variable Mach-Zehnder coupler having an arm length difference equal to a ring circumference or positive integer multiple thereof and an additional phase shift, $\phi_{offset}$, in one of the coupler arms, and to an output waveguide having a fixed coupler.

FIG. 13a depicts an alternative embodiment of a single-ring hitless tunable filter 130. The filter 130 includes a traveling-wave microring resonator 131 and a Mach-Zehnder variable input coupler having a top arm 132, which may be realized as a bus waveguide, coupled to the microring resonator 131 at two points 137, 138. In one embodiment, the length difference between the Mach-Zehnder arm 132 and the portion of the ring 131 disposed between the first and second coupling points 137, 138 is set to be one ring circumference or to an integer L multiple thereof, for L=0, 1, 2, 3, etc. In such cases, the Mach-Zehnder arm 132 has an FSR that is substantially equal to the ring 131 FSR divided by L. More generally, when non-identical waveguides are used for the ring 131 and Mach-Zehnder input coupler, the Mach-Zehnder arm length difference is to be such that the group delay difference is equal to the round-trip group delay of the ring resonator 131, or a multiple L thereof. In either case, this means that the sinusoidal spectral dependence of the input coupling coefficient has an FSR that is equal to the FSR of the ring resonator 131, divided by L. An advantage of this structure 130 is that it provides a spectral period of the input coupling coefficient matched to one ring FSR, thus permitting the disabling of multiple (ideally all) adjacent FSRs in parallel. A second advantage is that the structure 130 affords greater spacing between the phase shifters 133, 134, permitting lower crosstalk if the actuation is done thermooptically, such as with heaters.

Referring still to FIG. 13a, an additional fixed 180° phase shift 139 may be provided in the top Mach-Zehnder arm 132, for example by inserting an additional half-guided-wave length of waveguide (at the operating center wavelength of the filter 130). In one embodiment, this places the filter 130 in the off state by default, with all phase shifters 133, 134 (e.g., heaters for thermooptic tuning) turned off. Then, switching on any channel may be achieved by tuning the ring 131 and Mach-Zehnder switching arm 132 substantially simultaneously to the desired channel wavelength, in the off state, within the filter 130 FSR. When using thermooptic tuning and switching, which shifts the resonance and Mach-Zehnder coupler spectrum in one direction (to longer wavelength for silicon and other materials with positive thermooptic coefficient), one may proceed as follows in order to turn on the filter 130 at the desired wavelength. If the filter 130 is to be tuned by less than half the FSR, the Mach-Zehnder switching arm 132 may be actuated to give an additional 180° phase shift, thereby switching on the filter 130. If the filter 130 is to be tuned by more than half the FSR, then the Mach-Zehnder switching arm 132 actuation may be reduced so as to reduce the phase shift it provides by 180°, and in that way turn on the filter 130. This permits the filter 130 to be tuned across the entire FSR of the filter 130, and turned on at any channel, while using no more power per heater 133, 134 than the maximum power required by a heater 133, 134 to tune the ring 131 across its full FSR, thereby keeping power and temperature excursions to a minimum.

In various embodiments of the invention, actuation of the phase shifters 133, 134 by thermooptic means is a completely reversible process, where no permanent damage to the materials of the ring 131 or the Mach-Zehnder switching arm 132 is caused by the temperature changes. In one such embodiment, switching from an on state to an off state of the filter 130 requires simply the reverse progression of actuation steps from those required to switch from an off state to an on state. Accordingly, in one embodiment of the invention, the filter 130 is turned off from an active on state by actuating the heater 134 of the Mach-Zehnder switching arm 132 to add or subtract a phase shift of approximately 180° to or from light propagating through the arm 132. In one embodiment, where the on state resonance of the filter 130 is more than one-half the FSR away from its resonant wavelength with all heaters 133, 134 off, the on state is most efficiently achieved by subtracting a phase shift of approximately 180° from the light propagating through the Mach-Zehnder switching arm 132, by decreasing the temperature output by the heater 134. In such a case, switching the filter 130 off may be achieved by adding back a phase shift of approximately 180° to the light propagating through the Mach-Zehnder switching arm 132, by correspondingly increasing the temperature output by the heater 134. On the other hand, if the on state resonance of the filter 130 is less than one-half the FSR away from its resonant wavelength with all heaters 133, 134 off, then switching the filter 130 off may instead involve subtracting a phase shift of approximately 180° from the light propagating through the Mach-Zehnder switching arm 132, by reducing the temperature output by the heater 134.

Figure 13B:
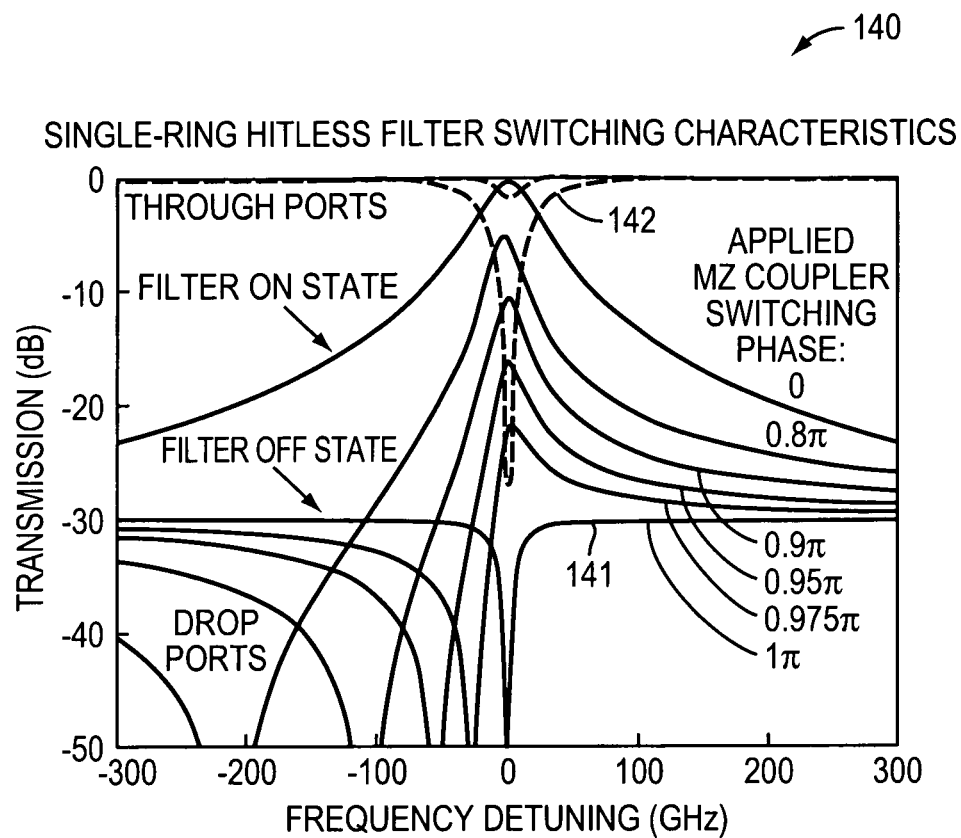
FIG. 13b illustrates the switching characteristic spectra of the hitless tunable single-ring resonator filter depicted in FIG. 13a, having an arm length difference of one ring circumference and $\phi_{offset}=0$, for various states of the phase shifter of the variable Mach-Zehnder coupler, and shows drop and through port responses.

FIG. 13b depicts the switching characteristics 140 of the filter 130 shown in FIG. 13a. The filter 130 is configured to start in the on state with the phase shifters 133, 134 unactuated. With a 180° Mach-Zehnder phase shifter 134 actuation, the filter 130 resonance is turned off. Drop-port intermediate switching curves 141 and through-port intermediate switching curves 142 are shown for $0.8\pi$, $0.9\pi$, $0.95\pi$, $0.975\pi$, and $1\pi$ applied Mach-Zehnder coupler switching phase. In order to tune the filter 130 to a new channel in a hitless way and enable its passband there, in one embodiment both the phase shifter 133 of the ring 131 and the phase shifter 134 of the Mach-Zehnder variable coupler switching arm 132 are first tuned substantially synchronously to arrive at the new center wavelength, and then the Mach-Zehnder phase shifter 134 is increased or decreased by 180° phase to reconstitute the filter 130 passband at the new wavelength.

Figure 31:
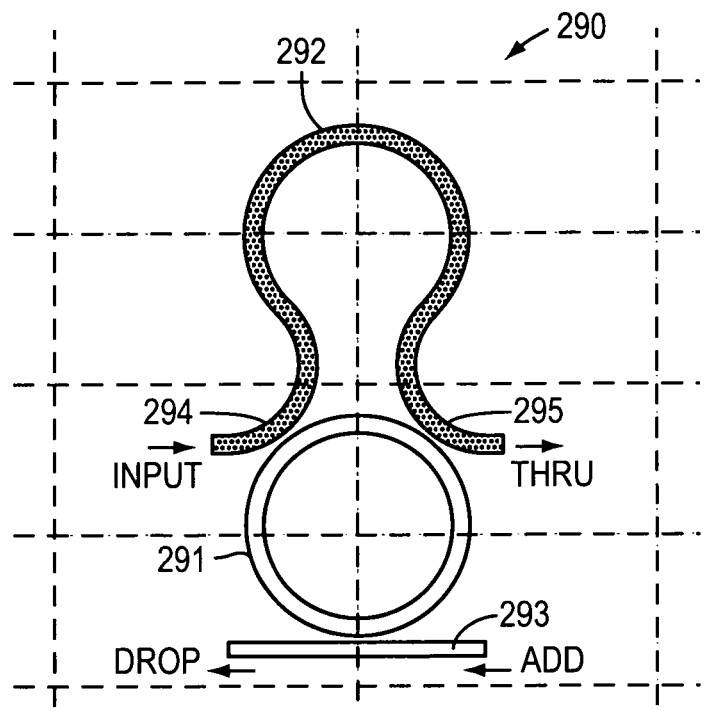
FIG. 31 illustrates a physical embodiment of a single-ring hitless tunable filter, realized in silicon-core waveguides, in accordance with the invention.

FIG. 31 depicts one embodiment of an actual silicon-core device design 290 that may be used to show the simulated switching curves depicted in FIG. 13b. The device 290 may be realized in silica-cladded, Si-core ring 291 and variable coupler 292 waveguides of approximately 600×100 nm cross-section and bus waveguides 293 of approximately 500× 100 nm cross-section. The ring 291 outer radius may be 7 microns. The two input directional couplers 294, 295 of the variable Mach-Zehnder coupler 292 may have a power coupling coefficient of approximately 2%, and the output coupler 293 may have a coupling coefficient of approximately 7%.

This may be achieved by having all three wall-to-wall coupling gaps at approximately 300 nm.

Another embodiment is a variant of the device 290 depicted in FIG. 31, where, in addition to the Mach-Zehnder arm length difference being substantially equal to the ring FSR (for any L=0, 1, 2, 3 . . . ), an additional 180° phase shift is added to the Mach-Zehnder switching arm 292, so that the filter 290 starts in the off-state with all heaters unactuated. This permits the hitless enabling and disabling of the filter 290 over the entire tunable FSR. For example, for thermooptic tuning of silicon, around a 200° C. temperature rise can tune the resonator frequency by 16 nm, or one FSR, using the silicon dn/dT of 2e−4/K or so.

Figure 14:
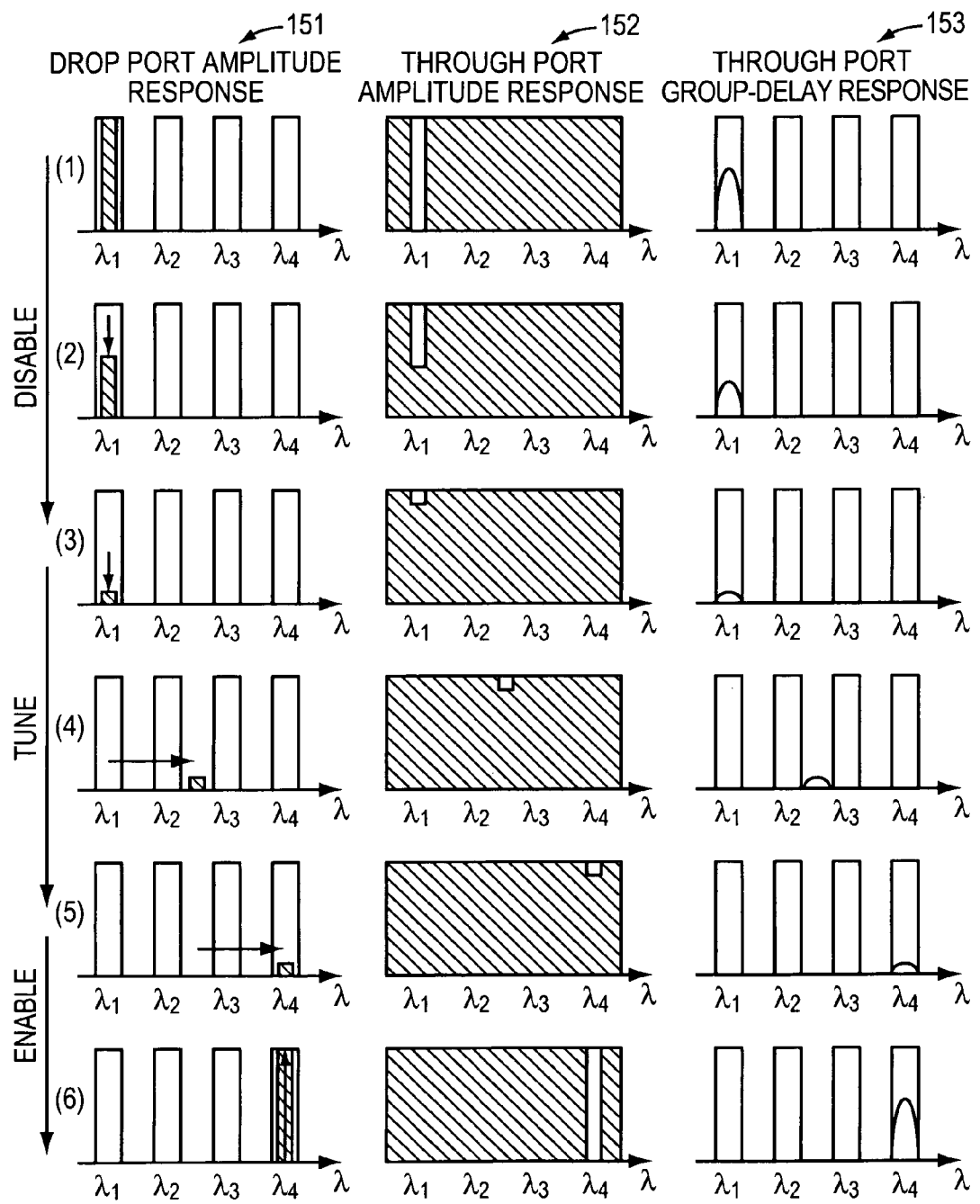
FIG. 14 illustrates conceptually the requirements of hitless reconfiguration of a channel add-drop filter from on state operation at one wavelength channel to on state operation at a new target wavelength channel.

With reference to FIG. 14, one embodiment of a generic method for the hitless tuning of channel add-drop filters is briefly explained using, for example, the hitless tunable filter 130 depicted in FIG. 13a. One skilled in the art will understand, however, that the generic method is applicable to all the hitless tunable filters described herein that are capable of substantially disabling their amplitude and phase responses.

In one embodiment, the filter 130 begins operation in the on state. "Beginning" operation in the on state means that, when all controllable phase shifters 133, 134 of the filter 130 are not actuated, the filter 130 is substantially in the on state. In the case of thermooptic phase shifters 133, 134 making use of heaters, the filter 130 begins in the on state if it is substantially in the on state with no power applied to the heaters. Furthermore, in a tunable filter configuration where a plurality of heaters is employed, consider that the full range of power levels applied to each heater spans a range from zero to a maximum power, wherein the application of a maximum power to each heater tunes the optical element across the entire device tuning range. Then, the filter may also be considered to "begin" in an on state if it is substantially on with all heaters actuated to substantially the same fraction of its respective maximum power. This effectively means that tuning is achieved by actuating heaters substantially in unison, while switching is achieved by changing the relative level of power applied to the heaters.

Assuming that the filter 130 begins operation in the on state, if the filter 130 is at a first wavelength channel, and it is desired to move its resonant response, in the disabled state, to a second wavelength channel, the steps to hitless tuning are, in one embodiment, as follows. First, the filter 130 is disabled to an off-state by actuating the Mach-Zehnder switching heater 134 (steps 1-3 in FIG. 14). It may be seen in step 3 of FIG. 14 that ideally the through-port transmission 152 is substantially flat and near unity, as desired, that the drop-port resonant response 151 has a high rejection, and that the group delay response 153 should be zeroed in the off state, so that no substantial amplitude or phase variations are tuned through other channels during the wavelength tuning. Next, the center wavelength of the resonant cavity 131 and wavelength-dependent Mach-Zehnder variable coupler 132 of the filter 130 are tuned approximately synchronously to a new center wavelength, all the while keeping the filter 130 in its disabled state (steps 3-5 in FIG. 14). Finally, the Mach-Zehnder switching phase-shifter 134 (e.g., heater 134) is applied, by adding or subtracting 180° phase shift, thus reconstituting the passband (i.e., re-enabling the filter 130 channel add-drop responses) at the new center wavelength (steps 5-6 in FIG. 14). As illustrated by the group delay response 153 in FIG. 14, the hitless tunable filter 130 does not experience substantial dispersive spectral response in the through port 135, in the off-state.

The off-state through-port 135 response is acceptable when switching using a variable input coupler 132 and a fixed output coupler 136 that loads the resonance. The "noise floor" is at −30 dB in FIG. 13b simply because this single microring resonator 130, with 2 THz FSR, has −30 dB drop port rejection half way between resonances. For higher-finesse filters, or for higher-order filters, the suppression of the off-state drop-port "noise floor" may be made deeper.

Figure 15:
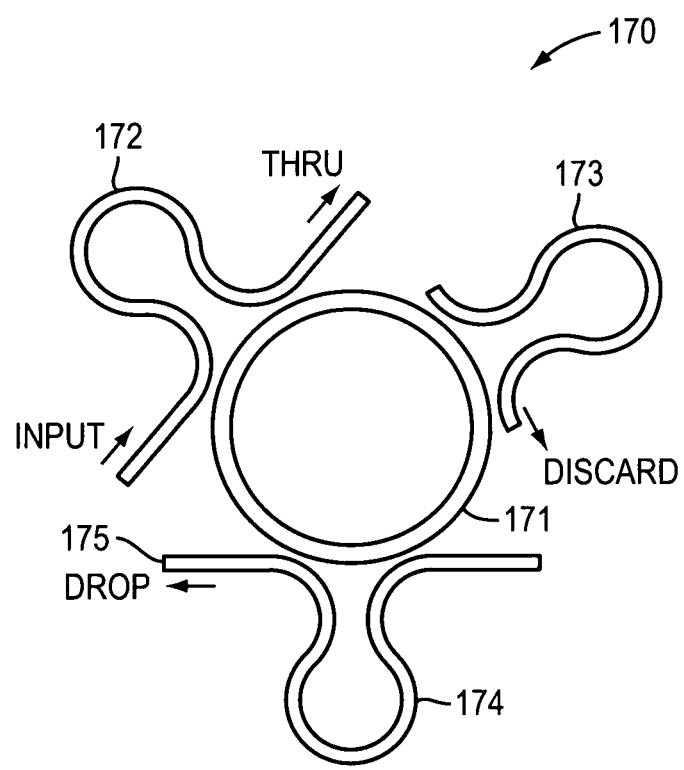
FIG. 15 illustrates a hitless tunable ring resonator filter coupled to an input waveguide and to an output waveguide via variable Mach-Zehnder couplers, and having an additional, third variable Mach-Zehnder coupler as a variable loss mechanism, in accordance with an embodiment of the invention.

In another embodiment, as illustrated in FIG. 15, a filter 170 is provided that permits, in addition, a greater rejection of a drop-port 175 response. The filter 170 includes a traveling-wave microring resonator 171, a Mach-Zehnder variable input coupler 172, and a Mach-Zehnder variable output coupler 174. A separate variable loss mechanism is then needed in the cavity 171, since the output port 175 will not be loading the cavity 171 in the off state. For this purpose, a third Mach-Zehnder variable coupler 173 may be added. In one embodiment, both the Mach-Zehnder variable input coupler 172 and the Mach-Zehnder variable output coupler 174 are reduced to near zero in the off state while the artificial loss mechanism 173 is turned on.

In general, the single-hitless-ring concepts described herein may be applied to higher-order filters, but, as further described below, the designs are not trivially extended to higher order, and additional elements are needed.

In one set of embodiments of hitless tunable filter devices, and methods for tuning filters in a hitless manner, phase shifters in the resonators and in the variable Mach-Zehnder couplers are used to change the thermooptic refractive index in the waveguide core or cladding. In the case of silica-cladded, silicon-core waveguides, the primary thermooptic refractive index change results in the semiconductor core, with silicon having a thermooptic coefficient, dn/dT, of about 2·10−4/K near room temperature. Thermooptically induced phase shift is typically not linear with temperature. In silicon, the thermooptic coefficient increases at higher temperatures, so there is a quadratic enhancement component to the dependence of index with temperature. Thermooptic tuning is typically achieved by distributing heat to the degree possible across the waveguide in which a phase shift is to be affected, in order to minimize the temperature and electrical power density in heaters.

Figure 16:
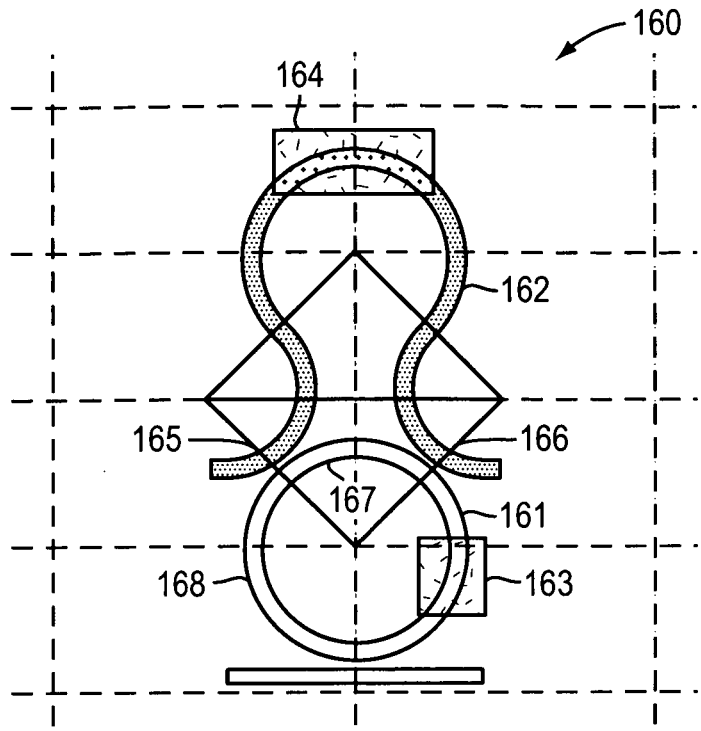
FIG. 16 illustrates the structure of a hitless tunable ring resonator filter, showing a configuration of variable phase shifters in accordance with an embodiment of the invention.

In FIG. 16, a single-ring hitless tunable filter 160 is illustrated with a ring 161 tuning phase shifter 163 and a switching arm 162 phase shifter 164 that are suitable for hitless tuning. Three distinct regions of the device 160 may be established for purposes of thermooptic tuning design: i) the region of the variable Mach-Zehnder coupler arm, which does not form part of the ring resonator 161, and which is disposed between first and second input couplers 165, 166—referred as the Mach-Zehnder switching arm 162; ii) the shorter region of the ring resonator waveguide 161 disposed between the first and second input couplers 165, 166 and forming part of the variable Mach-Zehnder input coupler—referred to as the shared ring-waveguide section 167 (or as the second arm 167 of the variable Mach-Zehnder input coupler); and iii) the longer region of the ring resonator waveguide 161 disposed between the second and first input couplers 166, 165 and not forming part of the Mach-Zehnder input coupler—referred to as the resonator ring-waveguide section 168.

Now consider a ring resonator 161 and variable Mach-Zehnder input coupler design where the arm length difference of the Mach-Zehnder input coupler is equal to one or an integer multiple of the ring 161 circumference, plus an additional 180° phase shift in one arm as may be implemented by an additional half-guided-wavelength length of waveguide. The phase shift permits the filter resonant passband to be off when the phase shifters 163, 164 (e.g., heaters) are not actuated.

Referring to FIG. 16, having a first (switching arm) phase shifter 164 in the Mach-Zehnder switching arm 162 and a second (ring tuning) phase shifter 163 in the resonator ring-waveguide section 168 provides advantages with respect to tuning because the first phase shifter 164 performs substantially only switching on and off of the resonant response, while the second phase shifter 163 performs substantially only tuning of the ring resonance frequencies. This simplifies operation by permitting independent controls for switching (i.e. tuning) of the variable Mach-Zehnder coupler 162, and for tuning of the ring 161.

Actuation of thermooptic phase shifters 163, 164 tunes either a ring 161 resonant frequency or the variable Mach-Zehnder coupler wavelength response in the case of Mach-Zehnder couplers with unequal arm 162, 167 lengths (where equal arm 162, 167 lengths provide a substantially wavelength independent response). An increase in temperature leads to an index change according to the thermooptic coefficient. In the case of silicon and other semiconductors where the thermooptic coefficient is dominated by the thermal bandgap changes, the index change is positive. For polymers, where the index change is dominated by material density changes due to thermal expansion, the thermooptic coefficient (dn/dT) may be negative. For purposes of discussion, a positive thermooptic coefficient is assumed without loss of generality.

With reference still to FIG. 16, it is assumed that the length of the Mach-Zehnder switching arm 162 is greater than, or equal to that of, the shared ring-waveguide arm 167. Then, actuating the phase shifter 164 in the switching arm 162 by increasing temperature increases the phase delay in the Mach-Zehnder switching arm 162 and shifts the sinusoidal, wavelength-dependent input coupling coefficient spectrum to longer wavelengths, thereby varying the degree of input coupling at the resonant wavelength. For weak input coupling coefficients, the ring 161 resonant frequency is not substantially modified. Alternatively, by actuating the ring tuning phase shifter 163 in the resonator ring-waveguide section 168 by increasing temperature and therefore roundtrip phase delay, the ring 161 resonant wavelength is shifted to longer wavelengths, while the Mach-Zehnder coupling coefficient spectrum is not substantially changed.

This actuation approach has the advantage of independent ring 161 and Mach-Zehnder switching arm 162 actuation. A method is thereby provided for hitless tuning and switching of the filter 160 without introducing either substantial loss or dispersion into other channels in the operating spectrum of the filter 160. This may result in the minimum actuation range per phase shifter 163, 164 (i.e., the minimum power and temperature range per heater 163, 164) being employed. In various embodiments, the method includes: i) providing a hitless tunable filter 160 that includes a resonator 161 and a variable Mach-Zehnder input coupler; ii) configuring the filter 160 in an initial off state when heaters 163, 164 are not actuated (by, for example, inserting an additional half-guided-wave length of waveguide (at the operating center wavelength of the filter 160) to provide an additional fixed 180° phase shift in the Mach-Zehnder switching arm 162); iii) actuating the ring tuning heater 163 and the switching arm heater 164 substantially simultaneously, thereby tuning the filter 160—in the off-state—to a desired target channel wavelength; and then iv) actuating the switching arm heater 164 alone (to provide a phase shift change of about)180° to turn on the filter passband at the target wavelength. Actuating the switching arm heater 164 alone may involve increasing the switching arm heater 164 temperature to add a 180° phase shift, or decreasing the heater 164 temperature to subtract 180° phase shift.

A method of hitless tuning of a filter 160 that is tunable across its FSR, and whose variable Mach-Zehnder input coupler has an arm 162, 167 length difference of one ring 161 circumference or an integer L multiple thereof is also provided. In various embodiments, the method includes performing the steps immediately described above. In performing those steps, if the resonator 161 and variable input coupler are to be tuned to a target channel wavelength that is one-half of the ring 161 FSR or less away from the resonant wavelength observed without heater 163, 164 actuation, then, in actuating the switching arm heater 164 alone, its temperature is increased to effect a 180° phase shift. On the other hand, if the resonator 161 and variable input coupler are to be tuned by more than one-half of the ring 161 FSR from the resonant wavelength observed without heater 163, 164 actuation, then, in actuating the switching arm heater 164 alone, its temperature is decreased to effect a −180° phase shift. In one embodiment, this procedure permits continuous hitless tuning across the FSR, and keeps the maximum actuation of each phase shifter 163, 164 to less than or equal to the actuation necessary to tune a ring resonant frequency by 1 FSR.

In another embodiment, a method for returning the filter 160 to an off state at its rest wavelength in a hitless manner (i.e., resonant wavelength with ring heater 163 not actuated) is identical to the above methods for turning on the filter 160 at an arbitrary wavelength channel, but with the entire process done in reverse, i.e., reversing each step as well as the order of the steps.

In addition, a method for tuning a filter 160 in a hitless manner from one wavelength channel to a second target wavelength channel may be similar to the above, where one disables the filter 160 at the first channel, tunes from one wavelength to the other, and enables the filter 160 at the second wavelength. More specifically, the method may be a combination of the method for turning on a filter at a target wavelength, and the method for turning off a filter in a hitless manner, as described above, with a difference only in the tuning step. Rather than tuning from the rest wavelength to the target wavelength in the method for turning on, or from the target channel wavelength to the rest wavelength in the method for turning off, one tunes the resonator from the first channel wavelength to the second (target) channel wavelength in this step.

Figure 18:
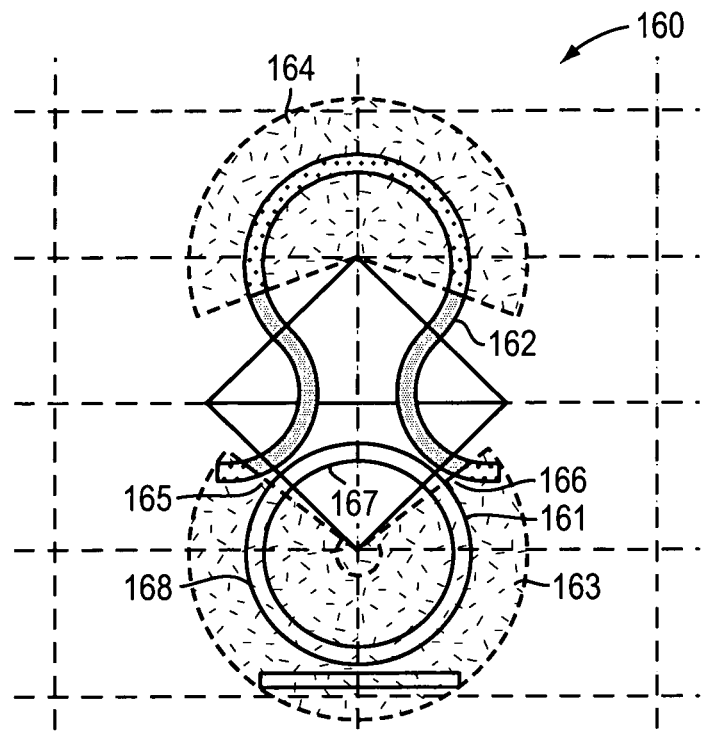
FIG. 18 illustrates the structure of a hitless tunable ring resonator filter, showing the configuration of heater elements for thermooptic tuning in accordance with an embodiment of the invention.

FIG. 18 depicts a physical embodiment of the filter 160 schematically illustrated in FIG. 16. As shown in FIG. 18, the ring tuning heater 163 covers the resonator ring-waveguide section 168 only and allows sufficient space from the shared ring-waveguide section 167 and the Mach-Zehnder switching arm 162 to prevent substantial thermal crosstalk between them. The switching arm heater 164 covers the Mach-Zehnder switching arm 162. The heaters 163, 164 are preferably spread over the length of the waveguide in each section so as to minimize the maximum temperature and electrical power density in the heater element 163, 164.

There may be, however, a disadvantage to the arrangement of the heaters 163, 164 in the filters 160 described with reference to FIGS. 16 and 18 with respect to maximum temperature. More specifically, since the shared ring-waveguide section 167 of the ring resonator waveguide 161 is not actuated, a higher temperature is required of the ring waveguide 161. In the embodiments depicted in FIGS. 16 and 18, the shared ring-waveguide section 167 did not contain a phase shifter because it would cause simultaneous tuning of the ring resonance and the Mach-Zehnder coupler wavelength response—in this case, the first to longer wavelength and the latter to shorter wavelength. Therefore, an actuation configuration that heats the entire resonator 161 may have a lower maximum temperature, but will require greater applied power to the switching arm 162 to compensate for the detrimental wavelength shifting caused by actuating the shared ring-waveguide section 167.

Figure 17:
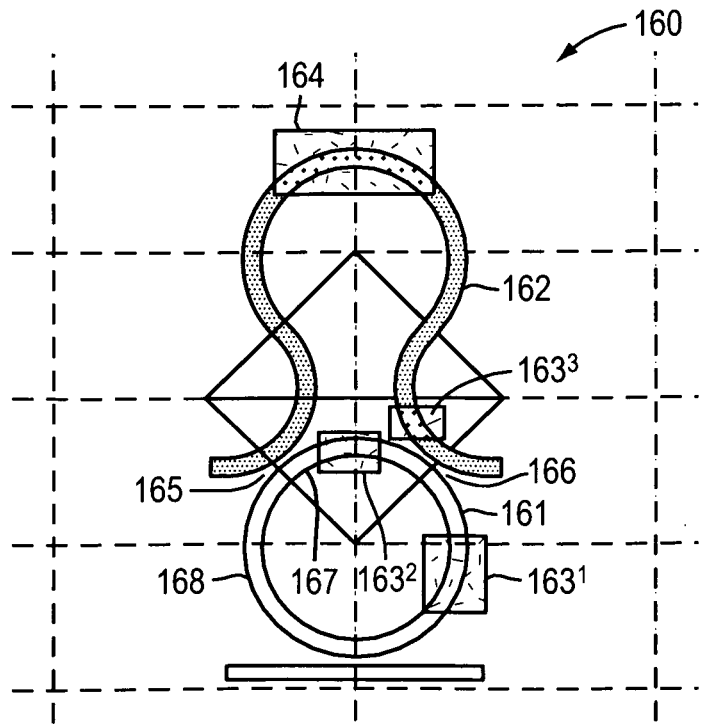
FIG. 17 illustrates the structure of a hitless tunable ring resonator filter, showing a configuration of variable phase shifters in accordance with an embodiment of the invention.
Figure 19:
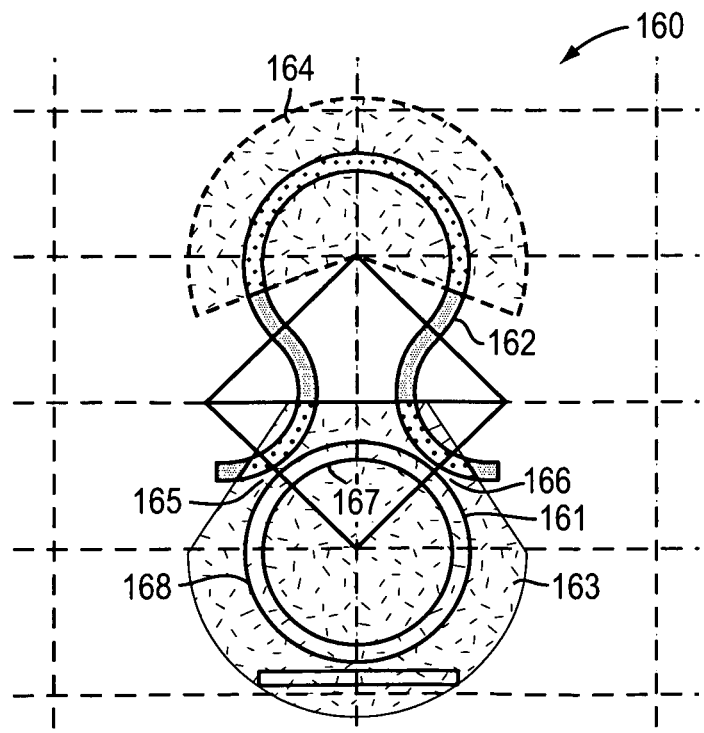
FIG. 19 illustrates the structure of a hitless tunable ring resonator filter, showing the configuration of heater elements for thermooptic tuning in accordance with an embodiment of the invention.

In FIG. 17, a schematic of the single-ring hitless tunable filter 160 of FIG. 16 is shown, with an additional arrangement of phase shifters $163^2$, $163^3$ in the shared ring-waveguide section 167 and in the Mach-Zehnder switching arm 162. As illustrated in FIG. 19, which depicts a physical embodiment of a filter 160, combining the phase shifter $163^2$ in the shared ring-waveguide section 167 and the phase shifter $163^1$ in the resonator ring-waveguide section 168 into a single phase shifter 163 permits the tuning of the ring resonator 161 with a maximally distributed temperature, i.e., minimized maximum temperature on the ring waveguide 161. On the other hand, when the ring resonance is tuned to a longer wavelength by actuating the ring heater element 163, the actuation of the shared ring-waveguide section 167 also shifts the Mach-Zehnder input coupling spectrum to shorter wavelength. The latter needs to be compensated either by actuation of the Mach-Zehnder switching arm heater 164 or another heater.

In order to maintain independent control of the tuning of the Mach-Zehnder coupling spectrum and the ring resonance components of the filter 160, an additional phase shifter $163^3$ may be added, as illustrated in FIG. 17, in the Mach-Zehnder switching arm 162. By actuating substantially simultaneously the two ring phase shifters $163^1$, $163^2$ and the added balancing phase shifter $163^3$ in the Mach-Zehnder switching arm 162, the ring resonance may be tuned, with lower maximum temperature, while not affecting the wavelength spectrum of the Mach-Zehnder input coupler 162 substantially, because the phase shifts added to both arms 162, 167 of the Mach-Zehnder input coupler are equal at all times. This operation may be done without requiring actuation of the main phase shifter 164 of the Mach-Zehnder switching arm 162 and, as such, the independent operation of the two functions is maintained.

FIG. 19 depicts a physical embodiment of the filter 160 depicted in FIG. 17. The phase shifter of the Mach-Zehnder switching arm 162 is accomplished by one heater 164, while the two ring phase shifters $163^1$, $163^2$ and the additional Mach-Zehnder switching arm 162 balancing phase shifter $163^3$ are combined into a single ring heater 163. In one embodiment, the ring heater 163 is designed to heat (i.e., cover) a length of waveguide in the Mach-Zehnder switching arm 162 that is approximately equal to the length of ring 161 waveguide in the shared ring-waveguide section 167. This embodiment of tuning permits reduced maximum temperature for a given ring resonance wavelength tuning range, at the cost of slightly greater overall tuning power used to compensate for the wavelength shifting of the Mach-Zehnder spectrum to shorter wavelengths by the ring heater 163. This embodiment also permits independent tuning of the ring 161 spectrum by heater element 163 and independent tuning of the Mach-Zehnder coupler spectrum by heater element 164

It is noted that in both tuning arrangements described thus far (the first arrangement depicted in FIGS. 16 and 18, and the second arrangement depicted in FIGS. 17 and 19), the switching is performed by changing the switching arm 162 phase by 180°, i.e., by actuating the Mach-Zehnder switching arm heater 164. However, the passband tuning requires the substantially simultaneous tuning of both the Mach-Zehnder switching arm 162 spectrum and the ring 161 resonance spectrum in order to shift both the input coupling coefficient and the resonance to the new target wavelength. Therefore, for tuning, a substantially simultaneous actuation of the Mach-Zehnder switching arm heater 164 and the resonator heater 163 are required.

Figure 20:
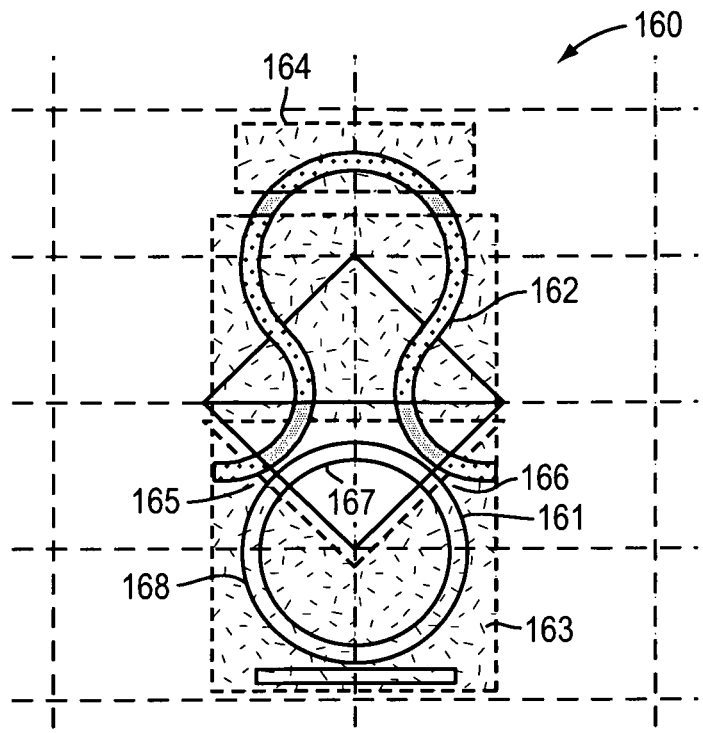
FIG. 20 illustrates the structure of a hitless tunable ring resonator filter, showing the configuration of heater elements for thermooptic tuning in accordance with an embodiment of the invention.
Figure 21:
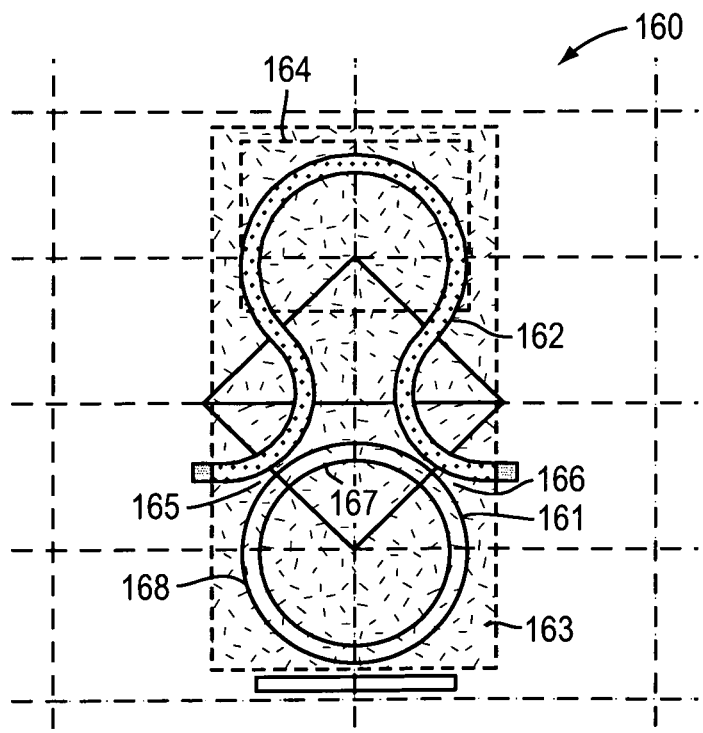
FIG. 21 illustrates the structure of a hitless tunable ring resonator filter, showing the configuration of heater elements for thermooptic tuning in accordance with an embodiment of the invention.

FIGS. 20 and 21 depict heater 163, 164 configurations that permit switching and tuning of the filter 160 to each be performed by one independent heater element, simplifying the control of the filter 160 at the expense of additional required power and temperature.

In the first embodiment depicted in FIG. 20, the filter 160 is shown with an arrangement of two heater elements 163, 164. The first heater element 163 covers both the ring resonator 161 and a part of the Mach-Zehnder switching arm 162 of approximately equal length thereto, and the second heater element 164 covers a part of the Mach-Zehnder switching arm 162. The first heater element 163 is schematically shown to exclude coverage of the shared ring-waveguide section 167 of the ring 161, since heating that part of the ring 161 requires a greater amount of power to be expended in the Mach-Zehnder switching arm 162 to compensate for the (undesired) wavelength shift caused to the Mach-Zehnder coupling response by the ring 161 tuning, and this calls for greater overall switching and tuning power. The second heater element 164 is disposed so as to cover a remaining part of the Mach-Zehnder switching arm 162. In this embodiment, the ring resonance and Mach-Zehnder coupling spectrum are tuned substantially simultaneously by actuating the first heater 163, which requires about twice the power required to tune a ring resonator 161 alone. The second heater 164 is actuated to add a 180° phase shift to the Mach-Zehnder switching arm 162 to turn on the filter response. This embodiment simplifies control at the expense of about a 50% increase in maximum power used.

A related embodiment of the filter 160 is depicted in FIG. 21. As illustrated, the first heater element 163 is designed to also heat (i.e., cover) the shared ring-waveguide section 167. In this way, a lower maximum temperature is needed to tune the resonance, by permitting the tuning phase shift to be distributed over the entire length of the ring resonator 161, rather than about ¾ of its length, as depicted in FIG. 20. This maximum temperature reduction comes at the expense of greater power required to compensate the undesired tuning of the Mach-Zehnder switching arm 162, by requiring the first heater element 163 to cover the entire length of the ring resonator 161 and the entire length of the Mach-Zehnder switching arm 162. A second heater element 164 may be disposed on a second lithographic layer (as illustrated in FIG. 21), or side by side with the first heater 163 near the Mach-Zehnder switching arm 162 in order to permit an independent control to switch on the filter 160 at the wavelength channel of interest.

Higher-Order Hitless Tunable Filters

Higher-order, selective filters are desirable for many applications, including telecommunication networks with a densely packed channel spectrum. A straightforward extension of the single-ring hitless tunable filter approach described herein to higher-order, multiple resonator filters does not provide acceptable performance in terms of amplitude and phase response suppression for hitless operation for embodiments using wavelength dependent (i.e., non-balanced Mach-Zehnder) variable couplers. Accordingly, next, various suitable designs and operation methods are described for higher-order hitless tunable filters.

Higher-order resonant filters generally include a set of coupled resonators. Solutions for hitless tuning of such filters are particularly of interest. Typically, such resonators have equal or nearly equal resonance frequencies before they are coupled, and the effect of placing them in a coupled configuration is that compound resonances (supermodes) of the system of cavities are formed, with resonant frequencies distributed in frequency within the passband of the structure. If resonators are more strongly coupled to each other, the structure passband is wider in frequency, and the supermode resonance frequencies are spaced further apart, covering the passband. A set of K coupled resonant cavities, each cavity having one resonant mode that is being used to form the structure passband, leads to K supermodes of the coupled system, each having an associated resonance frequency.

Figure 12:
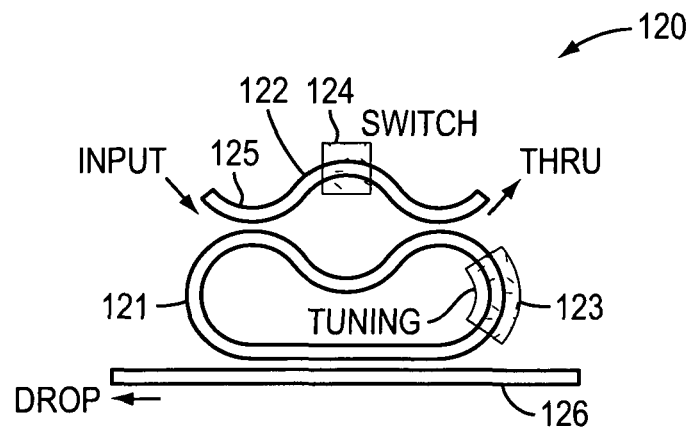
FIG. 12 illustrates a hitless tunable ring/racetrack resonator coupled to an input waveguide, via a variable Mach-Zehnder coupler having equal arm lengths, and to an output waveguide having a fixed coupler in accordance with an embodiment of the invention.

In a first embodiment of a hitless tunable high-order filter, a straightforward generalization of the structure 120 depicted in FIG. 12 may be taken, thereby providing a collection of coupled resonators having at least one resonator coupled to an input waveguide, and providing a balanced, variable Mach-Zehnder input coupler on each of the resonators coupled to the input waveguide. Such higher-order filters may further have a variable loss mechanism, such as a variable Mach-Zehnder coupler, added to one or more cavities in the structure, preferably the cavities with the highest excitation for each supermode. In another embodiment, such higher-order filters, having at least one variable loss mechanism on at least one cavity, may have additionally have a variable output coupler coupled to the drop port. This permits an increased rejection of the drop port response.

Generally, higher-order hitless tunable filters based on variable Mach-Zehnder input couplers and that use a balanced Mach-Zehnder interferometer, having a Mach-Zehnder arm length difference of zero, or zero plus a half-guided-wave section to provide a 180° phase shift that sets the filter initially into the off state, feature ring or racetrack resonators that are not circular, and have a closed optical path that permits the Mach-Zehnder input coupler to have equal arm lengths. Such resonators may be designed in high index contrast (HIC) integrated waveguides because HIC permits small bending radii with low loss. However, such resonator shapes generally permit smaller FSR than a circular ring resonator, where the radius can be maximized for a given circumference. There are thus applications in which it is generally preferable to use circular ring resonators in order to maximize the attainable cavity FSR with low loss.

In the case of higher order filters based on circular ring resonators, it is preferable to use variable Mach-Zehnder input couplers with an arm length difference equal to a positive integer multiple of the ring circumference (i.e., non-balanced Mach-Zehnder interferometers), as previously described and illustrated in FIG. 13a.

Figure 22:
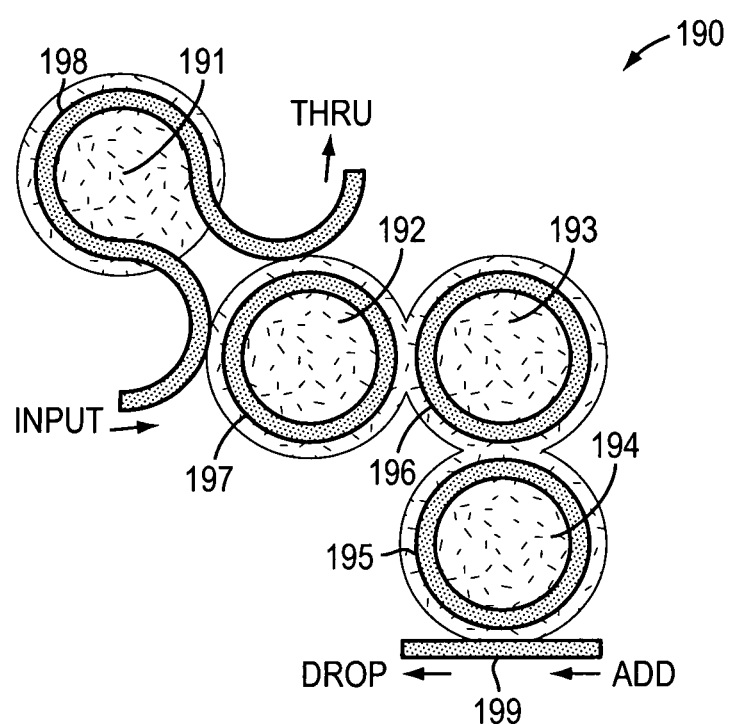
FIG. 22 illustrates a third-order ring resonator filter having a variable Mach-Zehnder input coupler, used to illustrate switching characteristics of higher order filters, in accordance with an embodiment of the invention.

In the case where higher order filters using non-balanced variable Mach-Zehnder input couplers are considered, such as is illustrated in FIG. 22, a problem may arise in achieving high suppression of the resonant amplitude and dispersion responses in the through and drop ports that is not present in single-ring filters. A Kth-order (K-cavity) filter has K system resonances (i.e., K supermodes) near a center wavelength, and these resonances have resonance frequencies distributed across the passband. On the other hand, a variable Mach-Zehnder input coupler provides a waveguide-ring coupling coefficient varying between a designed maximum value and substantially zero, and having a sinusoidal wavelength dependence of the coupling coefficient with a spectral period, or FSR, equal to the FSR of the resonator divided by the chosen positive integer, L, for the design. Because the coupling coefficient is sinusoidal, the waveguide-ring coupling is precisely zero only at the center wavelength, in the off state, and the coupling coefficient increases parabolically with larger detuning from the center wavelength. Therefore, supermodes that are furthest detuned from the center wavelength, i.e., those near the edges of the passband will experience the poorest resonant rejection, and a spurious resonant response will remain. This problem may be solved by judicious introduction of variable loss mechanisms, i.e., variable Mach-Zehnder couplers, to chosen cavities in order to dramatically reduce the quality factor (Q) of the most affected system resonances (supermodes), and therefore permit their improved extinction to a level where the through port dispersion and drop port amplitude response are suppressed sufficiently well for hitless channel add-drop filtering applications.

FIG. 22 depicts an exemplary third-order filter 190 that is a generalization of the hitless tunable filter 130 depicted in FIG. 13a. It illustrates the inadequacy of the variable input coupler approach alone to sufficiently disable the amplitude and phase response of the filter 190. The filter 190 has four heaters 191, 192, 193, 194—one per resonator 195, 196, 197 and one on the variable Mach-Zehnder input coupler 198. FIGS. 27a and 27b depict the on-state filter response magnitude, while FIGS. 27c, 27d, and 27e depict the on-state filter response phase, group delay, and dispersion near resonance for the filter 230 depicted in FIG. 26a (described further below). However, this on-state response is nearly identical for the filters 190, 210, and 260 depicted in FIGS. 22, 24, and 28, respectively. Through-port spectra are shown by curves 250 and drop port spectra by curves 252. The filter 190, 210, 230, 260 variants depicted in FIGS. 22, 24, 26a, and 28, respectively, are designed for a 40 GHz passband width and a Chebyshev response with approximately 20 dB through port extinction in the on state. Intrinsic loss Qs due to possible waveguide losses (e.g., bending, waveguide sidewall roughness, absorption, etc.) in all cavities are assumed to be Qo=200,000. This is a very low loss, but still an achievable value for ring resonators, and has been demonstrated in literature for SiN ring resonators and for Si ring resonators. This filter design provides about 30 dB or more out of band rejection in the drop port at detunings of about 80 to 120 GHz, making the filter suitable for WDM applications on a 100 GHz-spaced channel grid with 40 GHz wide channels, typically used for 10 Gb/s data rate per channel. Because flat-top filter designs are symmetric in terms of the coupling coefficient distribution along the linear coupled array of resonators, the phase, group delay, and dispersion response spectra illustrated in FIGS. 27c, 27d, and 27e, respectively, are identical for through and drop port responses and overlap.

Figures 23A, 23B:
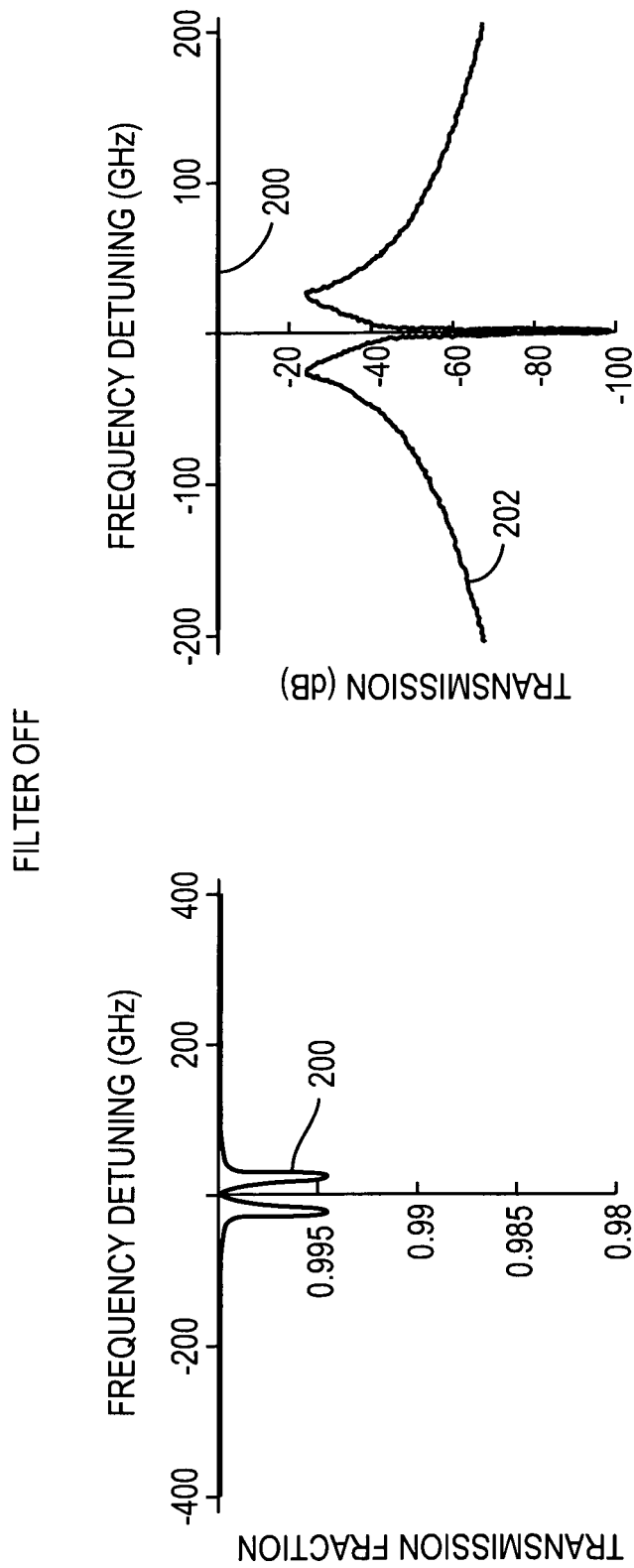
FIG. 23a illustrates the off-state through port magnitude response of the hitless switchable/tunable filter depicted in FIG. 22.
FIG. 23b illustrates the off-state through and drop port magnitude responses of the hitless switchable/tunable filter depicted in FIG. 22.
Figure 23D:
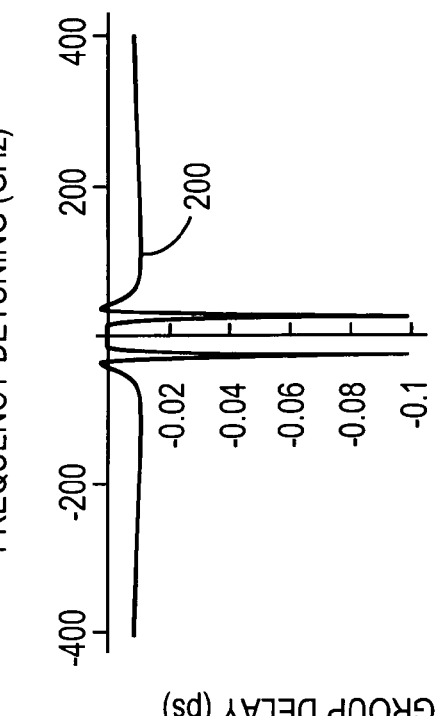
FIG. 23d illustrates the off-state through port group delay response of the hitless switchable/tunable filter depicted in FIG. 22.
Figure 23C:
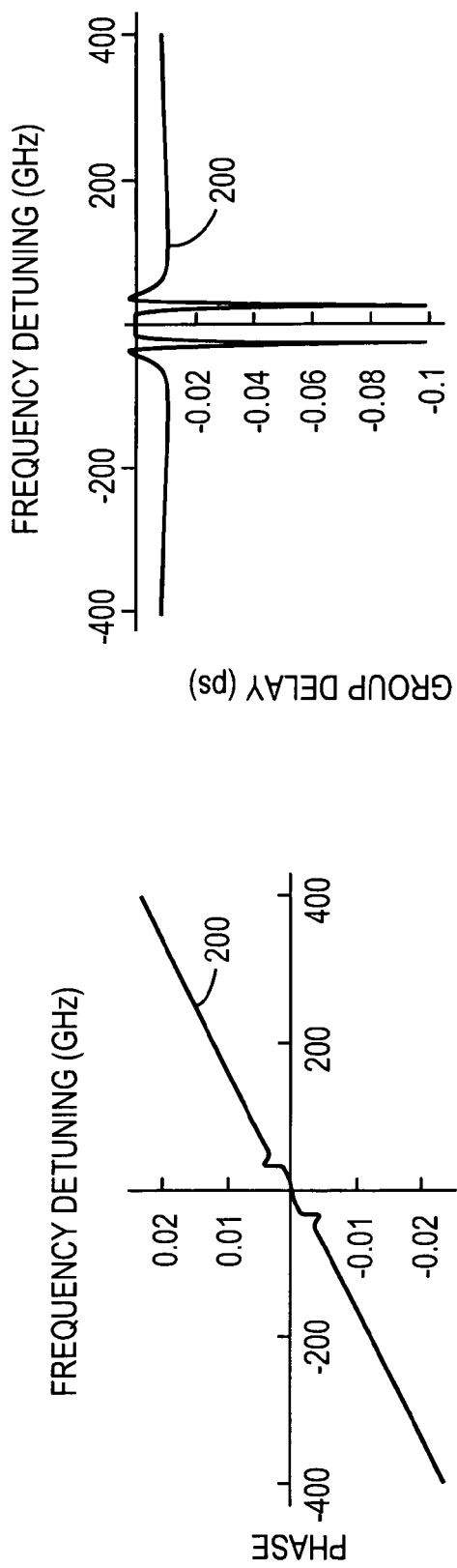
FIG. 23c illustrates the off-state through port phase response of the hitless switchable/tunable filter depicted in FIG. 22.
Figure 23E:
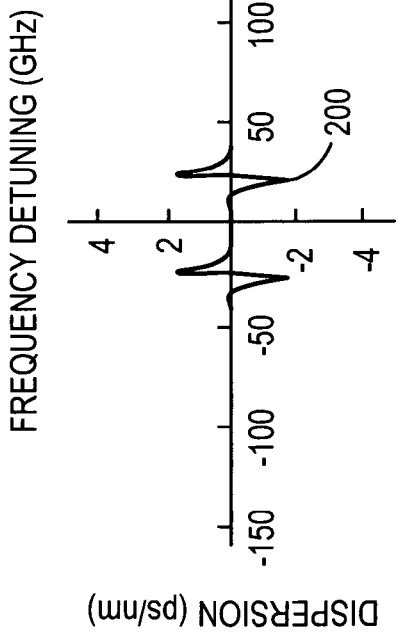
FIG. 23e illustrates the off-state through port dispersion response of the hitless switchable/tunable filter depicted in FIG. 22.

FIGS. 23a-e depict the corresponding off state responses for the filter 190 depicted in FIG. 22 when the variable Mach-Zehnder input coupler 198 is switched to the off state. Through-port spectra are shown by curves 200, and drop port spectra are shown by curves 202. As illustrated in FIGS. 23a and 23b, the filter 190 shows only about a 20 dB rejection of the drop port response with a corresponding residual through port loss of 0.5% near band edges. The reason is insufficient suppression of detuned supermodes. The $3^{rd}$ order filter 190 depicted in FIG. 22 has three system resonances (supermodes): one at the center wavelength and one near each of the left and right passband edges. The resonance at the center wavelength is fully suppressed because the variable Mach-Zehnder input coupling has a null in coupling at the center wavelength. On the other hand, the left and right system resonances still see a small residual coupling coefficient, and as a result they are still partially excited, which explains the peaks seen in FIG. 23b. Further, the −20 dB residual signal dropping corresponds to the order of 1% power being extracted from the through port near band edges, as seen in the 0.5% loss shown in FIG. 23a. The incomplete disabling of the edge system resonances means that group delay peaks remain in the spectrum at the location of the residual resonances (FIG. 23c) with at least 0.1 ps delay (FIG. 23d), and approximately 2 ps/nm dispersion (FIG. 23e).

Typical tolerable values for dispersion for a 10 to 40 Gb/s signal are 20 ps/nm. While the above distortion may be tolerable for such a signal, the cascading of many such devices in a network, where they switch at unknown times, makes the presence of such signal distortion undesirable. Furthermore, as the order (number of resonators) of the filter increases, the passbands become sharper and the detuning of the edge system resonances increases further, placing them further from the center wavelength and closer to the passband edges, and the loaded Q of the passband edge supermodes increase (as required to form sharper band-edge rolloffs for the higher-order filters). These properties conspire to make the residual resonance excitation in the filter off state progressively worse in higher order filters than the configuration 190 depicted in FIG. 22.

Figure 24:
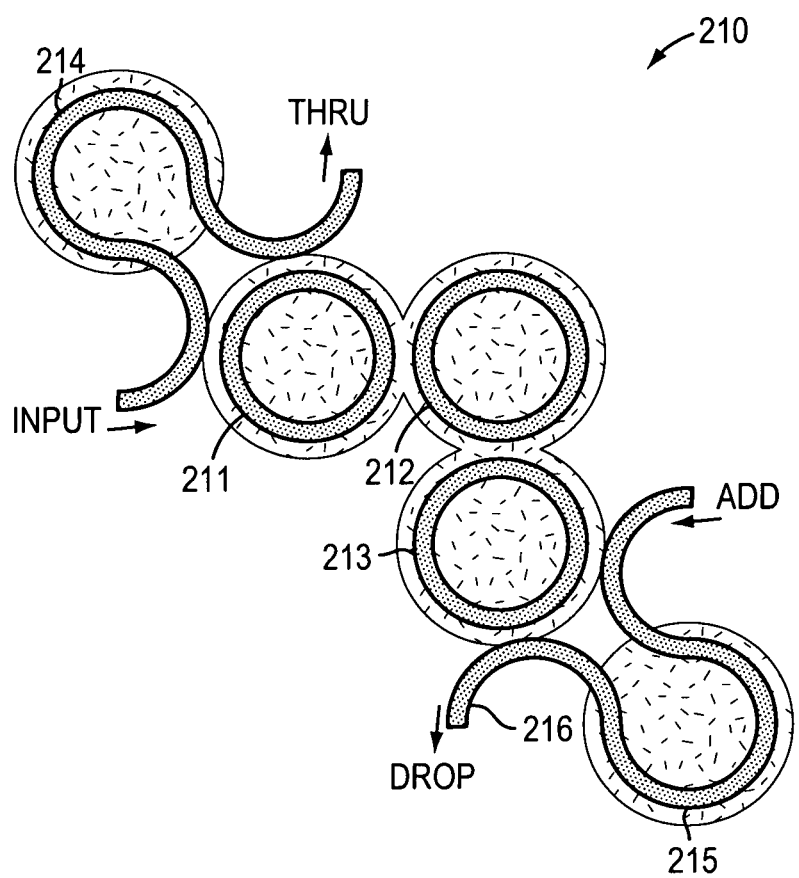
FIG. 24 illustrates a third-order ring resonator filter having a variable Mach-Zehnder input coupler and a variable Mach-Zehnder output coupler, used to illustrate switching characteristics of higher order filters, in accordance with an embodiment of the invention.
Figures 25A, 25B:
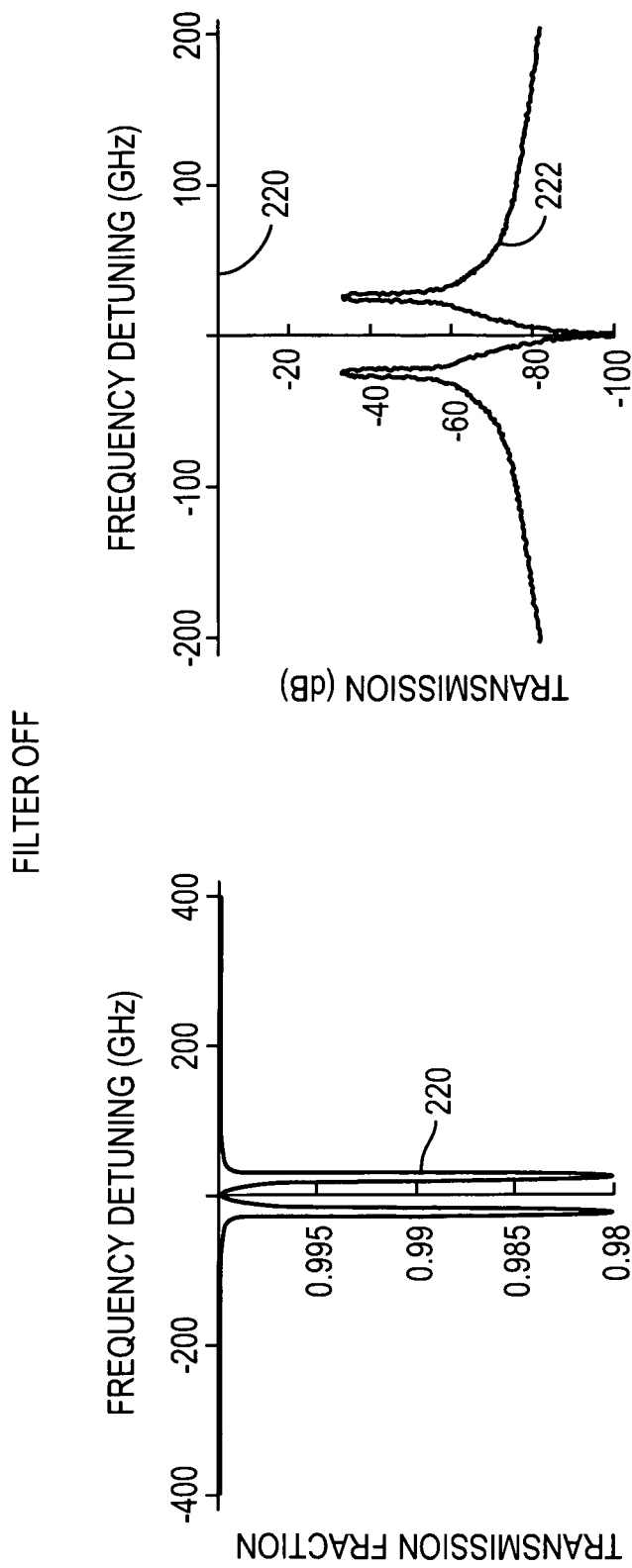
FIG. 25a illustrates the off-state through port magnitude response of the hitless switchable/tunable filter depicted in FIG. 24.
FIG. 25b illustrates the off-state through and drop port magnitude responses of the hitless switchable/tunable filter depicted in FIG. 24.

FIG. 24 depicts another higher-order filter 210. The filter 210 includes a series-coupled array of ring resonators 211, 212, 213 and adds a variable Mach-Zehnder coupler 214, 215 on each of the input resonator 211 and the output resonator 213. The Mach-Zehnder output coupler 215 provides higher drop-port 216 rejection in the off-state, while residual through-port dispersion is slightly degraded due to a reduced effective loading loss in the cavities 211, 212, 213 when the output coupling is removed, i.e., power transfer from the output ring 213 to the drop waveguide 216 across the output Mach-Zehnder coupler 215 is disabled. The filter 210 may also be shown to be inadequate for hitless tuning, and gives even worse characteristics than the filter 190 depicted in FIG. 22. A series-coupled resonator array with a fixed input coupler and fixed output coupler configured to a specific relationship between coupler and ring length, has been previously used to double the FSR of a higher order filter. The configuration 210 depicted in FIG. 24, using a variable input coupler 214 and variable output coupler 215 with a Mach-Zehnder arm length difference of one ring resonator round trip or an integer multiple thereof is a suitable design for consideration of hitless tuning. However, the response of the filter 210 in the off state, as illustrated in FIG. 25 by through-port spectra curves 220 and drop port spectra curves 222, shows that the filter 210 is not suitable for this application. The reason for this is that both the input and output coupling are reduced such that the resonators 211, 212, 213 constituting the filter 210 and the system resonances they form attain a very high Q. At the center wavelength, the central resonance is suppressed due to the null of the Mach-Zehnder input coupler 214 in the off state (FIG. 25b). However, at passband edges, high Q resonances with equal input and output coupling can have relatively high residual peaks transmission. In this example, they reach only to −30 dB in the drop port 216 (FIG. 25b) because losses were assumed in the simulation, giving the resonators 211, 212, 213 an assumed loss Q of 200,000. If the resonators 211, 212, 213 were substantially lower loss, the system resonances would transmit substantially higher—in fact, for lossless cavities 211, 212, 213, the narrow residual, parasitic peaks depicted in FIG. 25b would transmit 100% to the drop port 216 in two very narrow frequency bands. The dispersion due to these high-Q resonances can also be substantial, in several ps/nm (FIG. 25e). Furthermore, the loss seen by the filter 210, plotted in FIG. 25a, sees transmission less than 98% in the two narrow residual resonance bands—in fact the loss is on the order of 5% with the 200,000 loss Q that was assumed in the simulation, and 100% for lossless cavities 211, 212, 213.

Therefore, the extension of a single variable input coupler to higher-order resonators, and particularly the use of a variable input and output coupler on a higher order filter, are not well suited to hitless tuning and do not facilitate strong suppression of resonant amplitude and phase responses in the off state of the filter. The primary issue is the single resonant passband null of a Mach-Zehnder input coupler, and, on the other hand, the presence of multiple system resonances at different resonant frequencies within the passband, only one of which can be rigorously suppressed by the input coupler.

In the following embodiments of hitless tunable higher-order filters, it is shown that the introduction of variable loss mechanism(s) to one or more cavities in a higher-order filter substantially improves the suppression of dispersion, loss, and drop-port rejection spectra. Preferably, the variable loss mechanism, such as a variable Mach-Zehnder coupler, is placed on that cavity in the multi-cavity filter which has the highest resonant excitation when exciting one of the two most detuned system resonances (supermodes). This loads the resonances and broadens them, which in turn permits a weak but non-zero input coupling of the variable Mach-Zehnder input coupler at frequencies detuned from its null to still substantially suppress the resonant response by attaining a high enough $Q_e/Q_o$ ratio (referring to FIG. 11c).

Figure 26A:
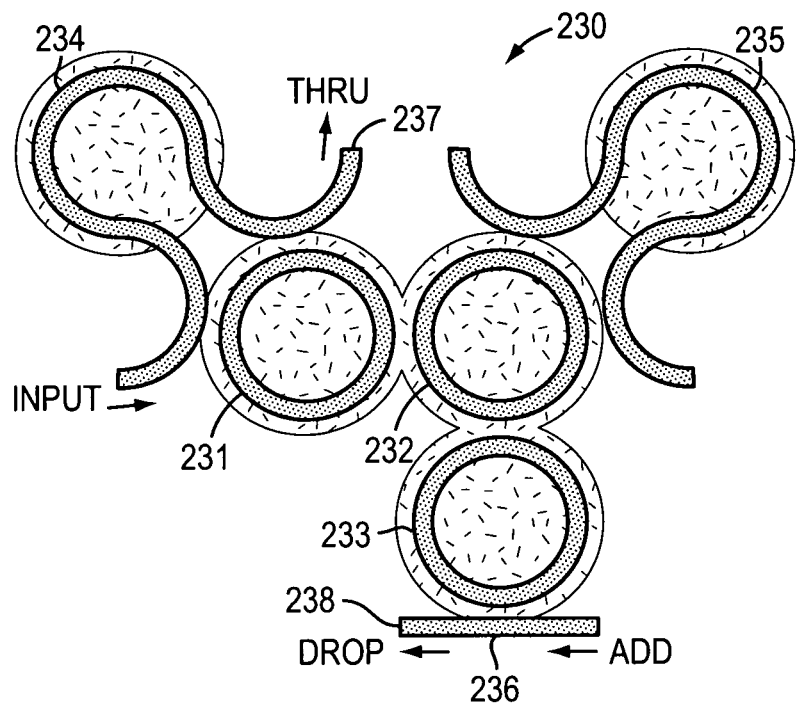
FIG. 26a illustrates a third-order ring resonator filter having a variable Mach-Zehnder input coupler on a first ring and a variable Mach-Zehnder loss coupler on a second ring, used to illustrate switching characteristics of higher order filters, in accordance with an embodiment of the invention.
Figure 27A:
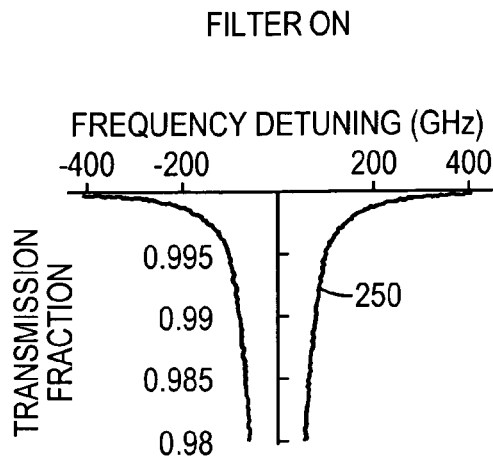
Figure 27B:
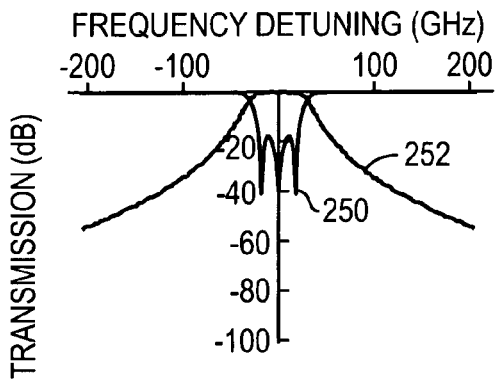
Figure 27C:
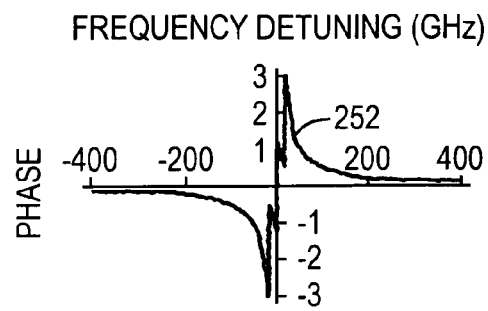
Figure 27F:
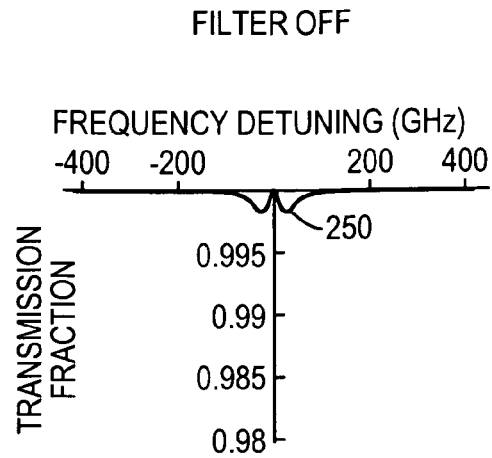
Figure 27G:
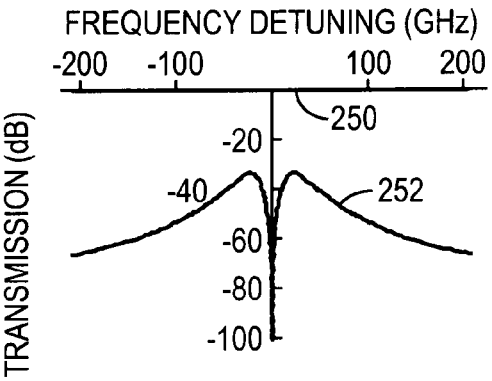
Figure 27H:
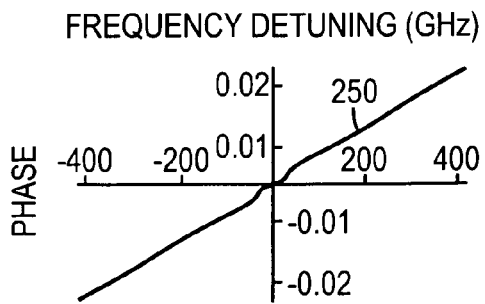
Figure 27D:
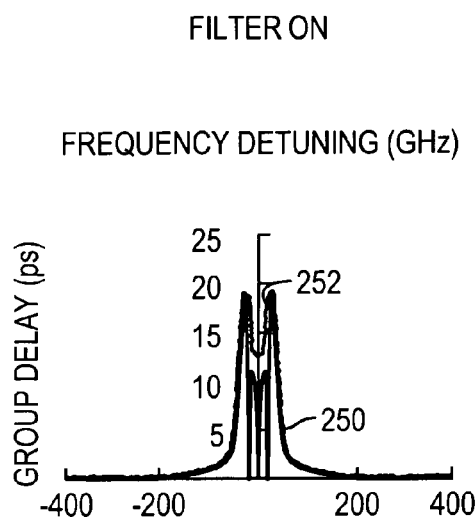
Figure 27E:
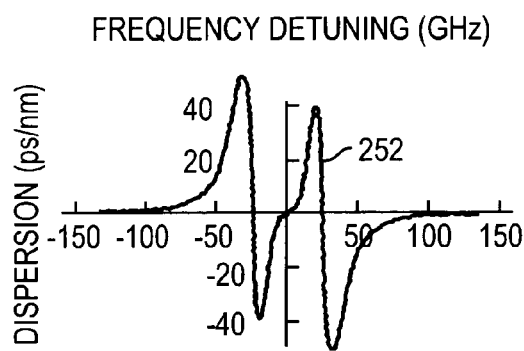

FIG. 26a depicts one embodiment of a hitless tunable higher-order filter 230. The filter 230 includes a set of series-coupled microring resonators (e.g., microring resonators 231, 232, and 233), a first variable input coupler 234 attached to the first ring 231 and to the input waveguide, a second variable coupler 235 attached to the second ring 232 to provide a variable loss mechanism, and a fixed output waveguide 236 attached to the third ring 233. The variable loss mechanism 235 may be placed on any of the three rings 231, 232, 233, but is preferably placed on the resonant cavity 232 that is most substantially excited (i.e., has the largest resonating amplitude) in various excited resonances (i.e., supermodes) of the resonant filter 230, and otherwise on one that is as close to the input as possible.

A $K^{th}$-order filter, using K resonant cavities, has K resonant supermodes. If the isolated cavities have nearly equal uncoupled resonance frequency, as is usually the case for add-drop filters, then, in the coupled configuration, the supermodes have resonance frequencies spaced across the filter passband. An excitation at each supermode frequency substantially excites all or a subset of the resonant cavities, with various amplitudes. In more simple terms, a variable loss mechanism, which may be implemented as a variable Mach-Zehnder coupler, acts as a resonance Q spoiling mechanism for each supermode, or for the cavity to which it is attached.

As illustrated in FIG. 26a, the variable input coupling 234 may be realized as a Mach-Zehnder interferometer with a finite FSR (e.g., an FSR equal to the FSR of the resonator 231 or to its FSR divided by a positive integer), and the variable loss mechanism 235 may be placed on the cavity 232 that has the maximum amplitude in those supermodes that are furthest detuned from the center frequency of the filter 230. This is advantageous because a finite-FSR Mach-Zehnder coupling arm 234 places a null at the center frequency, but, with larger detuning from center frequency, the coupling increases from zero to a small value. Since the supermodes of a higher-order coupled-cavity structure are spread in resonance frequency throughout the passband, the furthest detuned supermodes experience the smallest extinction ratio, as the finite-FSR Mach-Zehnder coupler 234 has the most appreciable residual coupling far from the band center in the off state. By introducing a loss mechanism 235 designed to most significantly reduce the Q of these modes, the drop-port 238 rejection in the off-state is optimized. This design permits an economical use of a small number of available variable couplers, in terms of maximizing the off-state signal rejection in the drop port 238, and minimizing amplitude variation in the through-port 237 and residual through-port 237 dispersion.

Figure 26B:
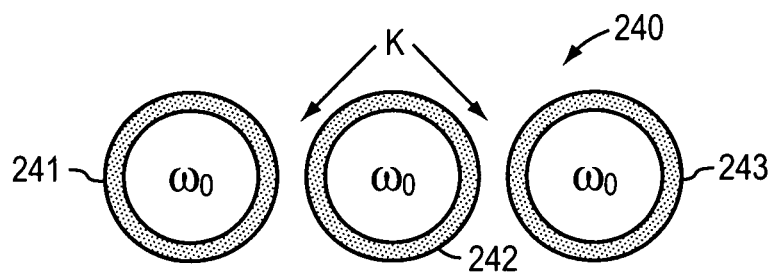
FIG. 26b illustrates a set of three coupled resonators that form part of the filter depicted in FIG. 26a, as a closed system (without input and output waveguides), whose supermodes may be evaluated to show the optimal placement of a variable loss mechanism in accordance with an embodiment of the invention.
Figure 26C:
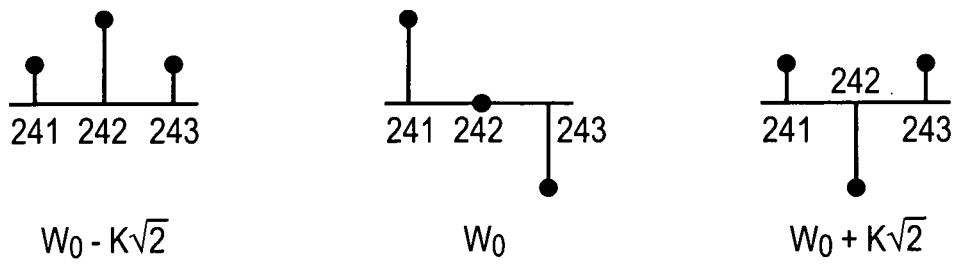
FIG. 26c illustrates the energy amplitudes present in each cavity of the resonator system depicted in FIG. 26b, for each of the three supermodes and their corresponding resonance frequencies, the consideration of which may be used to infer the optimal placement of a variable loss mechanism in accordance with an embodiment of the invention.

A brief consideration of the supermode structure of the three coupled rings 231, 232, 233 of the filter 230 reveals the justification for applying the variable loss mechanism 235 to the second ring 232. Consider, as shown in FIG. 26b, a set of three series-coupled ring resonators 241, 242, 243 with equal uncoupled resonance frequencies, $\omega_o$ (rad/s), and a symmetric coupling coefficient distribution (both energy coupling coefficients equal, $\kappa$), without coupled access waveguides (ignoring effect of the waveguides is acceptable to explain the logic of the design). It is well known that this coupled system 240 of three cavities 241, 242, 243 has three system resonances (supermodes) with resonance frequencies $\omega_o-\kappa\sqrt{2}$, $\omega_o$, and $\omega_o+\kappa\sqrt{2}$. The distribution of energy amplitudes in the three cavities 241, 242, 243 for each of the three supermodes is, respectively, $\{1, 1.41, 1\}$, $\{1, 0, -1\}$, and $\{1, -1.41, 1\}$ in relative terms, as illustrated in FIG. 26c. This is similar to the well known particle-in-a-box or square well solution in quantum mechanics where the lowest three energy states have respectively faster variation of the field distribution, i.e., higher frequency cosine field distribution. In the case of the cavities 241, 242, 243, the distribution of the energy amplitudes across the system of cavities is slowest varying for the lowest frequency (energy) state, i.e., supermode, and progressively has faster oscillation for the second and third state. In terms of energy, the three system resonances have fractional energy distributions as the squares of the energy amplitudes, respectively $\{0.25, 0.5, 0.25\}$, $\{0.5, 0, 0.5\}$, and $\{0.25, 0.5, 0.25\}$.

Now, we can consider the switching operation of the filter 230 depicted in FIG. 26a. The variable Mach-Zehnder input coupler 234 has a single null (per FSR), and, when actuated, can disable the middle resonant supermode with resonance frequency $\omega_o$ and energy distribution $\{0.5, 0, 0.5\}$ among the cavities 231, 232, 233. Now, the lowest and highest frequency supermodes would have spurious resonant amplitudes, as shown in FIG. 23b for the device 190 depicted in FIG. 22. In the device 230 depicted in FIG. 26a, the variable loss mechanism 235 can be placed on a cavity. Since both of the unsuppressed supermodes have fractional energy distribution $\{0.25, 0.5, 0.25\}$ among the cavities 231, 232, 233, placing an output port, i.e., the variable Mach-Zehnder coupler 235 connected to a waveguide that takes energy away and discards it, onto the middle cavity 232 gives twice the rate of loss as would be the case if the variable Mach-Zehnder coupler 235 were connected to either of the other two cavities 231, 233, for a given coupling coefficient (i.e., coupling gap) used in each of the two directional couplers contained in the variable Mach-Zehnder coupler 235.

It is desirable to keep the coupling gaps large for the purposes of lithographic fidelity of the device 230, and because larger gaps permit lower radiation loss in high index contrast directional couplers. On the other hand, maximizing power leakage from the cavities 231, 232, 233, i.e., the relevant supermode, when the variable Mach-Zehnder coupler 235 is turned on is important to lower the overall intrinsic Q, $Q_o$, of the mode as much as possible, thereby increasing the $Q_e/Q_o$ contrast (see FIG. 11c) and leading to greater suppression of the resonant responses in the filter 230 off state. The Q of both the lowest frequency and the highest frequency supermode is reduced most in the on state of the variable Mach-Zehnder loss coupler 235, when the variable Mach-Zehnder loss coupler 235 is placed on the middle ring 232.

Figure 27I:
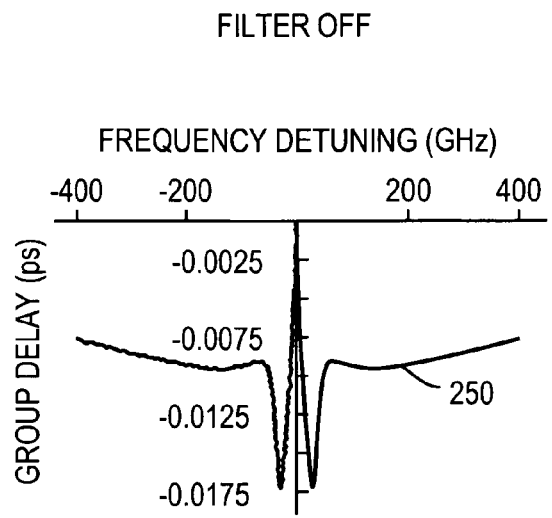
FIG. 27*i* illustrates the off-state through port group delay response of the hitless switchable/tunable filter depicted in FIG. 26*a*.
Figure 27J:
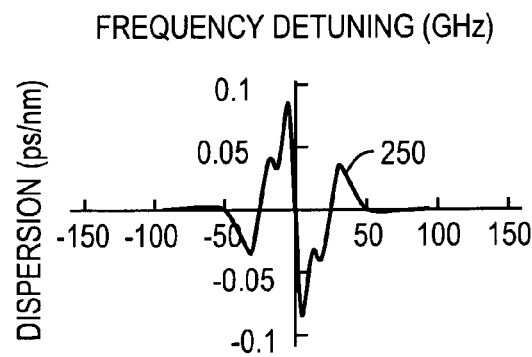
FIG. 27*j* illustrates the off-state through port dispersion response of the hitless switchable/tunable filter depicted in FIG. 26*a*.

FIGS. 27a-j shows the resulting simulated filter on and off state responses for the device 230 depicted in FIG. 26a. Through-port spectra are shown by curves 250 and drop port spectra are shown by curves 252. In the on state, the variable Mach-Zehnder input coupler 234 is on, and the variable Mach-Zehnder loss coupler 235 is off. The through port 237 (see FIGS. 27a and 27b) has 20 dB extinction by design. The drop port 238 shows full transmission (see FIG. 27b) and there is a standard group delay of approximately 12 ps for passing through a 40 GHz, third-order filter on resonance. In the off state of the filter 230, the variable Mach-Zehnder input coupler 234 is off, and the variable Mach-Zehnder loss coupler 235 is on. The drop port 238 (see FIG. 27g) is suppressed by approximately 35 dB. In particular, the supermode residual peaks that previously appeared for the embodiments of the filters 190 and 210 depicted in FIGS. 22 and 24, as shown in FIGS. 23b and 25b, are suppressed to below approximately 35 dB, aided by the Q spoiling provided by the engineered loss mechanism 235. This performance is substantially unchanged even if the cavities 231, 232, 233 are assumed to be lossless (in these simulations, the starting point was a loss Q of 200,000), unlike the filter 210 depicted in FIG. 24 which gets worse for the lower loss cavities 211, 212, 213. Due to the finite cavity 231, 232, 233 losses and also the introduced loss mechanism 235 for switching, the worst case through-port 237 insertion loss on resonance is less than 0.2%. Furthermore, FIGS. 27i and 27j show a group delay magnitude across the passband of less than 0.02 ps, and a dispersion under 0.1 ps/nm. This is essentially complete disabling of the amplitude and phase response of the resonant filter 230, for the purposes of signal transmission at the signal rates compatible with the bandwidth of this filter 230, i.e., up to approximately 25 Gbps, and even well beyond such bitrates.

Figure 28:
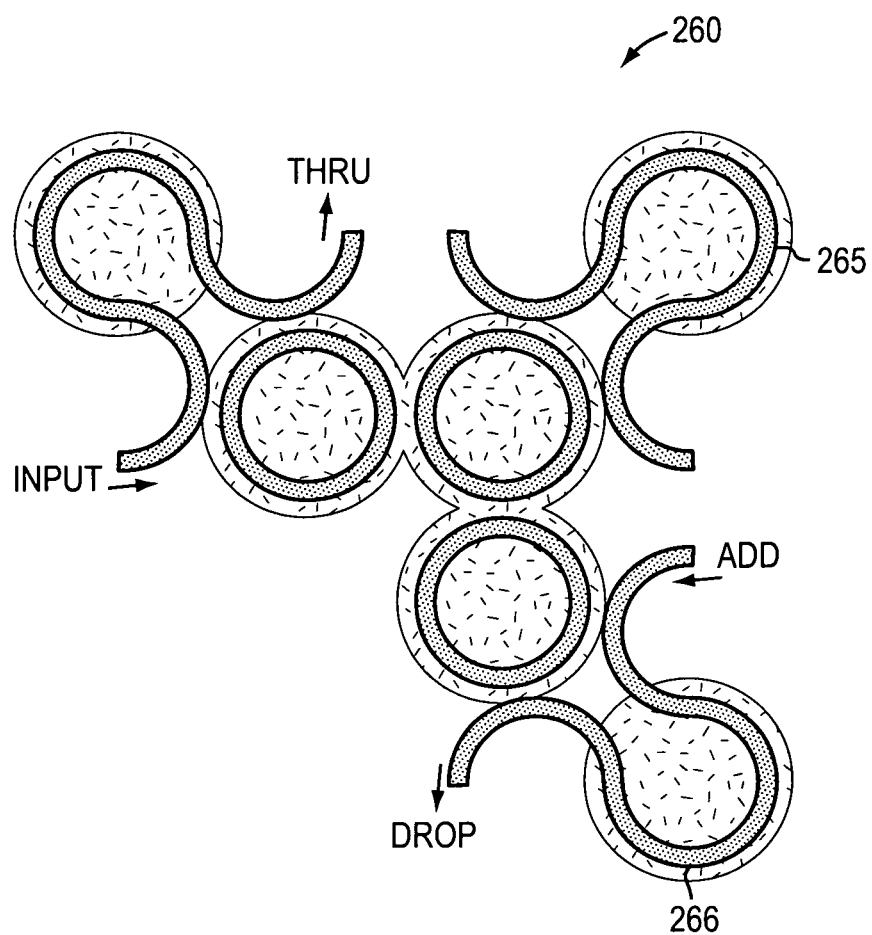
FIG. 28 illustrates a third-order ring resonator filter having a variable Mach-Zehnder input coupler, a variable Mach-Zehnder output coupler, and a variable Mach-Zehnder loss coupler, used to illustrate switching characteristics of higher order filters, in accordance with an embodiment of the invention.
Figure 29A:
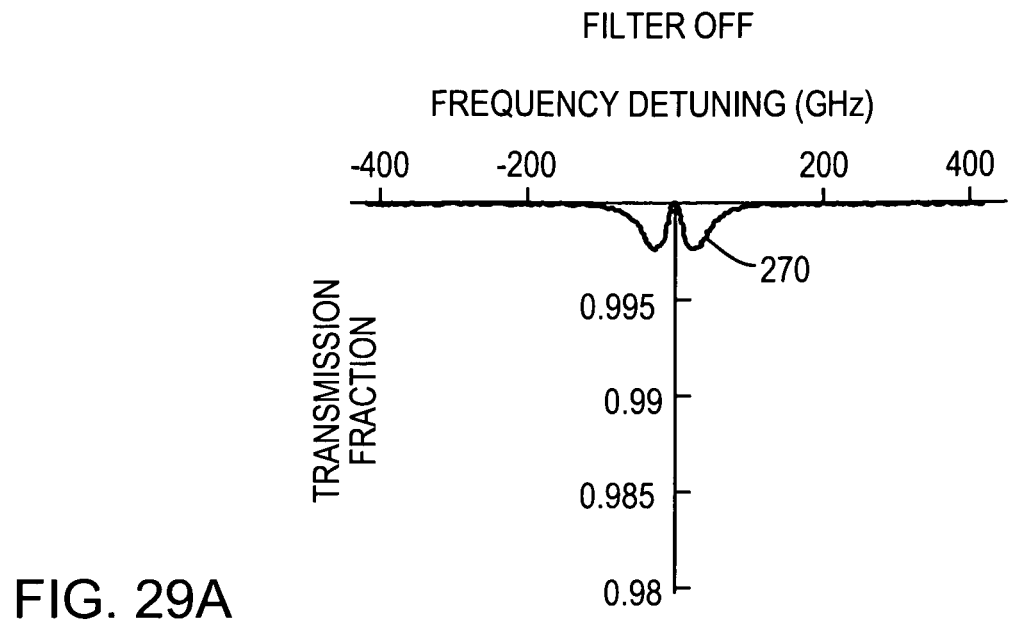
FIG. 29*a* illustrates the off-state through port magnitude response of the hitless switchable/tunable filter depicted in FIG. 28.
Figure 29B:
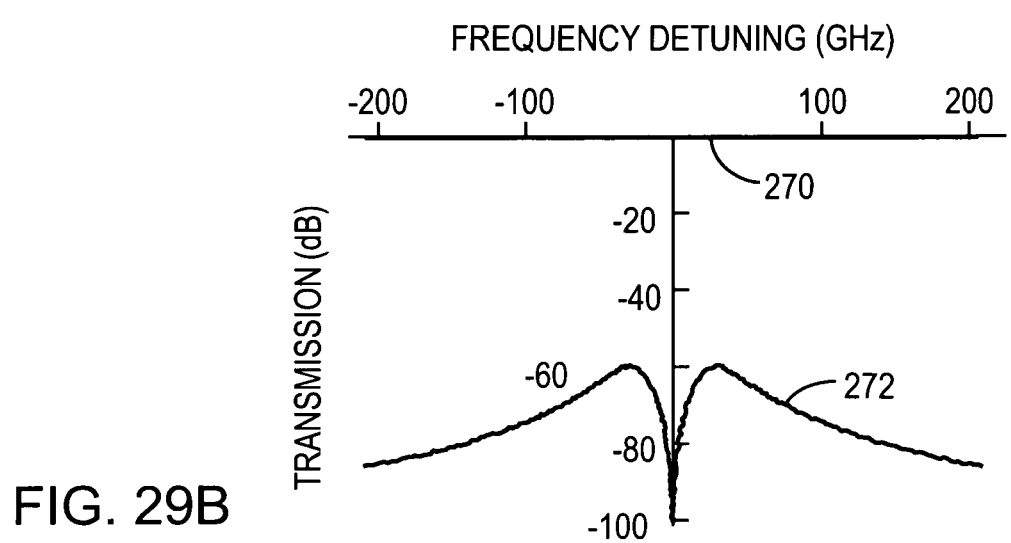
FIG. 29*b* illustrates the off-state through and drop port magnitude responses of the hitless switchable/tunable filter depicted in FIG. 28.
Figure 29C:
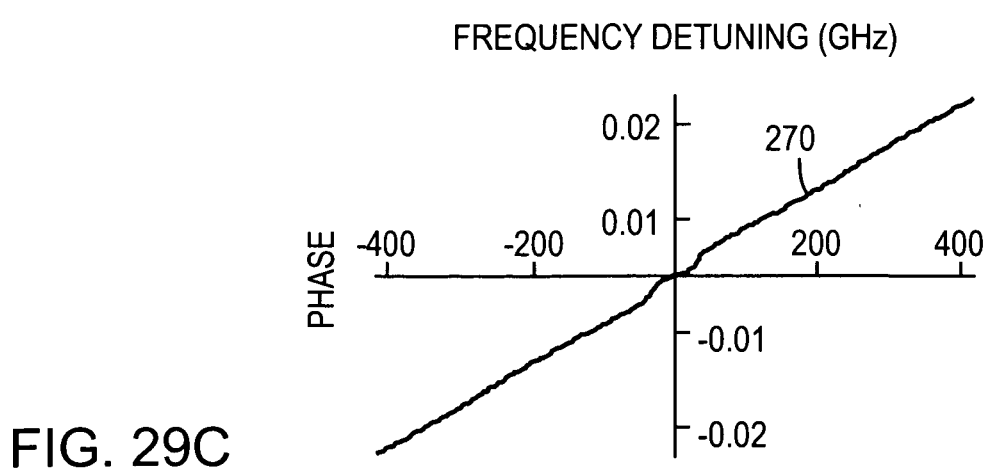
FIG. 29*c* illustrates the off-state through port phase response of the hitless switchable/tunable filter depicted in FIG. 28.
Figure 29D:
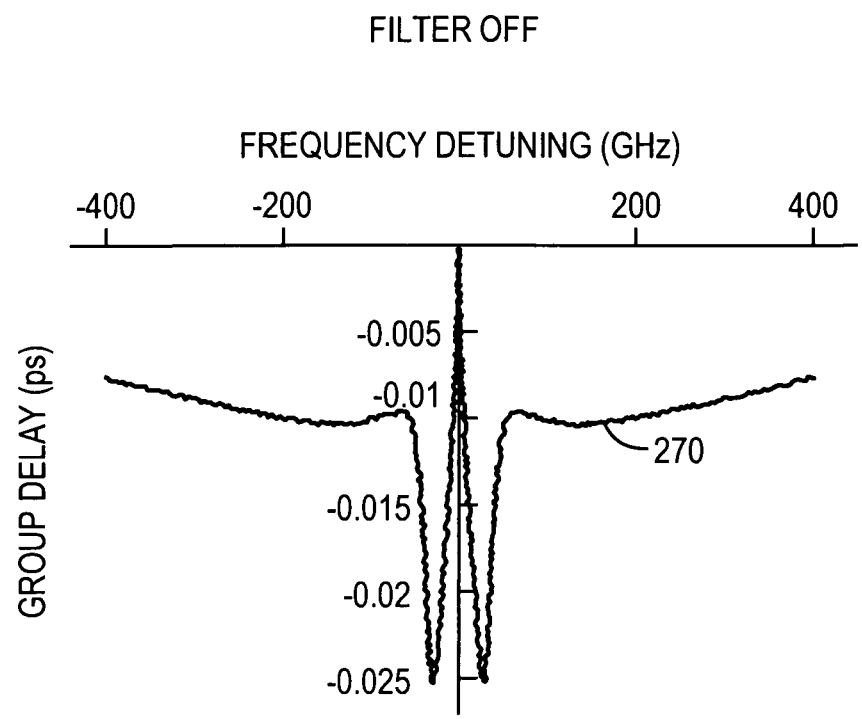
FIG. 29*d* illustrates the off-state through port group delay response of the hitless switchable/tunable filter depicted in FIG. 28.
Figure 29E:
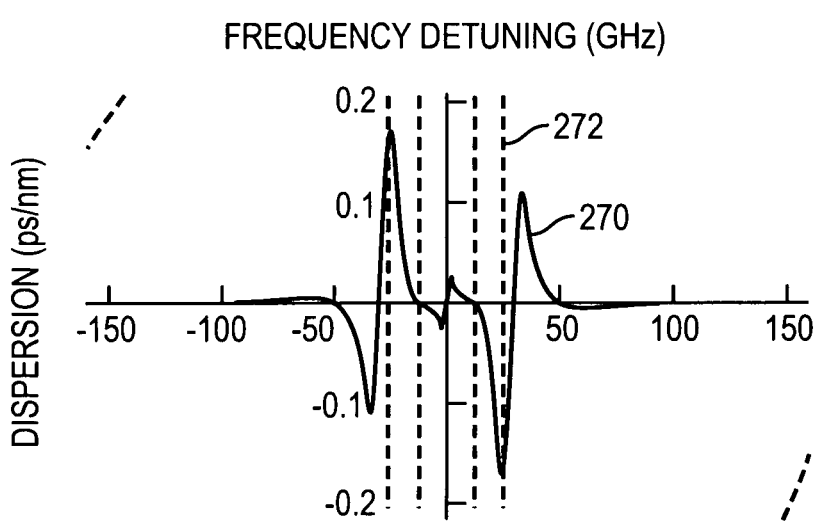
FIG. 29*e* illustrates the off-state through port and drop port dispersion response of the hitless switchable/tunable filter depicted in FIG. 28.

While this is the most economical use of two variable couplers 234, 235 in a higher-order filter 230, if one is permitted to use more than two variable couplers 234, 235, the drop port 238 extinction may be improved at the expense of increased complexity. FIG. 28 depicts an embodiment of a hitless tunable filter 260 that is similar to the filter 230 depicted in FIG. 26a, but with the output waveguide 236 replaced by another variable Mach-Zehnder coupler 266. FIG. 29 depicts the filter off state responses for the device 260 depicted in FIG. 28. Through-port spectra are shown by curves 270 and drop port spectra are shown by curves 272. As illustrated in FIG. 29, the through-port, group-delay, and dispersion responses are similar to those depicted in FIG. 27, but the drop-port rejection level is increased to over 60 dB for the residual supermode resonances. In the filter 260 depicted in FIG. 28, the variable output coupler 266 may be used to improve the response, unlike in the case of the filter 210 depicted in FIG. 24, because a separate variable loss mechanism 265 has been included in the cavity system to keep the loss and therefore the linewidth of the passband-edge supermodes large, which permits the switching contrast ratio, $Q_e/Q_o$, to be large and achieve high fidelity switching.

Figure 30A:
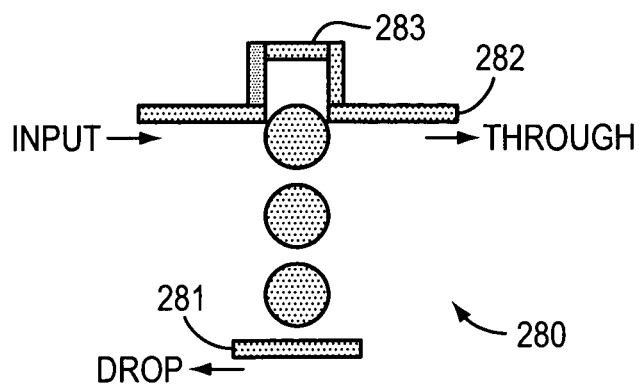
FIG. 30*a* illustrates a third-order ring resonator filter having a variable Mach-Zehnder input coupler, used to illustrate switching characteristics of higher order filters, in accordance with an embodiment of the invention.
Figure 30B:
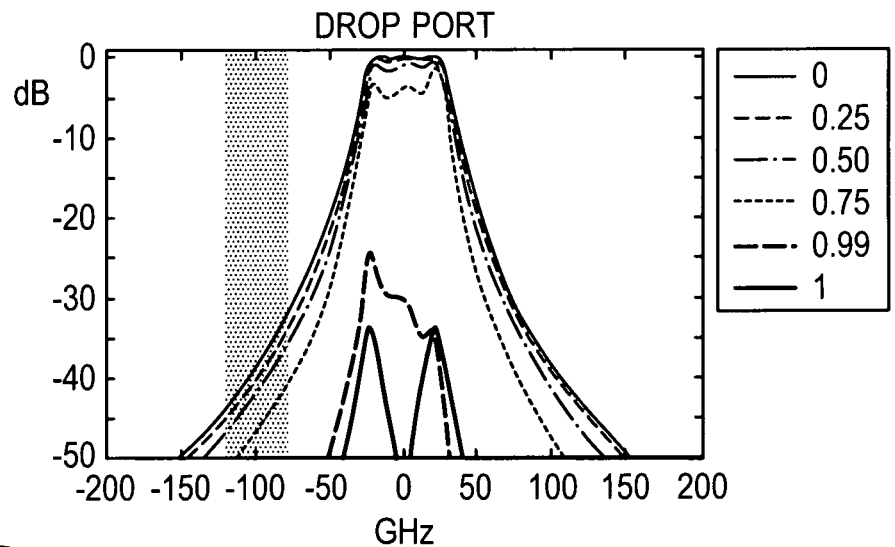
FIG. 30*b* illustrates the drop port magnitude response switching characteristics for a filter of the type depicted in FIG. 30*a*, for several states of the variable Mach-Zehnder input coupler ratio.
Figure 30C:
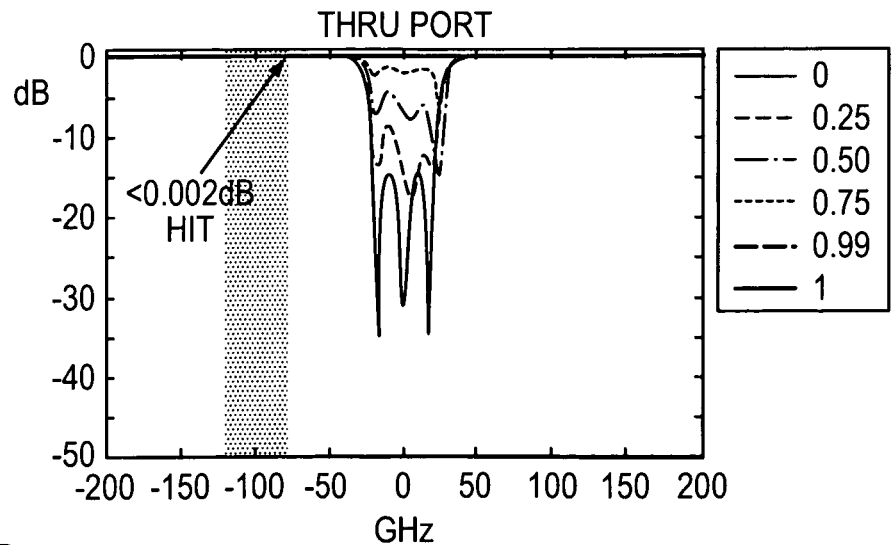
FIG. 30*c* illustrates the through port magnitude response switching characteristics for a filter of the type depicted in FIG. 30*a*, for several states of the variable Mach-Zehnder input coupler ratio, and indicates through-port excess loss during switching at the edge of a channel 100 GHz away from the switched channel.

Since FIGS. 22-29 show only on and off states, it is important to address that the resonant response does not venture substantially outside this spectral region and affect other channels during switching. FIG. 30a depicts the schematic representation of a filter 280 similar to the filter 190 depicted in FIG. 22. FIGS. 30b and 30c depict, respectively, the switching responses in the drop port 281 and through port 282 of the filter 280 at several transmission states of the variable Mach-Zehnder input coupler 283. For a 40 GHz passband, a free spectral range of about 3 THz, and channel spacing of 100 GHz, the adjacent channels never see more than 0.002 dB excess loss during the hitless switching of the channel at the center of the plots from the on state to the off state or back.

Figure 32:
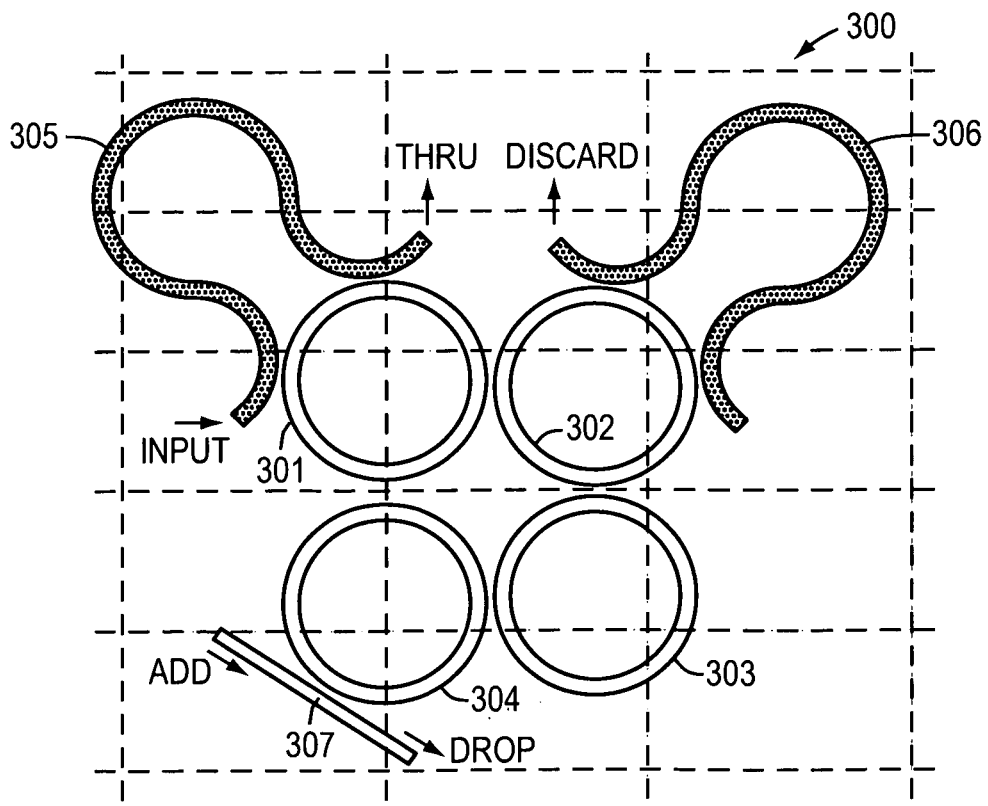
FIG. 32 illustrates a physical embodiment of a fourth-order ring resonator hitless tunable filter, realized in silicon-core waveguides, in accordance with the invention.

FIGS. 31 and 32 depict two complete realizations of hitless tunable filters 290, 300 in silicon-core microphotonic waveguides. The dimensions and parameters of the single-ring filter 290 depicted in FIG. 31 have already been described. The $4^{th}$-order hitless tunable filter 300 depicted in FIG. 32 comprises four ring resonators 301, 302, 303, 304 coupled in a series configuration, but laid out in a folded arrangement, such that the first resonator 301 is coupled to an input waveguide via a variable Mach-Zehnder input coupler 305, and to the second resonator 302. The second resonator 302 is further coupled to a variable Mach-Zehnder loss coupler 306 and to the third resonator 303. The third resonator 303 is further coupled to the fourth resonator 304, and the fourth resonator 304 is further is coupled to an output bus waveguide 307. This filter 300 may be realized in silica-cladded, Si-core ring 301, 302, 303, 304 and variable coupler 305, 306 waveguides of 600×100 nm cross-section and output bus waveguides 307 of about 500×100 nm cross-section. The outer ring 301, 302, 303, 304 radii may be approximately 7 microns. The two input directional couplers of the variable Mach-Zehnder input coupler 305 and variable Mach-Zehnder loss coupler 306 may have a power coupling coefficient of approximately 5%, or waveguide coupling gaps of about 200 nm in each of the two directional couplers and in each Mach-Zehnder coupler. The output coupler 307 on the fourth ring 304 may have a coupling coefficient of approximately 7%, or about a 175 nm waveguide-ring coupling gap. The rings 301, 302, 303, 304 may have couplings of approximately 0.65% or a gap of approximately 400 nm between the first ring 301 and the second ring 302 and also between the third ring 303 and the fourth ring 304, and a coupling coefficient of approximately 0.35% or a gap of approximately 460 nm between the second ring 302 and the third ring 303. In one embodiment, the closest spacing between the first ring 301 and the fourth ring 304 is at least 1.5 microns, ensuring no substantial coupling.

In the context of actuation and operation of hitless tunable higher-order filters, a modification of the methods used for single-ring filters is needed. Higher-order filters may use one or more variable Mach-Zehnder couplers connecting resonators to port waveguides, and one or more variable Mach-Zehnder couplers connected to resonators to lead power out to auxiliary ports that discard the power, thereby acting as variable loss mechanisms for the cavities. In order to enable hitless tuning of filters across their entire FSR with minimal actuation of phase shifters, and minimal power and temperature requirements, it is desirable that the filter have the input and output variable Mach-Zehnder couplers in the off state, and all the loss mechanism variable Mach-Zehnder couplers in the on state when all phase shifters are not actuated, i.e., all heaters are not powered. This means that the input and output variable Mach-Zehnder couplers are to have, in one embodiment, a Mach-Zehnder arm length difference equal to one ring FSR or an integer multiple thereof plus a 180° phase shift realized as an additional half-guided-wavelength length of waveguide, while the variable Mach-Zehnder couplers used as loss mechanisms for cavities are to have the same length difference without the additional phase shift.

While the principles for designing hitless tunable resonant filters have been illustrated with respect to a third-order filter, these results more generally apply to all orders, including second-order, $4^{th}$-order, and higher order resonant structures. Moreover, the results apply beyond series-coupled cavities, insofar as a distinction is to be made between cavities coupled to an input waveguide, which are given a variable input coupler, interior cavities that may be augmented with a variable Mach-Zehnder loss coupler, and output cavities coupled to one or more output waveguides, which may be given a variable Mach-Zehnder output coupler, as described.

In general, it is noted that one challenge to designing a hitless tunable filter for telecommunication applications is disabling of the through-port response, since the input-to-through-port path may be populated with heavy WDM traffic. The drop port extinction may also be of concern, and may be solved in various ways without modifying the resonant structure, so long as the leakage of the resonant response into the drop port in the off state of the filter is not substantial enough (less than −20 dB) so as to cause substantial through-port losses (greater than 1%) and dispersion.

Therefore, the hitless tunable filter designs described herein may have increased rejection by using them in combination with a broadband on-off optical switch concatenated in series with the filter at the drop port output. Such a switch may be a balanced Mach-Zehnder interferometer with two 3 dB couplers. Such switches may, in principle, increase the extinction indefinitely and may, in practice, increase the extinction by greater than 20 dB per switch.

Having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A hitless tunable higher-order filter, comprising:
   a plurality of ring resonators, each ring resonator being coupled to another ring resonator;
   a first variable Mach-Zehnder coupler, for providing an input mechanism, coupled to a first ring resonator;
   a second variable Mach-Zehnder coupler, for providing a loss mechanism, coupled to a ring resonator in the plurality of ring resonators that has a maximum amplitude in supermodes that are furthest detuned from a center frequency of the filter; and
   a drop waveguide coupled to at least one of the plurality of ring resonators.

2. The filter of claim 1, wherein a free spectral range of the first variable Mach-Zehnder coupler is substantially equal to a free spectral range of the first ring resonator divided by a positive integer.

3. The filter of claim 1, wherein the drop waveguide comprises a third variable Mach-Zehnder coupler.

4. The filter of claim 3, wherein at least one of the first variable Mach-Zehnder coupler and the third variable Mach-Zehnder coupler is configured to introduce a phase shift of approximately 180° to light propagating therethrough.

* * * * *